(12) United States Patent
Provancher et al.

(10) Patent No.: US 10,152,853 B2
(45) Date of Patent: Dec. 11, 2018

(54) SKIN STRETCH FEEDBACK DEVICES, SYSTEMS, AND METHODS

(71) Applicant: University of Utah Research Foundation, Salt Lake City, UT (US)

(72) Inventors: William R. Provancher, Fremont, CA (US); Markus N. Montandon, Alpine, UT (US); Andrew J. Doxon, Urbandale, IA (US); Nathan A. Caswell, Salt Lake City, UT (US); Landon T. Gwilliam, Taylorsville, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 15/675,076

(22) Filed: Aug. 11, 2017

(65) Prior Publication Data

US 2018/0018858 A1 Jan. 18, 2018

Related U.S. Application Data

(63) Continuation of application No. 15/043,140, filed on Feb. 12, 2016, now Pat. No. 9,767,659, which is a continuation of application No. 14/517,674, filed on Oct. 17, 2014, now Pat. No. 9,317,123, which is a continuation-in-part of application No. PCT/US2013/032053, filed on Mar. 15, 2013.

(60) Provisional application No. 61/659,421, filed on Jun. 13, 2012, provisional application No. 61/659,452, filed on Jun. 14, 2012, provisional application No.
(Continued)

(51) Int. Cl.
*G05B 23/02* (2006.01)
*G08B 6/00* (2006.01)
*G06F 3/01* (2006.01)
*G05G 9/047* (2006.01)

(52) U.S. Cl.
CPC ............ *G08B 6/00* (2013.01); *G05G 9/047* (2013.01); *G06F 3/016* (2013.01)

(58) Field of Classification Search
CPC .................................. G06F 3/016; G08B 6/00
USPC ......... 340/4.12, 500, 407.1; 434/36–38, 113; 701/36
See application file for complete search history.

(56) References Cited

U.S. PATENT DOCUMENTS

| | | |
|---|---|---|
| 4,591,868 A | 5/1986 | Cusey et al. |
| 7,196,688 B2 | 3/2007 | Schena |

(Continued)

FOREIGN PATENT DOCUMENTS

| | | |
|---|---|---|
| WO | 2009018330 | 2/2009 |
| WO | 2013187977 | 12/2013 |

OTHER PUBLICATIONS

International Search Report and Written Opinion for PCT/US2013/032053 dated Jul. 25, 2013.
(Continued)

*Primary Examiner* — Toan N Pham
(74) *Attorney, Agent, or Firm* — Workman Nydegger

(57) ABSTRACT

Embodiments of the present disclosure relate devices, systems, methods, and for displaying information about the direction and magnitude of position, movement, and/or resistive force experienced for an object. The present disclosure also provides a shear display device that can generate skin shear with one or more tactors. The movement of the tactors can represent to a user various information about an object.

14 Claims, 42 Drawing Sheets

Related U.S. Application Data

61/660,162, filed on Jun. 15, 2012, provisional application No. 61/961,586, filed on Oct. 18, 2013.

(56) References Cited

U.S. PATENT DOCUMENTS

| | | |
|---|---|---|
| 8,004,052 B2 | 8/2011 | Vaganov |
| 8,125,453 B2 | 2/2012 | Shahoian et al. |
| 8,610,548 B1 | 12/2013 | Provancher |
| 9,317,123 B2 | 4/2016 | Provancher |
| 9,767,659 B2 * | 9/2017 | Provancher .............. G08B 6/00 |
| 2009/0139359 A1 | 6/2009 | Wagner et al. |
| 2010/0161079 A1 | 6/2010 | Cutkosky et al. |
| 2011/0115754 A1 | 5/2011 | Cruz-Hernandez |
| 2012/0038468 A1 | 2/2012 | Provancher |

OTHER PUBLICATIONS

European Search Report for EP13803464 dated Dec. 7, 2015.
U.S. Appl. No. 14/517,674, filed Dec. 17, 2015, Notice of Allowance.
U.S. Appl. No. 15/043,140, filed Dec. 16, 2016, Office Action.
U.S. Appl. No. 15/043,140, filed May 15, 2017, Notice of Allowance.

* cited by examiner

SKIN STRETCH FEEDBACK DEVICES, SYSTEMS, AND METHODS

CROSS-REFERENCE TO RELATED APPLICATIONS

The present application is a continuation of U.S. application Ser. No. 15/043,140, filed Feb. 12, 2016, which issued as U.S. Pat. No. 9,767,659 on Sep.19, 2017, which is a continuation of U.S. application Ser. No. 14/517,674, filed Oct. 17, 2014, which issued as U.S. Pat. No. 9,317,123 on Apr. 19, 2016, which is a continuation-in-part and claims the benefit of and priority to: Patent Cooperation Treaty Application No. PCT/US13/32053, filed Mar. 15, 2013, entitled "SKIN STRETCH FEEDBACK DEVICES, SYSTEMS, AND METHODS"; U.S. Provisional Patent Application No. 61/659,421, filed Jun. 13, 2012, entitled "SKIN STRETCH FEEDBACK DEVICES, SYSTEMS, AND METHODS"; U.S. Provisional Application No. 61/659,452, filed Jun. 14, 2012, entitled "SKIN STRETCH FEEDBACK DEVICES, SYSTEMS, AND METHODS"; U.S. Provisional Application No. 61/660,162, filed Jun. 15, 2012, entitled "SKIN STRETCH FEEDBACK DEVICES, SYSTEMS, AND METHODS"; and application Ser. No. 14/517,674 claims the benefit of U.S. Provisional Application No. 61/961,586 filed Oct. 18, 2013. The entire content of each of the above-referenced applications is incorporated herein by this reference.

GOVERNMENT RIGHTS

This invention was made with government support under IIS0746914 awarded by the National Science Foundation. The government has certain rights in this invention.

BACKGROUND

The field of haptics is the science of interfacing with users via the sense of touch by applying forces, vibrations, or motions to a user. Haptic devices are increasingly used to provide a user with sensory input that conveys information about the surrounding environment. For instance, a haptic device can produce vibratory motions to provide the user, through his or her sense of touch, with various types of information. Haptic devices are commonly used in the field of gaming to provide sensory cues related to the user's environment.

Ordinarily, haptic devices are integrated into controllers (e.g., joystick), so the user can receive haptic feedback that relates to movements of the controller and/or an object being controlled. Typical haptic devices provide vibratory or force stimuli to display information to the user. In some instances, however, such stimuli can interfere with the user's ability to accurately and/or safely manipulate the controller that provides such haptic feedback. For example, force feedback on a controller that is used to operate a crane can result in unintended movements of the user's hand, which may, in turn, move the controller to an unintended position, thereby causing an accident. Similar results occur in video games when utilizing a force feedback joystick to control game play; however, this resulting loss of control has less catastrophic consequences. Hence, in some instances, vibration feedback and especially force feedback may reduce safety of operation of a controller that integrates such haptic feedback mechanisms. This is especially of concern in safety critical applications, such as robotic surgery or catheterization. Such concerns are the reason why force feedback of tool tip forces are not currently permitted in robotically enabled surgical applications.

Accordingly, there is a need for skin stretch feedback devices, systems, and methods.

BRIEF SUMMARY

Embodiments of the present disclosure provide devices, systems, and methods for displaying information about direction of movement, speed, resistive force experienced, other aspects of movement for an object, or combinations thereof. The device can also be used to display or feedback a wide variety of information that has magnitude and/or direction associated with it (e.g., temperature, motion, pressure, force, volume, proximity, other information, or combinations thereof) or give guidance about where a person should move (e.g., to push forward on an aircraft control stick to prevent stall from occurring). More specifically, the present disclosure provides a shear display device that can generate skin shear with one or more tactors moving in a two- or three-dimensional space. The movement of the tactors can represent to a user various aspects of an object (e.g., object being controlled by the user or a controlled object).

At least one embodiment of the present disclosure includes a shear display device for displaying tactile information and cues to a user. Such the device may include a body, a first motor and a crank coupled to the first motor. The device also may include a slider slidably positioned within the body, a first end of the slider being coupled to the crank in a manner that rotation of the first motor produces a linear movement of the slider. In addition, the device may include a tactor coupled to the slider.

One or more embodiments may include another shear display device for displaying tactile information and cues to a user. The device may incorporate a body, a first actuator assembly at least partially located within or secured to the body, the actuator assembly. The actuator assembly may include a sliding housing, a first motor secured to the sliding housing, a worm coupled to the first motor, and one or more gears engaged with the worm, the one or more gears being oriented substantially orthogonally relative to the worm. Additionally, the actuator assembly may include a cam coupled to the one or more gears, wherein the body includes a slot configured to accept the cam in a manner that rotation of the cam within the slot and produces movement of the sliding housing relative to the body. Moreover, the device may include a first tactor coupled to the sliding body in a manner that the first tactor can move relative to the body.

In addition, embodiments of the present disclosure may include yet another shear display device for displaying tactile information and cues to a user. The device may have a body sized and configured to be grasped by the user's hand and an actuator assembly at least partially located within or secured to the body. The actuator assembly may include a motor, a crank coupled to the motor, and a flexible spine having a first end coupled to the crank in a manner that rotation of the motor in a clockwise direction moves the flexible spine in a first direction and rotation of the crank in a counterclockwise direction moves the flexible spine in a second direction that is opposite to the first direction. The device also may include a first tactor coupled to a second end of the flexible spine in a manner that the flexible spine moves the first tactor in the first and second directions.

Yet another embodiment of the present disclosure may include one other shear display device for displaying tactile information and cues to a user. The device may have a body and a first tactor having a first area, the first tactor being positioned and oriented relative to the body to engage a portion of the user's skin having a first density of mechanoreceptors. The device also may include a second tactor having a second area, the second tactor being positioned and oriented relative to the body to engage a portion of the user's skin having a second density of mechanoreceptors. Furthermore, the second area may be greater than the first area, and the first density of mechanoreceptors may be greater than the second density of mechanoreceptors.

Embodiment also may include still one other shear display device for displaying tactile information and cues to a user. The device may incorporate a body having an elongated portion and a first tactor positioned along the elongated portion of the body, the first tactor being movable along a length of the elongated portion of the body. The device also may have a second tactor positioned along the elongated body, the second tactor being movable along the length of the elongated portion of the body, the second tactor being opposite to the first tactor. In addition, the device may include a third tactor positioned along the elongated body, the third tactor being movable along the length of the elongated portion of the body. In addition, the device may include a fourth tactor positioned along the elongated body, the fourth tactor being movable along the length of the elongated portion of the body.

Additional or alternative embodiments may include one other shear display device for displaying tactile information and cues to a user. The device may have a body and a first tactor having a first area, the first tactor being positioned and oriented relative to the body to engage a portion of the user's skin having a first density of mechanoreceptors. The device also may include a second tactor having a second area, the second tactor being positioned and oriented relative to the body to engage a portion of the user's skin having a second density of mechanoreceptors. Furthermore, the first area may have a first proportion relative to the first density of mechanoreceptors, while the second area may have a second proportion relative to the second density of mechanoreceptors. In addition, the first proportion and the second proportion may be approximately the same. One or more embodiments may include a control system for controlling an object and receiving tactile feedback about the movement of the object, forces experienced by the object, torques experienced by the object, and combinations thereof. The system may include a shear display device including, which may have a body, an actuator assembly at least partially located with or secured to the body, and a first tactor coupled to the actuator assembly, the first tactor being movable in a two-dimensional or a three-dimensional space by the actuator assembly. The system also may include a controller operably connected to the shear display device, the controller being configured to receive instructions from the shear display device and to communicate the instructions to a controlled object.

Embodiments of the present disclosure also may involve a method for displaying movement information related to one or more objects as well as information about torque or rotational motion experienced thereby. The method may include receiving information about one or more of rotation of an object and torque experienced by the object, isolating a first portion of a user's skin relative to a body of a shear display device, and moving a first tactor of the shear display device in a first direction along a linear path, the first tactor being in contact with the isolated first portion of the user's skin. The method also may include isolating a second portion of a user's skin relative to a body of the shear display device and moving a second tactor of the shear display device in a second direction along a linear path, the second tactor being in contact with the isolated second portion of the user's skin, the second direction being opposite to the first direction.

Also, embodiments may include a method for displaying information about a change in size of an object. The method may include receiving information about the change in size of the object, isolating a first portion of a user's skin relative to a body of a shear display device, and moving a first tactor of the shear display device in a first direction along a linear path, the first tactor being in contact with the isolated first portion of the user's skin. The method also may include isolating a second portion of a user's skin relative to a body of a shear display device and moving a second tactor of the shear display device in a second direction along a linear path, the second tactor being in contact with the isolated second portion of the user's skin, the second direction being opposite to the first direction and away from or towards the first tactor.

The methods described herein may be performed by a processor, such as a microprocessor. For example, at least one method described herein may be encoded in instructions that are executable by a processor and/or may be stored in a computer readable medium and/or computer storage device.

Additional features and advantages of exemplary implementations of the disclosure will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. For better understanding, the like elements have been designated by like reference numbers throughout the various accompanying figures. Understanding that these drawings depict only typical embodiments of the disclosure and are not therefore to be considered to be limiting of its scope, the disclosure will be described and explained with additional specificity and detail through the use of the accompanying drawings in which:

FIG. 14C-2 is a front view of the shear display device of FIG. 14C;

FIG. 14C-3 is a right side view of the shear display device of FIG. 14C;

FIG. 14C-4 is a top view of the shear display device of FIG. 14C;

FIG. 14C-5 is a bottom view of the shear display device of FIG. 14C;

FIG. 14C-6 is a back view of the shear display device of FIG. 14C;

FIG. 14C-7 is a left side view of the shear display device of FIG. 14C;

FIG. 14D-2 is a front view of the shear display device of FIG. 14D;

FIG. 14D-3 is a right side view of the shear display device of FIG. 14D;

FIG. 14D-4 is a top view of the shear display device of FIG. 14D;

FIG. 14D-5 is a bottom view of the shear display device of FIG. 14D;

FIG. 14D-6 is a back view of the shear display device of FIG. 14D;

FIG. 14D-7 is a left side view of the shear display device of FIG. 14D;

DETAILED DESCRIPTION

Figure 1A:
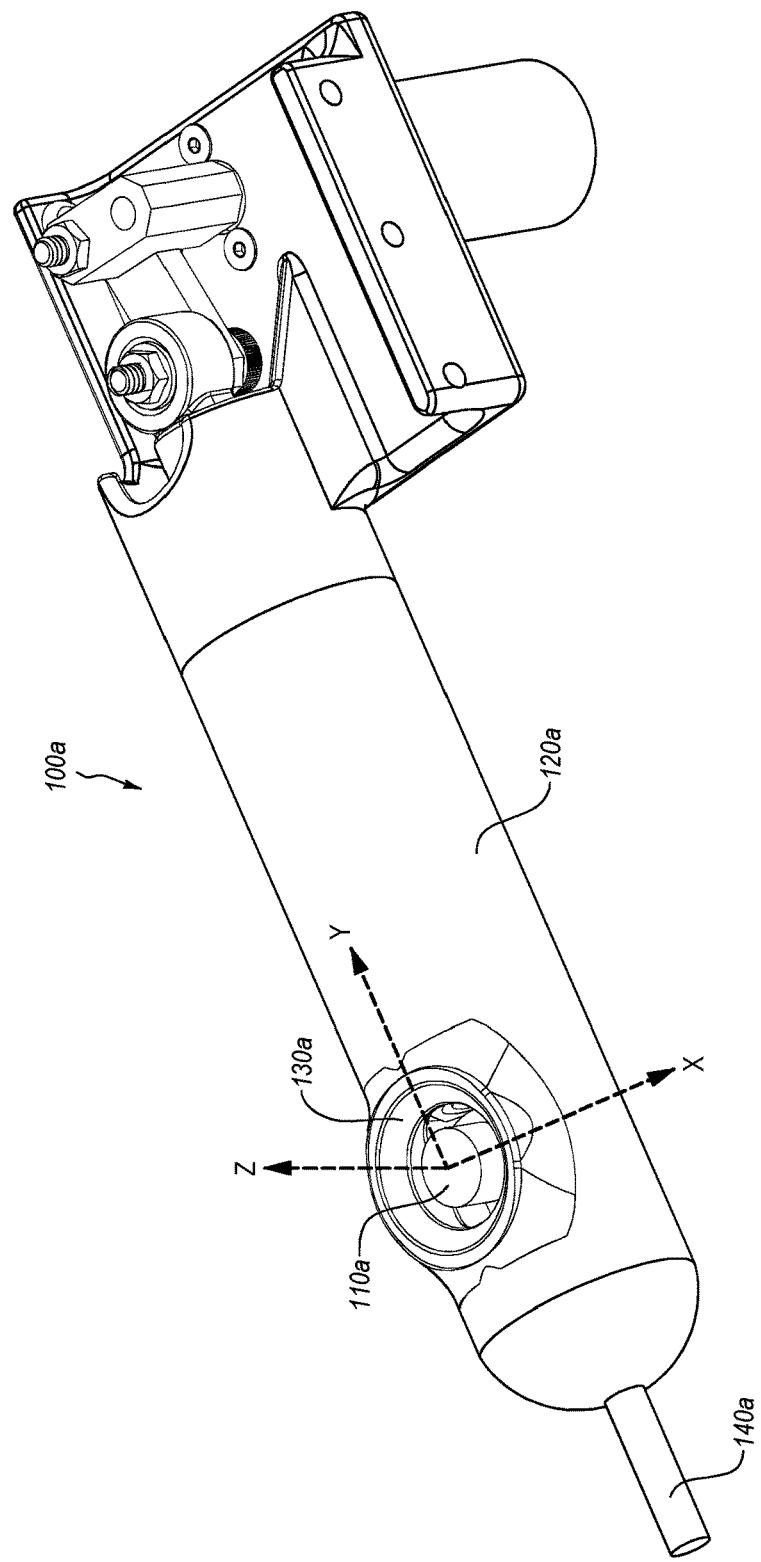
FIG. 1A illustrates a perspective view of a shear display device in accordance with one embodiment of the present disclosure.

Embodiments of the present disclosure provide devices, systems, and methods for displaying information about direction of movement, speed, resistive force experienced, other aspects of movement for an object, or combinations thereof. The device can also be used to display or feedback a wide variety of information that has magnitude and/or direction associated with it (e.g., temperature, pressure, volume, proximity, other information, or combinations thereof) or give guidance about where a person should move (e.g., to push forward on an aircraft control stick to prevent stall from occurring). More specifically, the present disclosure provides a shear display device that can generate skin shear or skin stretch with one or more tactors moving in a two- or three-dimensional space. The tactors (or contactors) are the moving contacts between the shear display device and the user's skin, and the terms shear display, shear feedback, skin stretch, and skin stretch feedback are used interchangeably to refer to tactile cues provided via stretching one or more portions of the user' skin. The movement of the tactors can represent to a user various aspects of the movement of the object (e.g., object being controlled by the user or a controlled object). As used herein, the use of the term "controlled object" also includes the user's own body, limbs, arms, fingers, and hand.

For instance, the movement of the tactors can represent linear (or translational) direction and/or speed of the object's movement, or that a user should translate their hand or limb in two- or three-dimensional space. Furthermore, the movement of the tactors also can represent rotation of the object in two- or three-dimensional space, or that a user should rotate their hand or limb in two- or three-dimensional space. Similarly, movement of the tactors can display information about force and/or torque experienced by the object. With such information, the user may direct movement of the object (or their limbs) more accurately. For example, the user can control the amount of force applied by the controlled object onto another body as well as location and/or direction of the force. A controlled object can be any automated or semi-automated vehicle, tool, or other implement, movement of which can be directed by a controller. Examples of controlled objects include controlled servo and stepper motors or other actuators, computer controlled machines, vehicles, robots, etc. A controlled object could also include the human user, e.g., for using shear feedback to guide their limb motions during physical therapy.

Additionally, while providing information about various aspects of movement (e.g., acceleration, velocity, etc.) and/or location (e.g., orientation, position, etc.) of the controlled object, at least some embodiments of the shear display device do not generate gross motion of the user's hand (or other body part) that is in contact with the shear display device. In particular, the shear display device can be part of a controller (e.g., a joystick) that directs movement of the controlled object. The controller with shear feedback can allow the user to control or direct the controlled object, while displaying information about the controlled object's movement (i.e., through skin stretch rather than gross movement of the joystick). Moreover, the controller with shear feedback can display movement information (i.e., through skin stretch) without affecting the movement and/or location of the user's hand such as to interfere with the operation of the controller. In other words, in one or more embodiments, while the shear display device provides or (physically) displays information to the user, the shear display device does not move the user's limb, but rather only a small portion of the skin of the user's body, which may include the user's head, arm, hand, finger, other body part, or combinations thereof (for multiple tactors).

In some embodiments, the shear display device also can provide a simulated force feel to the user's hand, finger, or another body part. More specifically, the skin shear produced by the shear display device can be similar to the sensation otherwise felt by the user while using an actual tool, similar to the tool that is being controlled and operated by an automated system (e.g., a robot). Hence, for example, a surgeon can receive shear feedback while controlling an automated or robotically controlled scalpel, and such shear feedback can approximate the shear that a manual scalpel would produce on the skin of the surgeon's hand. Shear feedback can also be used to provide force information or guidance cues for procedures such as catheterization, rehabilitation, laser/bone/vascular etc. surgery, or resection. For example, when used for rehabilitation, shear feedback can guide a person's limb motions as part of physical therapy, etc.

In some embodiments, a controller can detect when the user is not in contact with the tactor of the shear display device. For instance, the shear display device can include a touch sensor, which can recognize contact with user's skin (or lack thereof). This sensor could include, but is not limited to a capacitive sensor, electrostatic sensor, contact switch, force sensor, etc. Accordingly, the shear display device and/or the controller can respond to loss of contact with the user's skin, in a manner that would avoid displaying inaccurate information to the user. For example, if loss of tactor's contact with the user's skin is detected, the tactor can move to its default position (e.g., an origin or zero position, such as a center of a finger well) and cease all further operation, until contact is reestablished. Once contact is reestablished, the tactor can once again commence displaying information to the user. Additionally, the shear display device can alert the user about the loss of contact with the tactor as well as about reestablishment of contact (e.g., by providing an audible alert).

The tactor of a shear display can also be coupled to or have a force sensor embedded within it. This force sensor can be used for the above purpose of knowing when the user's hand is in contact with the shear tactor(s). The force sensor can also be used as a user input for the controller, similar in spirit as a ThinkPad laptop's TrackPoint cursor control sensor. Alternatively or in addition, this embedded force sensor can also be used to more generally measure user interaction forces with the shear display's tactor(s). These force sensors may provide a means to control translational and rotational input or motion to a device, object, robot, vehicle, or other computer controlled system. As will be described below, whereas like motion of multiple tactors can be used to provide translational information such as direction cues or display of object interaction force or motion, and the differential motion of multiple shear tactors can be used to present rotational information to the user, a user is also able to provide translational and rotational input to the force sensors on the multiple tactors in an analogous manner. That is, if the user applies the same force in the same direction to multiple tactors, this would cause a pure translational input to the control system, and if the user applies the same force in opposite directions (i.e., a force couple) to multiple tactors, this would cause a rotational input to the control system.

If different forces are applied to the two (or more) aforementioned force sensors, the force direction and magnitude can be taken into account in determining the meaning of this input. One intuitive means to interpret having different inputs force vectors applied to multiple tactors would be to solve for the resultant forces and torques on the system of force sensors. Hence, one would examine the applied force vectors and the relative location of the force sensors in order to solve for the net translational force and moment applied to the system of force sensors. This can provide a means to provide multidimensional input control, including rotations, of a system using multiple 2- or 3-degree-of-freedom translational force sensors. This provides the ability to measure user input through applied forces on the shear display tactors, as opposed to just capturing the user's motion by tracking the position of the held or strapped-on shear display (e.g., by putting the shear display on a robot arm or by using some type of non-contact motion tracker). Furthermore, this scheme of capturing user input from one or more tactors with embedded force sensors is the "input" equivalent of moving the tactors together to give translational direction/motion/force cues or feedback and moving the tactors differentially to give rotational direction/motion/force etc., cues or feedback (which will be discussed further below).

Note, that in addition to tracking the position of the shear display by mounting it on the end of a robotic arm (with force feedback) or kinematic arm (without force feedback), it is also possible to utilize single or multiple shear displays within a shear display device or device with embedded shear feedback in combination with any type of motion tracking system to provide tactile feedback. This tactile feedback can be used to provide relevant situational or control information. For example, a device with single or multiple shear displays within it could be paired with a wireless camera system (e.g. XBOX KINECT) or other motion system (e.g., NINTENDO WII WIIMOTE motion/position sensor, or SONY MOVE motion sensor), other non-contact motion sensing (e.g., POLHEMUS, RAZER HYDRA, flock of birds inductive/electromagnetic motion sensors or ultrasound motions sensors) and used to provide feedback in a teleoperation, virtual reality, or gaming interaction. Information displayed via shear display can coordinate to the user's interaction within those environments, and/or the user's current motion. Other motion sensors can also be used to provide feedback via shear display based on user interaction in the above environments, such as tilt sensors, inertial sensors, gyros, accelerometers, magnetometers, or other position or motion sensors. Note that inertial sensing and some forms of non-contact position sensing also make it so that no explicit absolute position sensing is necessary, yet this sensor information can provide information that can be used by the control system and fed back to a user via shear feedback. Interaction from force sensors such as a force sensor in the user's chair or floor (e.g., WIT FIT board) can also be used to provide content to be portrayed via skin stretch feedback using a shear display. Again use of multiple force sensors on the tactors of a shear display device can be used to provide translational or rotational inputs to a control system.

Examples of types of information that can be portrayed along with how it can be displayed, includes: impact can be displayed by rapidly moving the tactor in the direction of the impact force, the velocity of an object or the person can be displayed via shear feedback by moving the tactor with a relative position proportional to the orientation and magnitude of the object's velocity vector. Forces are also similarly mapped to tactor motions by displaying a force vector as a scaled tactor displacement vector. The tilt of an object can also be portrayed via shear feedback by mapping the tilt angle or change in gravitational forces to a proportional amount of skin stretch feedback whose orientation corresponds to the direction an object is tilted (e.g., this could provide feedback as a user tilts their smart phone while playing a game). Another example would be to display skin stretch feedback in a driving game whose tactor motion is proportional to the inertial forces felt by the driver. As another example, if the orientation of the user's hands or arms is tracked then the orientation of the shear feedback could also be corrected to correspond to changes in the user's orientation with respect to the frame of reference of the forces, which may be useful while conducting upper extremity rehabilitation.

Any other quantities that have a vector and/or magnitude could also be displayed via shear feedback, e.g., life meter in a shooter game, sonar map that shows the location of enemies, which could be displayed by an outbound pulse-type motion in the direction of the target on the heads up map. This application could have performance advantages as the gamer won't need to refer to the visual heads-up display window as much to monitor this information. Likewise, skin stretch feedback could be used to point to an open player in a sports game using a radial tactor motion in the direction towards the open player and then return to center. The tactor motion could move repeatedly in an AC coupled fashion, or could simply move the tactor in the radial direction towards the open player and persistently point in the direction of interest until this information is no longer valid (before the tactor would return to center). Giving AC coupled cues has the advantage in that they are repeated and a user can sometimes (physically or cognitively) miss an initial tactor motion. The tactors location can also be used to provide feedback on the relative location or motion of an object within a game or virtual reality scenario.

It should be noted that various modes of user interaction are described herein. For example, the use of force feedback, shear display via skin stretch (using tactors), force detection (using tactors and force sensors), and other modes of user interaction are described. These descriptions are not meant to be limiting in any way. Force feedback, shear display via skin stretch, force detection, other user interaction modes, or combinations thereof may be used to interact with the user. Furthermore other modes of user interaction including visual feedback, auditory feedback, haptic feedback, olfactory feedback, even gustational (i.e. taste) feedback, other sensory feedback, or combinations thereof may be used to interact with the user. Haptic feedback, for example, may include vibrotactile feedback. In addition or alternative to these various types of feedback, other modes of receiving user feedback may be used. In addition or alternative to force detection, other user feedback detection may be used. For example, motion capture (including video), sound detection (including but not limited to voice recognition), other user feedback detection, or combinations thereof. Furthermore, it should be clear that any of the user feedback modes and the user feedback detection modes may be used individually or in combination with each other.

In one embodiment, using shear (or skin stretch) feedback in combination with force feedback may reduce the amount of force feedback necessary to lower (or even safe) levels. This may, in the event that there are sensing errors with force feedback alone, reduce instabilities. Thus, using force feedback with skin stretch feedback may enhance/increase the perceived force or stiffness (or other force information such as friction, damping, etc.) reducing the amount of force feedback required. Providing force feedback in combination with skin stretch feedback may be more intuitive because the forces and force directions, though weak in some cases, can still be perceived and may help people more intuitively interpret the skin stretch cues, especially when moving with more spatial motions (i.e., not confined to a plane) or when judging real physical mechanical properties such as stiffness, damping, mass, friction, etc. Furthermore, when using torque feedback and shear feedback to provide rotational (i.e., torque or other rational indicators), less torque feedback may be necessary, due to the complementary rotational shear feedback (from differentially moving tactors) cues. Other advantages are also considered.

Furthermore, as described herein shear feedback may be used with various procedures. For example, shear feedback may be used to guide hand motions. This guidance may come through directional shear feedback cues, force/torque feedback cues, other cues, or combinations thereof. In the context of catheterization with a shear feedback and/or force feedback device, these cues may be used to help a user stay within a predetermined path.

For ease of description, the various modes of user interaction that are described herein have been generally presented. These modes of user interactions in addition to any other modes of user interactions may be used for these procedures.

Referring now to the figures, FIG. 1A illustrates one embodiment of a shear display device 100a that has a tactor 110a, which can provide tactile cues and display information to a user. The tactor 110a can be at least partially located within a body 120a. In some instances, the body 120a can be cylindrical; however, other shapes of the body 120a can be suitable, depending on the particular use of the shear display device 100a. Generally, the body 120a can have a suitable configuration for being grasped by the user and/or to provide a reasonable means for the user to lay their hand and/or fingers on the shear display device 100a. The shear display device 100a also can include a well 130a, which can isolate the user's skin with respect to the body 120 and/or near or about the tactor 110a, such that the movement of the tactor 110a can stretch the user's isolated skin. For instance, the well 130a can isolate skin on the user's finger (or fingertip), such that the tactor 110a can create skin stretch thereon without physically moving the user's finger in any substantial manner. Among other things, the well 130a may be configured as an aperture or an orifice. In any event, the well 130a can have a suitable shape, size, and configuration (e.g., position and orientation relative to the tactor 110a) to restrain the user's skin relative to the tactor 110a and may also assist in grasping the shear display device 100a.

The tactor 110a can move in a two-dimensional space (or in three-dimensional space in some embodiments, though the discussion with respect to FIG. 1A will be mostly focused on two-dimensional space) and, when in contact with the user's skin, can cause skin stretch by such movements. In particular, the tactor 110a can move along X- and/or Y-axes, indicated in FIG. 1A. Moreover, the tactor 110a can move simultaneously along both X- and Y-axes. As such, the tactor 110a can have linear or nonlinear movement in any direction. The skin stretch, experienced by the user can provide cues and information (e.g., directional information) to the user. For example, a linear movement of the tactor 110a can represent a linear movement of the object being controlled by the user. Such movement can be represented in any direction in a two-dimensional space.

Hence, via movement of the tactor 110a, the shear display device 100a can provide any number of directional cues or types of directional information. In at least one embodiment, the shear display device 100a can provide shear feedback that relates linear movement of an object (e.g., a controlled object, the shear display device 100a, or any other predetermined object or entity, whether real or virtual) with the movement of the tactor 110a. For instance, movement of the tactor 110a in a first direction can indicate to the user that an object also has moved in the first direction. Alternatively, movement of the tactor 110a in the first direction can signal to the user that a destination is located linearly in the first direction from the user or from a controlled object. In other words, movement of the tactor 110a also can indicate direction where it may be desirable for the user to move a controlled object. Accordingly, the shear display device 100a can guide the user (or user's hand) and can provide cues for controlling the controlled object (e.g., directing the controlled object to move in a certain desirable direction).

Likewise, the shear display device 100a can display force information. For example, movement of the tactor 110a in the first direction can indicate a force applied to the controlled object, which is acting on the first object in the first direction. Hence, the user can quickly determine the direction of the force being applied to the controlled object. Additionally or alternatively, the shear display device 100a can indicate a relative amount of force experienced by the controlled object. For instance, relatively slow movement and/or relatively small displacement of the tactor 110a in the first direction can indicate a relatively small or insignificant force acting on the controlled object. By contrast, a relatively fast movement and/or relatively large displacement of the tactor 110a can indicate a relatively large force acting on the controlled object.

Similar to linear movements and forces, the shear display device 100a also can display rotational and/or torque information related to an object or entity (e.g., related to the controlled object). Rotational information can relate to in-plane rotation of an object (e.g., a controlled object, the shear display device 100a, or any other predetermined object or entity, whether real or virtual). For example, the tactor 110a can move in a substantially or approximately circular or semicircular manner about a predetermined point (e.g., about an original or default position of the tactor 110a or another point). In other words, the tactor 110a can move simultaneously along X- and Y-axes in a manner that produces a spiral, circular or semicircular movement. In any event, movement of the tactor 110a can appear to the user as a circular or semicircular movement.

Circular and/or semicircular movement of the tactor 110a can represent rotation of the controlled object and/or torque experienced thereby. More specifically, the rotational movement of the tactor 110a can represent, for instance, the rotation of the object or the magnitude of the torque applied thereto. In one example, the tactor 110a generally moves about and within the diameter of the well. In other embodiments, the diameter of the circular or semi-circular path may be used to communicate the orientation or rotation of the object or the magnitude of the torque applied thereto. In further embodiments, other shapes or paths of the tactor 110a may be used to describe the motion (i.e., force or velocity) of the controlled object.

Additionally or alliteratively, the tactor 110a can rotate about a point. In other words, rather than moving in a circular or semicircular path as described herein, the tactor 110a may rotate about a point. Such rotation (in place) also can represent rotation of an object and/or can convey information about the object's rotation and/or the torque experienced thereby. Similarly, to display the orientation of the object's rotation and/or the torque experienced thereby, the tactor 110a can have a related rotation or motion that can produce corresponding skin stretch in the user's hand, finger, or other body part. In other embodiments, a combination of the circular or semicircular movement as well as rotation of the tactor 110a may be used. For instance, the tactor 110a may rotate about its own axis as it also moves in a circular or semi-circular manner about a point.

In additional or alternative embodiments, the shear display device 100a also can provide information through a pattern or sequence of movements. For instance, the tactor 110a can have repeated movement or a series of repeated movements in a direction within the plane of the shear display. Such interrupted movement provides "AC coupled" or pulsing directional information (force, direction, displacement, motion, etc.). That is, movement of the tactor 110a can be pulsed with the direction and/or magnitude of the directional information to be provided. This directional information can also be done through sustained movements of the tactor, through "DC coupled" feedback. In this mode, the tactor 110a is moved to a position that represents the direction and/or magnitude of the directional information (force, direction, displacement, motion, etc.) and is held in this position until the tactor is moved back to its center position to indicate that that the user should stop moving, that force now zero, etc.).

In at least one embodiment, the information displayed by the shear display device 100a via movements of the tactor 110a that produce skin stretch can reflect the movement of the shear display device 100a as well as the movement of the controlled object or any other predetermined object or entity. In some instances, direction and/or speed of movement or acceleration of the tactor 110a can represent movement of the controlled object. For example, if the controlled object moves slowly, the tactor 110a also can move correspondingly slowly (i.e., at the same or proportional rate of speed as the controlled object) and in the same direction as the controlled object, thereby signaling to the user the speed and direction of movement of the controlled object. The tactor 110a could also signal the speed and direction of motion by moving the tactor 110a a first distance and in a first direction (e.g., from a center or default position of the tactor 110a). The first distance and the first direction can be proportional to and may correspond with the object's velocity.

In some embodiments, the shear display device 100a also can be a controller that directs movements of a controlled object (i.e., sends information necessary to move or operate such controlled object). For instance, the shear display device 100a can include a mounting shaft 140a, which can couple to a corresponding control mechanism (e.g., a gimbaled sensor, a force feedback device such as a Phantom Robot Arm, etc.). As further described herein, the control mechanism can detect movements of the shear display device 100a and can send instruction to a controller for directing the controlled object.

In additional or alternative embodiments, the shear display device 100a also can send control signals or instructions to a controller without being physically connected to the control mechanism. For instance, the shear display device 100a can incorporate wired or wireless tracking mechanisms that can interface with or can be incorporated into the control mechanism and can detect movements and/or position (or change thereof) of the shear display device 100a, which can be provided by the control mechanism as instructions for the controlled object. Furthermore, the tactor 110a can also include a force sensor in communication therewith. Consequently, the force sensor can send directional information to the control mechanism or to the controller, which can provide corresponding instruction to the controlled object.

In addition, as further described herein, the shear display device 100a can display information along a Z-axis. In other words, the shear display device 100a can provide information about three-dimensional movements, forces, torques, positions, etc. For instance, the tactor 110a can move outward or inward (i.e., toward or into the user's skin and away from the user's skin) to display information related to movement and/or force along the Z-axis of an object. Hence, movement of the tactor 110a along the Z-axis can provide information about the object, which is similar to the information described herein in connection with two-dimensional movement of the tactor 110a.

Moreover, movement of the tactor 110a along the Z-axis can be independent of the movements along the X- and/or Y-axes. Hence, the tactor 110a can move in any number of patterns or directions in three-dimensional space. For example, the tactor 110a can move in any one or more of the X-Y, X-Z, and Y-Z planes. Also, such movement can be along any desired path (e.g., circular path in the X-Z plane), which can indicate movement or position of as well as forces or torques experienced by the object.

Figure 1B:
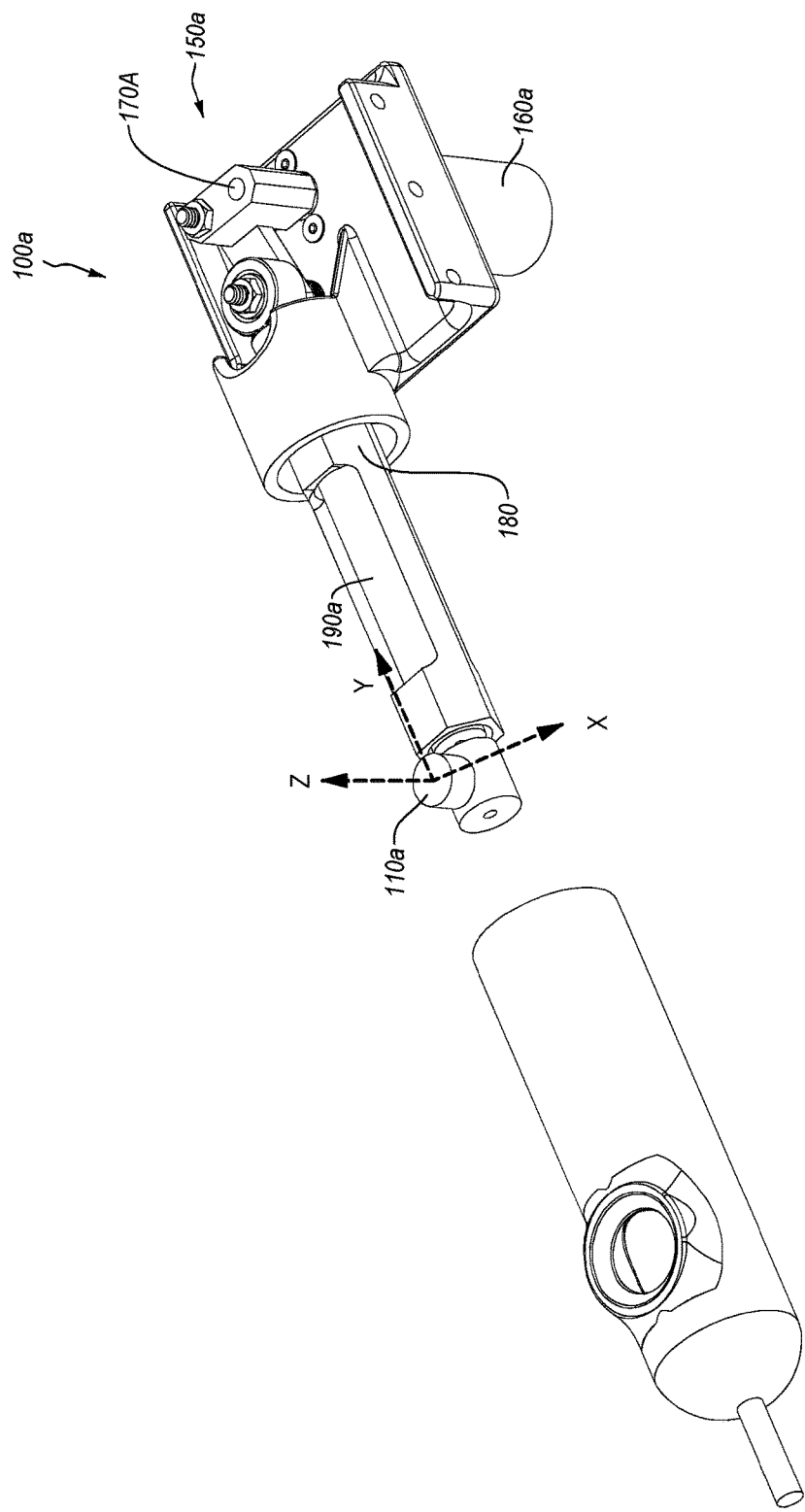
FIG. 1B illustrates an exploded perspective view of the shear display device of FIG. 1A.

The tactor 110a can be actuated in a number of ways. For example, as illustrated in FIG. 1B, the actuator assembly of the shear display device 100a can include a crank-slider mechanism 150a connected to a first motor 160a. The crank-slider mechanism 150a can include a crank 170a connected to the first motor 160a and a slider 180a coupled to the tactor 110a. As the first motor 160a rotates, the crank 170a moves the slider 180a, thereby producing linear motion of the tactor 110a (e.g., along Y-axis). Accordingly, the crank mechanism 150a can produce linear motion of the tactor 110a in response to the rotation of the first motor 160a.

The actuator assembly of the shear display device 100a also can include a second motor 190a. The second motor 190a can be located within or secured to the slider 180a. In any event, the second motor 190a can move (e.g., along the Y-axis) with the slider 180a. The second motor 190a also can be coupled to the tactor 110a and can generate rotation of the tactor 110a, for example, with respect to a center axis of the slider 180a. Moreover, operation of the motor 160a and of the second motor 190a can be independent of each other. As such, tactor 110a can move independently in two-dimensions.

It should be noted, that the range of motion of the tactor 110a can be relatively small (e.g., 0-1 mm, 0-2 mm, 0-5 mm). Accordingly, radial motion of the tactor 110a produced by the second motor 190a can appear as substantially linear motion to the user (e.g., as a linear motion along the X-axis). In other words, the first motor 160a may generate linear motion in the y-direction or along the Y-axis and the second motor can generate substantially linear motion in the x-direction or along the X-axis. The movement produced by the second motor 190a and by the first motor 160a (together with the crank mechanism 150a), when combined together, can produce any number of movements or movement patterns of the tactor 110a, such as the movements and movement patterns described herein. Particularly, the tactor 110a can be moved in a linear manner in any direction. Similarly, the tactor 110a also can be moved in a nonlinear manner in any direction. For example, the tactor 110a can be moved in a circular semicircular or other nonlinear manner.

The movement produced by the second motor 190a and by the first motor 160a (together with the crank mechanism 150a), when combined together, can produce any number of movements or movement patterns of the tactor 110a. Particularly, the tactor 110a can be moved in a linear manner in any direction. Similarly, the tactor 110a also can be moved in a nonlinear manner in any direction. For example, the tactor 110a can be moved in a circular semicircular or other nonlinear manner.

Figure 2A:
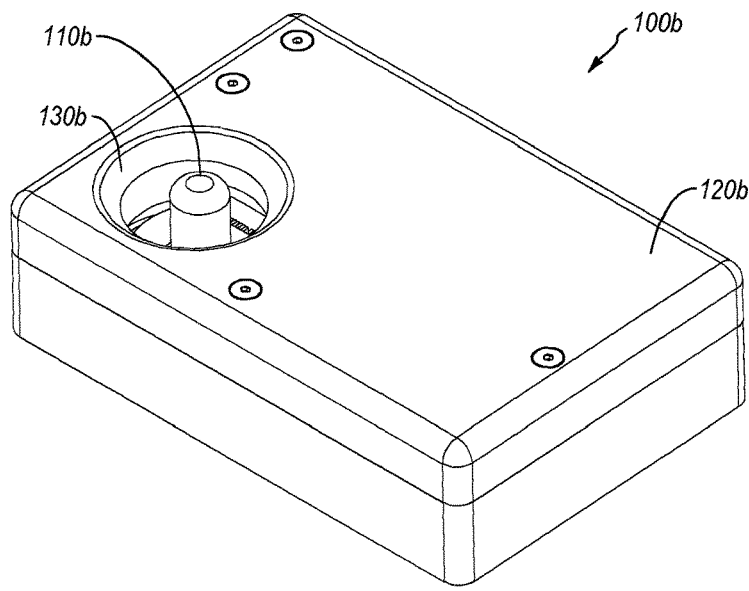
FIG. 2A illustrates a perspective view of a shear display device in accordance with another embodiment of the present disclosure.

Although the description herein relates to a shear display device that has an approximately cylindrical form factor, it should be appreciated that this disclosure is not so limited. Moreover, in light of this disclosure it should be appreciated that the form factor of the shear display device can vary from one embodiment to another. For instance, as illustrated in FIG. 2A, at least one embodiment includes a shear display device 100b that has a flat or box-like (e.g., rectangular) body 120b. Except as described herein, the shear display device 100b and its components and elements can be similar to or the same as the shear display device 100a (FIGS. 1A-1B) and its respective components and elements.

For example, as illustrated in FIG. 2A, the shear display device 100a can include the tactor 110b located within a well 130b, which can at least partially constrain user's skin in contact therewith. The tactor 110b can display the same or similar information as can be displayed by the tactor 110a of the shear display device 100a (FIGS. 1A-1B). Moreover, the tactor 110b can represent such information by the same or similar movements and movement sequences as described herein in connection with the shear display device 100a (FIGS. 1A-1B). In certain applications, however, the rectangular body 120b of the shear display device 100b may present a user with a more convenient or ergonomic interface than, for instance, the shear display device that has a cylindrical configuration.

Moreover, the well 130b and the tactor 110b can be located essentially anywhere on the body 120b. For instance, the well 130b and the tactor 110b can be located near one or more edges of the body 120b (e.g., near a corner of the body 120). It should be appreciated, however, that the well 130b and the tactor 110b also can be located away from one or more edges of the body 120 (e.g., near a center point of the body 120), as may be desirable for a particular application.

Figure 2B:
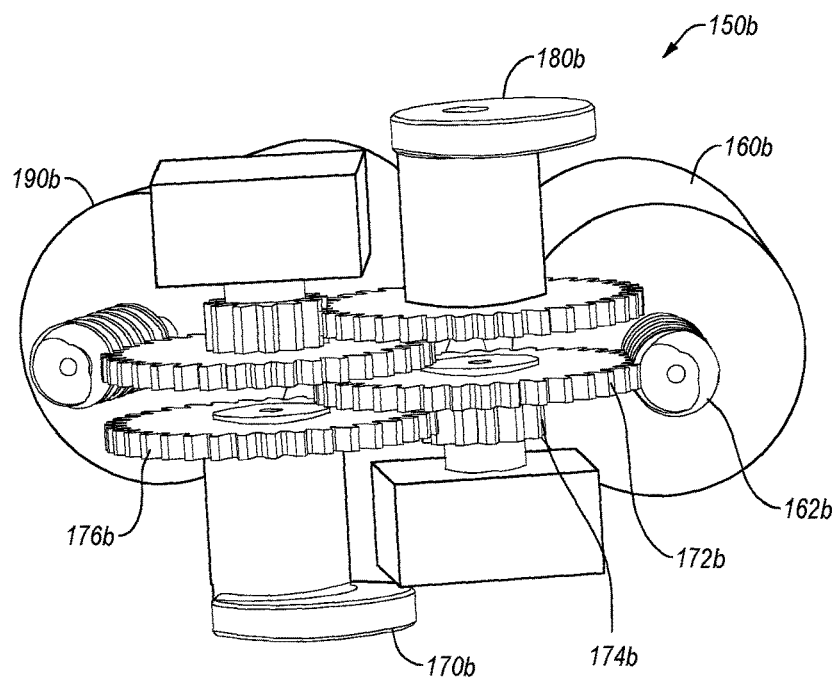
FIG. 2B illustrates a perspective view of an actuation mechanism in accordance with one embodiment of the present disclosure.
Figure 2C:
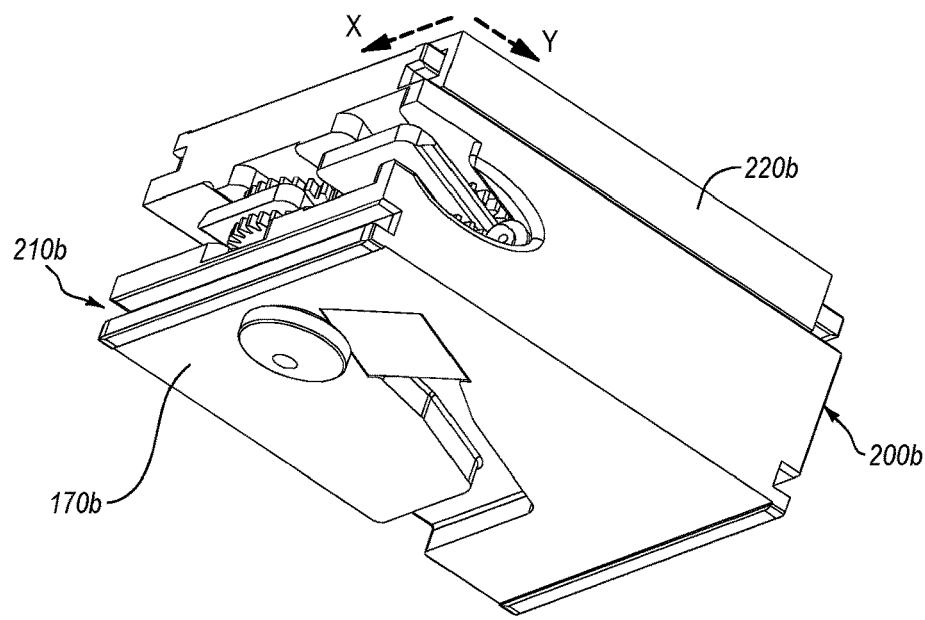
FIG. 2C illustrates a bottom perspective view of an actuator assembly that incorporates the actuation mechanism of FIG. 2B.
Figure 2D:
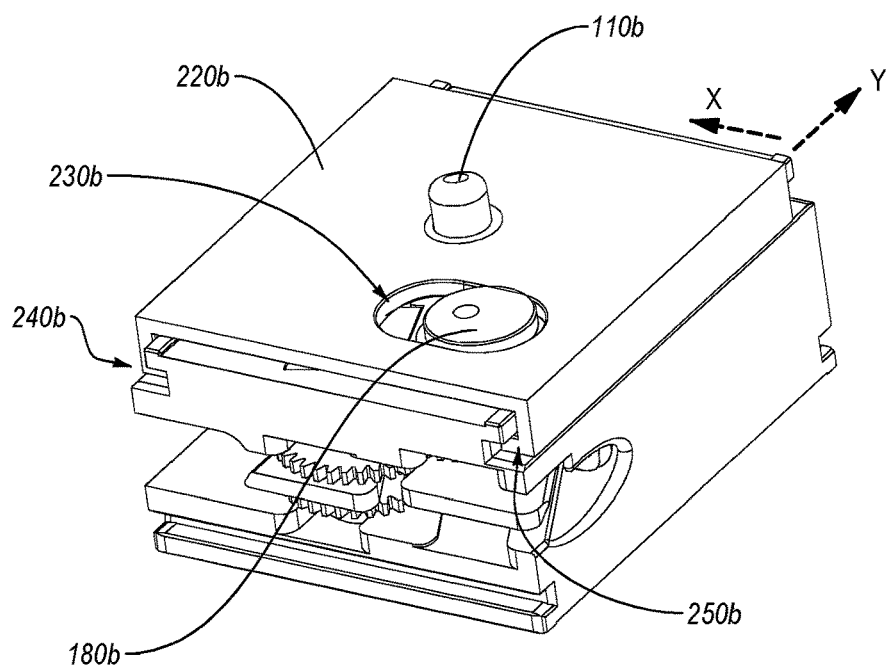
FIG. 2D illustrates a top perspective view of an actuator assembly that incorporates the actuation mechanism of FIG. 2B.

Also, flat or rectangular form factor of the shear display device 100b can allow for additional or alternative actuation mechanisms or actuator assemblies (e.g., as compared with the shear display device 100a (FIGS. 1A-1B)), which can move the tactor 110b relative to the well 130b. In one example, as illustrated in FIG. 2B, an actuator assembly of the shear display device 100b can include one or more actuator assemblies, which can comprise a cam actuation mechanism 150b. More specifically, the cam actuation mechanism 150b can include first and second motors 160b, 190b which can move or rotate respective first and second cams 170b, 180b. As described herein in more detail, rotation of the first and second cams 170b, 180b can result in movement of the tactor 110b relative to the body 120b. As shown in FIGS. 2B-2D, the first and second cams 170b, 180b are shown as eccentric circular pins that move within a slot to provide relative motion.

In one embodiment, the first motor 160b can be coupled to the first cam 170b through a series of gears. For example, the first motor 160b can have a worm 162b coupled to a shaft thereof, which engages a worm gear. The worm 162b can be engaged with a worm/spur gear 172b of a first diameter. In some embodiments, the connection between the worm 162b and the worm/spur gear 172b can be a reducer and can provide mechanical advantage (i.e., can produce higher torque at the rotation of the first gear 172b than produced by the first motor 160b). As such, one rotation of the worm gear 162b can produce less than one rotation of the spur gear 172b. The significant mechanical advantage that may be provided by a worm gear can reduce the required space and also may reduce the meshing velocity of spur gears at the next stage of the transmission. The reduced meshing velocity of the spur gears can greatly reduce the noise produced by a geared transmission, and the meshing of worm gears in the first stage of the transmission is inherently quieter than the meshing of spur gears. Use of helical gears rather than standard spur gears can further reduce the transmission noise.

Additionally or alternatively, the spur gear 172b can be coupled to or operatively connected with the first cam 170b, as described further below. For example, the spur gear 172b can be coupled to a spur gear 174b of a second diameter (e.g., the spur gears 172b, 174b can be coupled together and may rotate together about a shaft). Moreover, the spur gear 174b can be engaged with a spur gear 176b, which can be coupled with the first cam 170b. The spur gears 172b and 176b can have substantially the same diameter, while the spur gear 174b can have a smaller diameter. Accordingly, connection between the spur gears 172b, 174b, 176b also can be a reducer and can provide mechanical advantage.

Mechanical advantage provided by the connection between the worm 162b and the worm/spur gear 172b and/or by the connection between the spur gears 172b, 174b, 176b can transfer more force to the movement of the tactor. Additionally, such connection can reduce the angle of rotation of the first cam 170b relative to the rotation of the first motor 160b. Consequently, such connection also can provide additional control and may enhance precision or accuracy of positioning and/or moving the tactor.

The second motor 190b can be coupled to the second cam 180b in a similar manner, as the first motor 160b may be coupled to the first cam 170b, as described herein. Additionally, it should be appreciated that the first and second motors 160b, 190b can have any number of suitable connections or coupling configurations with the respective first and second cams 170b, 180b. Such connections can include direct or direct drive connections, crank-slider connections, belt-pulley connection, chain-sprocket connections, etc. In any event, the first and second motors 160b, 190b can rotate respective first and second cams 170b, 180b, which can produce motion of the tactor relative to the body of the shear display device.

For example, as illustrated in FIG. 2C, the cam actuation mechanism 150b (FIG. 2B) can be housed in a sliding housing 200b. More specifically, the cam actuation mechanism can be secured to and/or within the sliding housing 200b. In addition, the first cam 170b can be slidably and/or rotatably secured to or within the body of the shear display device (e.g., the first cam 170b can be secured within a slot in the body). Accordingly, in response to clockwise rotation of the first cam 170b, the sliding housing 200b can be pushed in a first direction along an X-axis, while in response to counterclockwise rotation of the first cam 170*b*, the sliding housing 200*b* can be pushed in a second, opposite direction along the X-axis.

In some embodiments, the sliding housing 200*b* can have grooves 210*b*, which can guide the sliding housing 200*b* along the X-axis. Thus, the sliding housing 200*b* can move along the X-axis in response to rotation of the first motor. Furthermore, the tactor can be secured or coupled to the sliding housing 200*b*. Consequently, movement of the sliding housing 200*b* can result in the corresponding movement of the tactor relative to the body of the shear display device.

It should be appreciated that the first cam 170*b* (and the second cam 180*b* (FIG. 2B) can provide mechanical advantage. Moreover, the first cam 170*b* (and the second cam 180*b* (FIG. 2B) can be configured such as to provide the greatest mechanical advantage at the farthest point of travel of the sliding housing 200*b* (and of the upper slide 220*b* (FIG. 2C), respectively). Accordingly, as the tactor moves and the user's skin stretches, the tactor can experience resistance due to the stretch of the user's skin, which can increase as the tactor moves away from a default position and can peak at the farthest position of travel. Such increase in resistance can be at least in part accommodated by correspondingly increasing mechanical advantage provided by the first cam 170*b* (and the second cam 180*b* (FIG. 2B)).

Also, as the first cam 170*b* (or the second cam 180*b* (FIG. 2B)) rotates (e.g., within a slot in the body of the shear display device), the sliding housing (and/or the upper slide 220*b* (FIG. 2C)) can move in a first direction and/or in an opposite direction. In some embodiments, the first cam 170*b* (and/or the second cam 180*b* (FIG. 2B)) as well as corresponding slot or receiving channel in the body of the shear device can be configured such that the first cam 170*b* (and/or the second cam 180*b* (FIG. 2B)) can fully rotate therein. As such, if a motor or controller fails in a manner that provides continuous rotation to the first cam 170*b* (and/or the second cam 180*b* (FIG. 2B)), the sliding housing 200*b* (or the upper slide 220*b* (FIG. 2C), as applicable) can continuously oscillate, without exceeding travel limits of the shear display device and/or damaging components or elements thereof.

In additional or alternative embodiments, an upper slide 220*b* can be slidably coupled to the sliding housing 200*b*. Thus, the second cam can move the upper slide 220*b* relative to the sliding housing 200*b* as well as relative to the body of the shear display device. More specifically, as illustrated in FIG. 2D, the second cam 180*b* can be rotatably secured within a slot 230*b* and the upper slide 220*b*. Hence, as the second cam 180*b* rotates about an axis thereof, the second cam 180*b* can push or pull the upper slide 220*b* along the Y-axis.

In some embodiments, the sliding housing 200*b* can include guiding channels 240*b* (e.g., the guiding channels 240*b* can have a gib-like configuration). The upper slide 220*b* can include guiding protrusions 250*b* that can fit into the guiding channel 240*b*. Accordingly, the upper slide 220*b* can move linearly along the Y-axis relative to the sliding housing 200*b* as well as relative to the body of the shear display device. Additionally, when the sliding housing 200*b* moves along the X-axis, relative to the body of the shear display device, the upper slide 220*b* can move together with the sliding housing 200*b*.

In one or more embodiments, the tactor 110*b* can be secured to the upper slide 220*b*. Consequently, when the upper slide 220*b* moves along the Y-axis, in response to rotation of the second motor, the tactor 110*b* also can move along the Y-axis. Likewise, when the sliding housing 200*b* moves along the X-axis, in response to rotation of the first motor, the tactor 110*b* can move along the X-axis.

Hence, rotation of the first and second motors can actuate movement of the tactor 110*b* along the X- and Y-axes. Furthermore, the first and second motors can move the tactor 110*b* in any number of paths and/or sequences or patterns. For instance, the first and/or second motors can be a servo motors connected to and controlled by a controller, which can provide instructions to the first and second motors to move the tactor 110*b* in a manner that displays information to the user, as described herein.

Figure 3A:
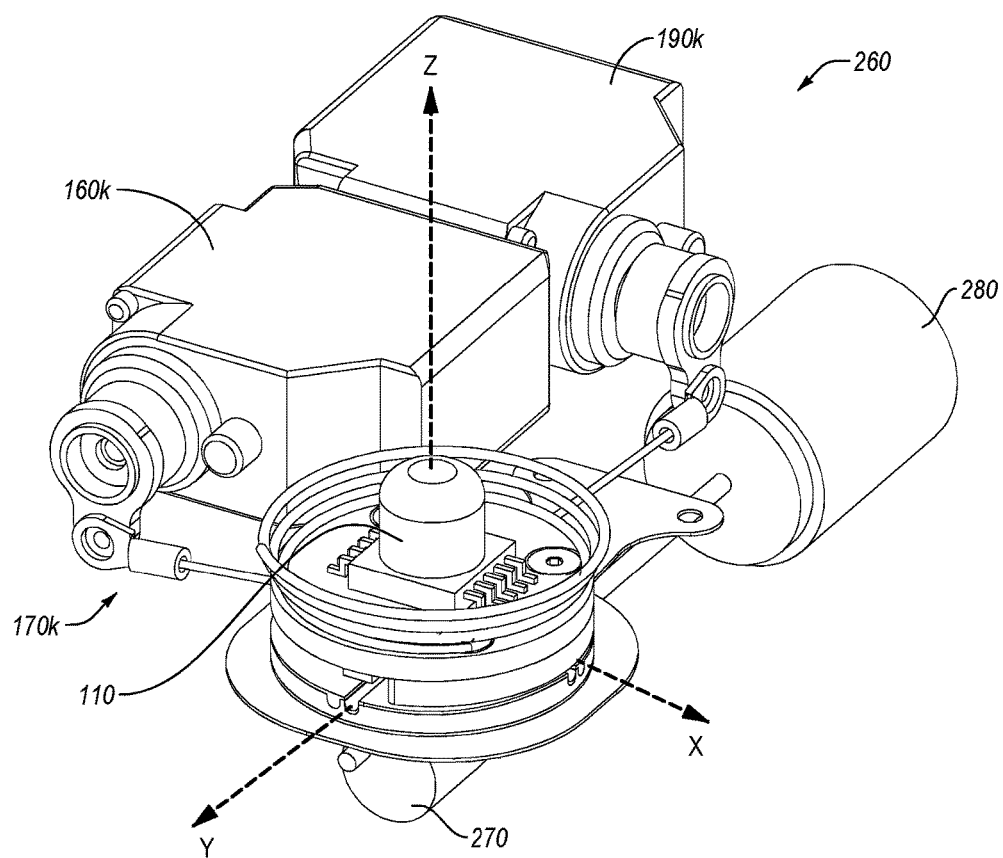
FIG. 3A illustrates a perspective view of an actuator assembly in accordance with one or more embodiments of the present disclosure.
Figure 3B:
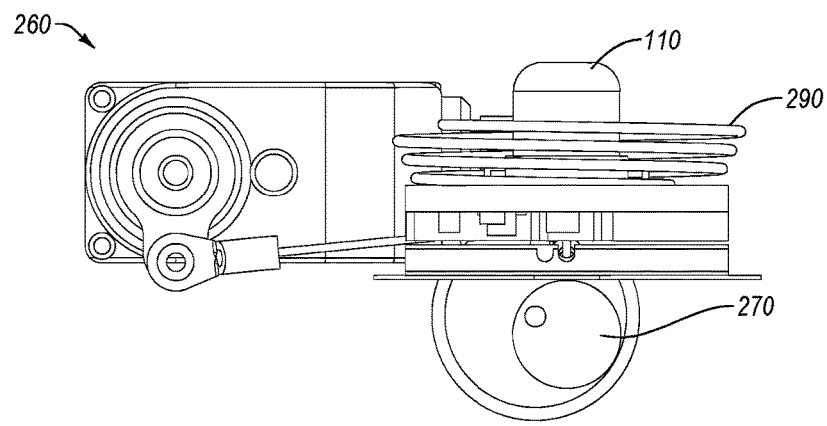
FIG. 3B illustrates a side view of the actuator assembly of FIG. 3A.

The above description relates to providing one-, two- and three-dimensional information by producing skin shear or skin stretch through movement of one or more tactors in a single plane, which is substantially parallel with the user's skin. This disclosure, however, is not so limited. For example, as illustrated in FIGS. 3A-3B, one embodiment of an actuation mechanism or an actuator assembly 260, which can actuate a tactor 110 in a manner that can provide one-, two-, or three-dimensional information to the user through movement of the tactor 110 in a plane substantially orthogonal with respect to the user's skin described herein. It should be appreciated that the actuator assembly 260 can be incorporated into any one of the shear display devices described herein, including the shear display devices 100*a*, 100*b*, 100*c*, 100*d*, 100*e*, 100*f*, 100*g*, 100*h*, 100*k*, 100*n* (FIGS. 1A-2B, 4-11) irrespective of the particular shape of their respective bodies. Moreover, although the illustrated embodiment of the actuator assembly 260 incorporates a cylindrical or a point tactor 110, it should be noted that the actuator assembly 260 can move any one of the tactors described herein, irrespective of the size and/or shape thereof. Although the focus of the foregoing description of embodiments of shear display devices focuses generally on the movement of tactors in the x- and y-directions, any embodiment herein may be combined to provide combinations of circular/semi-circular movement, rotation, planar movement, other tactor movement or combinations thereof with movement or cues provided in the z direction as well as gross movement when used with a device such as a force feedback device.

Accordingly, such movement of the tactor can apply pressure onto the user's skin. More specifically, the actuator assembly 260 can incorporate a cam 270 and a motor 280 that can rotate the cam 270, thereby causing the tactor 110 to move outward (i.e., toward the user's skin along the Z-axis). For example, a counter clockwise rotation of the cam 270 can cause the tactor 110 to move outward. The tactor 110 can be returned to its original position by rotating the cam 270 in the opposite direction (e.g., counterclockwise), such as to lower the tactor 110.

In some embodiments, the tactor 110 may be coupled with a sliding shim and a spring (e.g., a conical spring) 290. The spring 290 may keep the tactor 110 generally in contact with the cam 270 when the cam 270 moves from its largest diameter toward its smallest diameter. In other embodiments, the cam 270 and the tactor 110 can be connected (e.g., via a T-slot connection). Accordingly, as the cam 270 rotates (e. g., clockwise) to lower the tactor 110, the cam 270 can pull the tactor 110 downward. Alternatively, the tactor 110 can be spring-loaded, such that rotation of the cam 270, which is uncoupled from the tactor 110, may allow the spring to lower the tactor 110.

The tactor 110 may be operatively associated with actuator assemblies that can move the tactor 110 in a plane substantially parallel with the user's skin (e.g., in the X-Y plane). Accordingly, the tactor 110 can move in three-dimensional space—i.e., in a plane parallel to the user's skin as well as in a plane perpendicular to the user's skin. For example, the actuator assembly 260 can include first and second motors 160k, 190k, which can move the tactor 110 along respective X- and Y-axes. Particularly, the tactor 110 can be coupled to the first motor 160k via a first crank-slider mechanism 170k and to the second motor 190k via a second crank slider mechanism 190k. As the first motor 160k rotates the crank of the first crank-slider mechanism 170k, the first slider can move the tactor 110 along the X-axis. Likewise, as the second motor 180k rotates the crank of the second crank-slider mechanism 190k, the second slider can move the tactor 110 along the Y-axis. It should be appreciated that the tactor 110 may be operatively associated with any one of the above-described mechanisms, which can move the tactor 110 along the X- and/or Y-axes.

In other embodiments, the shear display device can include a set of wedges. As the wedges are moved toward one another, the first wedge slides onto the second, thereby raising the tactor. Conversely, as the wedges move away from each other, the tactor can be lowered. Similar to the cam 270 (FIGS. 3A-3B), the first wedge can be coupled to the tactor, thereby pulling the tactor as the first wedge slides down along the second wedge. Alternatively, the tactor can be spring-loaded; hence, the spring can force the tactor downward as the first wedge slides down the second wedge.

In addition to or in lieu of moving the tactor along the Z-axis, relational information can be displayed to the user by providing changes in pressure on the user's skin. For instance, the change (increase/decrease) in pressure can correspond to a correlating change in upward/downward direction of movement of the controlled object. Additionally or alternatively, the increase/decrease in pressure can correspond with increase/decrease in force experienced by the controlled object from its environment.

In one embodiment, the shear display device can convey a sensation of increased upward pressure by reducing the area of the tactor that contacts the user's skin. For example, the shape of the tactor can be changed, thereby reducing the area of the tactor that contacts the user's skin. In one instance, the tactor can have a substantially curved or spherical outer surface. By reducing the radius (or contact area) of the curved or spherical surface (i.e., outer surface) that defines the tactor, the user can experience greater pressure applied to the portion of the skin that contacts the tactor. Conversely, by increasing the radius of the sphere defining the tactor, a greater area will contact the user's skin, thereby decreasing the pressure felt by the user.

To increase and decrease the radius of the curved or spherical surface defining the tactor, in one or more embodiments, the tactor includes a flexible outer shell that is connected to at least two connectors (e.g., two tendons). The tendons may be connected to a shortening device. For example, the shortening device can be a pulley coupled to an actuator. As the pulley reduces the length of the tendons, the flexible outer shell is reduced in radius by the tactor reducing the contact area of the outer surface.

In other embodiments, the tactor may include an inflatable balloon or membrane, which can be inflated and deflated, thereby changing the area of the tactor and varying the pressure sensed by the user. Alternatively, the tactor can comprise a domed shell actuated by piezo-electrical elements. In any event, the shape of the shell or membrane of the tactor can change in a manner that may provide the user with a sensation of increased or decreased pressure on the user's skin.

In another embodiment, the shear display device can incorporate a tactor comprising multiple concentric rings. Such concentric rings can move up or down, thereby increasing and decreasing the area that is in contact with user's skin. Accordingly, whether by moving the tactor outward/inward (toward and away from the user's skin) and/or by decreasing/increasing the area of the tactor, the user can sense a change in pressure on the skin that is in contact with the tactor. For example, the tactor may be in a base configuration where the tactor is z-axis neutral. In some embodiments, the concentric rings move outward in the z-direction.

Moreover, the concentric rings can cooperate to form a contoured surface. A contoured surface may create a sense of surface curvature or changing contact area, which may be used to portray differing forces, direction cues, pressure, etc. The concentric rings also can cooperate to provide the same outward movement in the z-direction, but only the centermost concentric ring remains in the outward position (the other rings move away from the finger pad). This provides a smaller surface area of the tactor which can be used to create a sense of surface curvature or changing contact area which may also be used to create a sense of surface curvature or changing contact area, which may be used to portray differing forces, direction cues, pressure, etc.

Figure 4:
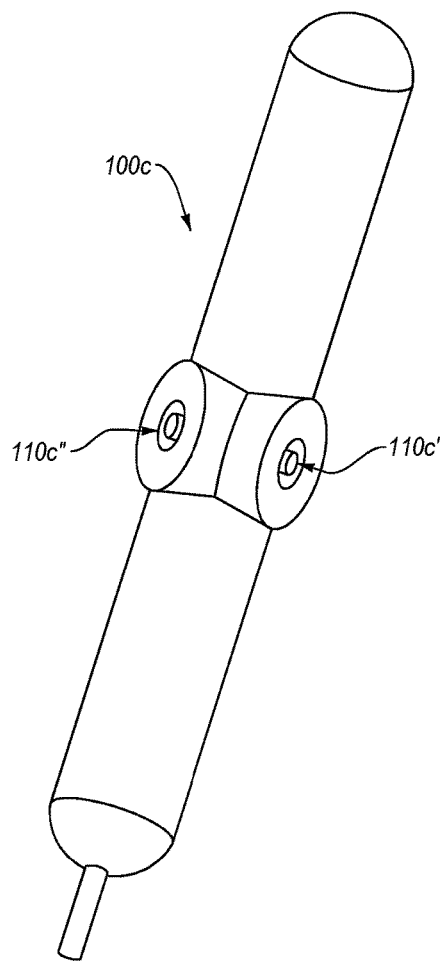
FIG. 4 illustrates a perspective view of a shear display device in accordance with yet another embodiment of the present disclosure.

In other embodiments, the shear display device can include multiple tactors, which can be located in the same or in one or more different planes. For example, as illustrated in FIG. 4, a shear display device 100c can incorporate the first tactor 110c' as well as a second tactor 110c". Except as otherwise described herein, the shear display device 100c and its components and elements can be similar to or the same as any one of the shear display devices 100a, 100b (FIGS. 1A-2D) and their respective components and elements (e.g., actuator assemblies). More specifically, the second tactor 110c" can be positioned substantially orthogonally relative to the first tactor 110c'. Similarly, the control system can incorporate the shear display devices that have multiple tactors. As described herein in further detail, a control system can include the force feedback device and the shear display device 100c connected to the force feedback device.

Figure 5:
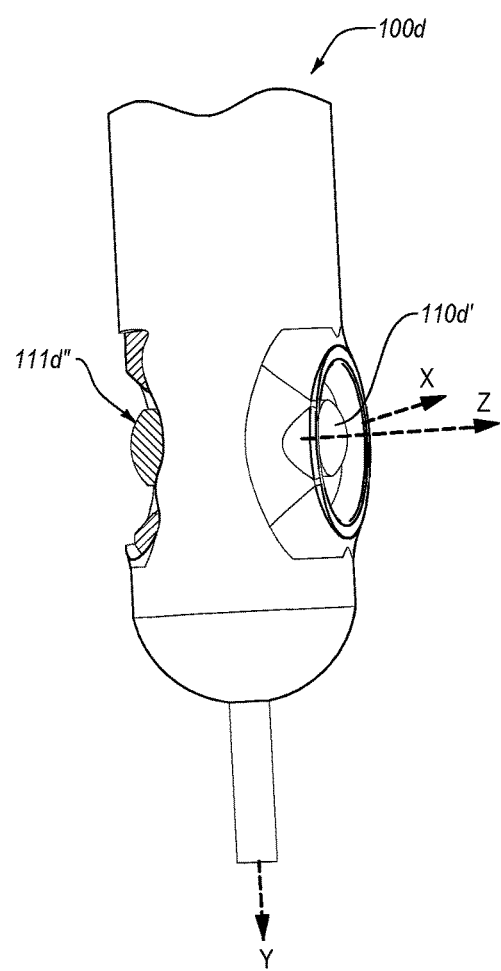
FIG. 5 illustrates a perspective view of a shear display device in accordance with still one other embodiment of the present disclosure.

Additionally or alternatively, in some embodiments, as illustrated in FIG. 5, a shear display device 100d can include multiple opposing tactors, such as a first tactor 110d' and a second tactor110d". Except as otherwise described herein, the shear display device 100d and its components and elements can be similar to or the same as any one of the shear display devices 100a, 100b, 100c (FIGS. 1A-2A and 4) and their respective components and elements (e.g., actuator assemblies). More specifically, the first and second tactors 110d', 110d" can be directly opposite each other. As shown in FIG. 5, the tactors 110d', 110d" are opposite to each other and centered approximately about the same axis (e.g., about Z axis). Such a configuration of the shear display device 100d can allow the shear display device 100d to display various types of movement information to the user, which can be presented in a more intuitive manner.

For instance, the user can perceive relative movement of the first and second tactors 110d', 110d", which can provide various information to the user. Particularly, moving the first tactor 110d' and the second tactor 110d" in opposite directions within their respective X-Y planes (i.e., in two-dimensional motion) can inform the user about rotational motion of the object (e.g., controlled object, shear display device 100d, etc.). For example, movement of the first tactor 110d' and the second tactor 110d" in opposite directions along the Y-axis can display rotational motion about the X-axis. It should be appreciated that, because the first and second tactors 110d', 110d" are spaced apart along the X-axis, the user can experience a torque-like sensation, produced by the relative movement of the first and second tactors 110d', 110d" in opposite directions.

In other embodiments, the first and second tactors 110d', 110d" may move in opposite directions in three-dimensional motion. For example, the first tactor 110d' may move in a first direction along the Y-axis and the second tactor 110d" may move in a second, opposite direction along the Y-axis, while the first tactor 110d' and the second tactor 110d" both move inward (i.e., while the first tactor 110d' moves along the Z-axis, away from the user's skin and the second tactor 110d" moves along the Z-axis away from the user's skin) in an arc-like motion.

Additionally or alternatively, the first and second tactors 110d', 110d" of the shear display device 100d can move in opposite directions to display rotation about another axis (e.g., about an axis that is concentric with the shear display device 100d). Hence, for example, when the user rotates the cylindrical shear display device 100d about the Y-axis, the first tactor 110d' and the second tactor 110d" can move in opposite directions the X-axis, thereby displaying rotational motion of the shear display device 100d and/or of the object, such as the control object. Furthermore, other rotational motions can be display to the user by moving the first and second tactors 110d', 110d" in a similar manner (i.e., by relative motion of the first and second tactors 110d, 110d").

Accordingly, the shear display device 100d can provide the user with information about rotation of an object about X- and/or Y-axes. For example, counterclockwise rotation of the shear display device 100d about the Y-axis can be displayed to the user by moving the first tactor 100d' in a first direction along the X-axis, while moving the second tactor 110d" in a second, opposite direction along the X-axis. Such movement of the first and second tactors 110d', 110d" can create a sensation of torque and can convey relevant rotational information to the user.

It should be appreciated that in addition to or in lieu of movements described herein, which can display rotational information to the user, the first and second tactors 110d', 110d" of the shear display device 100d can move in the same or similar manner as the tactors of the shear display devices 100a, 100b, 100c (FIGS. 1A-3). Accordingly, the shear display device 100d also can convey the same information as a single tactor shear display device. For instance, to display rotation about the Z-axis, the first and/or second tactors 110d', 110d" can move in a spiral or circular path and/or can rotate about various axes, as described herein. More specifically, for instance, to indicate a clockwise motion of the shear display device 100d and/or of the controlled object, first tactor 110d' can be moved in a clockwise spiral or circular motion about the center or another point in the well. Similarly, the opposing, second tactor 110d" can move in an opposite direction, namely counterclockwise relative to a view looking at that tactor (to indicate the same motion) about the same or another point. Furthermore, circular and/or rotational movements of the first and second tactors 110d', 110d" can be synchronized, such as to display the same rotation on both sides of the shear display device 100d. In other words, the first tactor 110d' and the second tactor 110d" may both rotate and/or move clockwise, counterclockwise, or otherwise simultaneously.

Likewise, as described herein in connection with the shear display device that has a single tactor, the shear display device 100d also can display translational or linear motion of the shear display device 100d and/or of the controlled object or user's hand. For instance, both the first tactor 110d' and the second tactor 110d" can move in the same direction and at the same speed or acceleration to indicate translational motion. In at least one example, both the first tactor 110d' and the second tactor 110d" can move toward the user (i.e., upward on the page) indicating corresponding linear movement of the controlled object. Alternatively, both the first tactor 110d' and the second tactor 110d" can move to toward the user (i.e., toward the left of the page) indicating corresponding linear movement of the controlled object. Similarly, both the first tactor 110d' and the second tactor 110d" can move to the user's left, thereby displaying corresponding movement of the controlled object. Also, both the first tactor 110d' and the second tactor 110d" can move to the user's right, thereby displaying corresponding movement of the controlled object.

Similarly, as described below in further detail, the first and second tactors 110d', 110d" can move out of plane (i.e., in a first or second, opposite direction along the Z-axis). Moreover, any one of the actuation mechanisms or actuator assemblies described herein can be incorporated into or used in the shear display device 100d. In some embodiments, the first and second tactors 110d', 110d" may be coupled (hard- or soft-coupled, i.e., physically or via a controller) such that the first and second tactors 110d', 110d" move together. For example, the first and second tactors 110d', 110d" may both move in the same direction (i.e., to the right, but with the first tactor 110d' moving outward in the z-direction and the second tactor 110d" moving inward in the z-direction).

In addition to or in lieu of the actuator assembly 260 (FIGS. 3A-3B), as mentioned above, the shear display device 100d can include any number of suitable actuator assemblies and/or actuator mechanisms. In one embodiment, the first and second tactors 110d', 110d" can move in opposite directions along the Z-axis in a synchronized and/or in an independent manner. Such movement, for example, can convey force or pressure experienced by the controlled object. As noted above, location and movement of the first and second tactors 110d', 110d" can indicate to the user the magnitude of force or pressure experienced by and/or the location or movement or size of an object.

In an embodiment, the actuator assembly of the shear display device 100d can include a sliding wedge (or multiple sliding wedges). For instance, the shear display device 100d may include a wedge actuator that moves the wedges with respect to each other. In one example, the wedge actuator may move a left wedge away from the wedge actuator. As such, a right wedge may stay in its relative longitudinal location. In other embodiments, the right wedge also may be actuated by the wedge actuator or another actuator in the opposite direction than the left wedge. Furthermore, as the larger portion of the left wedge approaches the larger portion of the right wedge, both first and second tactors 110d', 110d" can move outward (e.g., the first tactor 110d' moves in a first direction and the second tactor 110d" moves in a second, opposite direction).

Additionally or alternatively, shims or other mechanisms may be used to interface with the sliding wedges. The first and second tactors 110d', 110d" may be operatively associated with actuator mechanisms and/or actuator assemblies that can move the first and second tactors 110d', 110d" in a plane substantially parallel with the user's skin (e.g., actuation mechanism 150b (FIGS. 2B-2D)). Accordingly, the first and second tactors 110d', 110d" can move in three-dimensional space—i.e., in a plane parallel to the user's skin as well as in a plane perpendicular to the user's skin.

In a further embodiment, the first and second tactors 110d', 110d" may be coupled together, but may be able to move both in the same direction and in opposite directions along the Z-Axis. Any number of mechanisms may be used that can provide coupled motion in both the opposite and the same directions. For instance, the shear display device 100d may use a tapered eccentric cam that is both eccentric about and tapered along its longitudinal axis. The shear display device 100d may include an actuation mechanism (not shown) that may both rotate and longitudinally move the tapered eccentric cam.

For example, as the tapered eccentric cam is moved toward the first and second tactors 110d', 110d", both the first and second tactors 110d', 110d" can move outward along the Z-axis. Likewise, as the tapered eccentric cam is moved away from the first and second tactors 110d', 110d", both the first and second tactors 110d', 110d" can move inward along the Z-axis. Also, as the tapered eccentric cam is rotated, the first and second tactors 110d', 110d" can both move in the same direction. In other words, the first tactor 110d' can move outward and the second tactor 110d" can move inward.

Where the tapered eccentric cam both longitudinally moves and rotates, the first and second tactors 110d', 110d" may move in the same direction (i.e., outward or inward) but at a different rate and/or a different amount. For example, when the tapered eccentric cam is rotated to a neutral position (e.g., where each of the first and second tactors 110d', 110d" may be the same distance from the center of the tapered eccentric cam) the tactor to which the larger diameter portion of the tapered eccentric cam is approaching will move farther outward as the tapered eccentric cam is longitudinally advanced and rotated such that the larger diameter portion of the tapered eccentric cam approaches that tactor. Likewise, from an advanced position (i.e., where one of the first and second tactors 110d', 110d" abut the larger diameter portion of the tapered eccentric cam and where the largest portion of the taper is abutting both first and second tactors 110d', 110d"), as the tapered eccentric cam moves toward the neutral position and longitudinally away from the first and second tactors 110d', 110d", the tactor that was closest the largest portion of the tapered eccentric cam may move faster and further inward as the tapered eccentric cam is longitudinally advanced and rotated such that the larger diameter portion of the tapered eccentric cam moves away from that tactor.

In addition, shims or other mechanisms may be used to interface with the tapered eccentric cam. As noted above, the first and second tactors 110d', 110d" may be operatively associated with actuator assemblies that can move the tactors in a plane substantially parallel with the user's skin. Accordingly, the tactors can move in three-dimensional space—i.e., in a plane parallel to the user's skin as well as in a plane perpendicular to the user's skin.

Consequently, the shear display device 100d also can display information about force experienced by an object about the Z-axis. Specifically, in one embodiment, the first and second tactors 110d', 110d" can move outward, thereby displaying to the user increased pressure along the Z-axis. Conversely, the first and second tactors 110d', 110d" can move inward, which may signal to the user a decrease in force experienced by an object. Moreover, outward movement of the first and second tactors 110d', 110d" may signal to the user growing, zooming, or size increase of an object. Similarly, inward movement of the first and second tactors 110d', 110d" can signal to the user shrinking, zooming out, or size decrease of an object.

Figure 6:
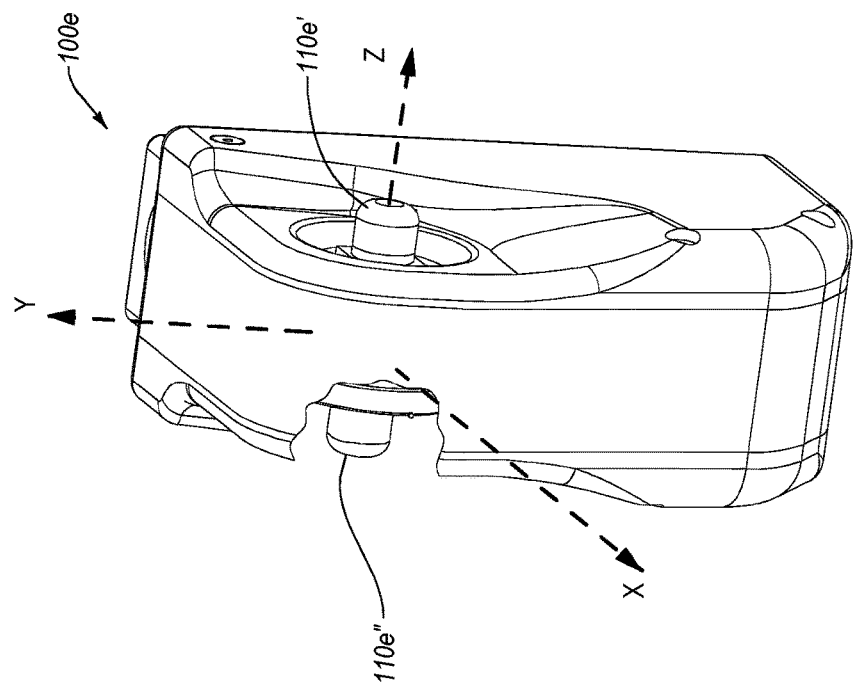
FIG. 6 illustrates a perspective view of a shear display device in accordance with one or more embodiments of the present disclosure.

As noted herein, the shape of the body of the shear display device can vary from one embodiment to another. For instance, as illustrated in FIG. 6, a flat or rectangular shear display device 100e also can have opposing first and second tactors 110e', 110e". Except as otherwise described herein, the shear display device 100e and its components or elements can be similar to or the same as any one of the shear display devices 100a, 100b, 100c, 100d (FIGS. 1A-5) and their respective components and elements. Furthermore, the first and second tactors 110e', 110e" can exhibit relative motion (e.g., similar to the tactor movements described in connection with the shear display device 100d (FIG. 5)) to display rotation of an object about X- and/or Y-axes.

Moreover, the shear display device also can provide the same or similar information as any one of the shear display devices 100a, 100b, 100c, 100d (FIGS. 1A-4). For example, the first and/or second tactors 110e', 110e" can move in a linear manner to indicate linear directional or force cues. Additionally or alternatively, the first and/or second tactors 110e', 110e can move along spiral, circular or semicircular paths to provide rotational information about the Z axis. In any event, the shear display device 100e can provide the same information as can be provided by a single tactor shear display device as well as additional information that can be presented by differential relative movement of the first and second tactors 110e', 110e.

In one embodiment, the shear display device 100e can be coupled to or integrated with a tool or an instrument. For instance, the shear display device 100e can be coupled to a stylus, which can be used to send instructions to a controller. Furthermore, as described herein in more detail, the shear display device 100e can be coupled to a controller and/or force feedback device. Hence, for example, the shear display device 100e, together with the controller and/or force feedback device, can be used in robotic procedures (e.g., surgery, catheter insertion, etc.).

Figure 7A:
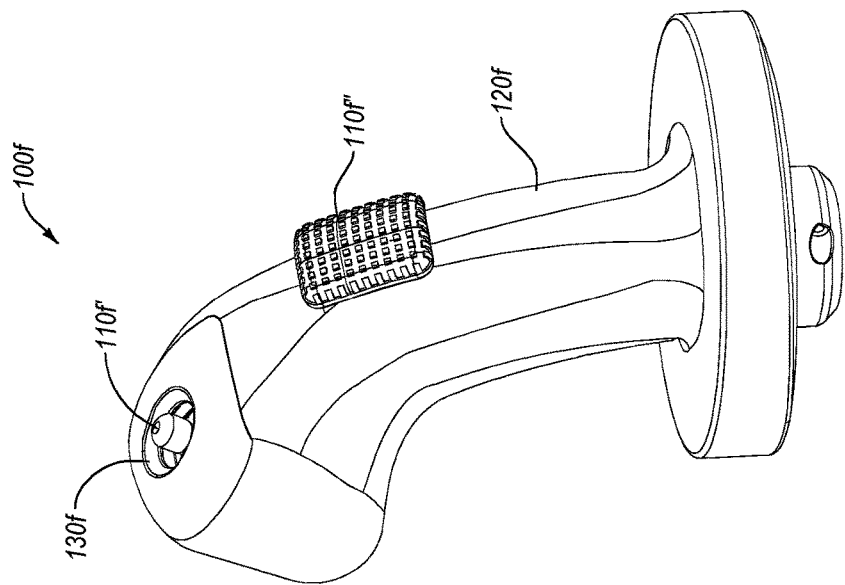
FIG. 7A illustrates a perspective view of a shear display device in accordance with yet one other embodiment of the present disclosure.

As mentioned herein, the body of the shear display device can have any number of suitable configurations, shapes, and sizes. Furthermore, among other things, locations of the tactors and wells on the body of the shear display device can vary from one embodiment to another. In addition, the shape and size of the tactors can vary from one embodiment to the next and may depend on location of the tactor on the shear display device, portion of the skin intended to be contacted by the tactors, etc. For instance, as illustrated in FIG. 7A, a shear display device 100f can have a first and second tactors 110f', 110f" located on a joystick-like body 120f Except as otherwise described herein, the shear display device 100f and its components or elements can be similar to or the same as any one of the shear display devices 100a, 100b, 100c, 100d, 100e (FIGS. 1A-6) and their respective components and elements.

More specifically, the shear display device 100f can have the first tactor 110f' located on an upper end thereof, such that the first tactor 110f' can engage the user's thumb. The first tactor 110f' can be surrounded by a first well 130f, which can restrain the skin on the user's thumb, in a manner that isolates skin movement and produces skin stretch in response to the movement of the first tactor 110f'. Moreover, the first tactor 110f' can be offset from a center axis of the body 120f. For example, a right-handed shear display device 100f can have the first tactor 110f' offset to the left of the center axis of the body 120f.

As such, the location of the first tactor 110*f'* can allow the user's thumb to remain in a more natural position. In other words, in some embodiments, the user's thumb can remain in a relaxed or un-flexed state when in contact with the first tactor 110*f'*. Such a configuration can provide better isolation of the user's skin relative to the first tactor 110*f'*, which can lead to more accurate and/or sensitive feedback for the user. Moreover, such configuration also can provide improved angular accuracy of user's interpretation of the skin stretch cues from the first tactor 110*f'* (as compared with the configuration where the tactor is aligned with the center axis of the body).

Likewise, for a left-handed shear display device 100*f*, the first tactor 110*f'* can be offset to the right of the center axis of the body 120*f*, such that the user's left thumb can remain in a relaxed state while in contact with the first tactor 110*f'*. It should be appreciated that other embodiments can include the first tactor 110*f'* located at other suitable locations on the upper end of the shear display device 100*f* (e.g., aligned with the center axis of the body 120*f*). In any event, the first tactor 110*f'* can be located on the body 120*f* such that the user is capable of placing a left or a right thumb on the first tactor 110*f* (and in the well 1300 while holding the body 120*f* of the shear display device 100*f* with the corresponding hand.

The first tactor 110*f'* can be capable of movements similar to or the same as the movements of any one of the tactors described herein. Hence, the first tactor 110*f'* can display the same or similar information as any one of the tactors mentioned herein. In addition to the first tactor 110*f'*, as noted herein, the shear display device 100*f* can include the second tactor 110*f''*. In one embodiment, the second tactor 110*f''* can move substantially along the length of the body 120*f*. Particularly, the tactor 110*f''* can be in contact with the user's palm and can provide any number of tactile cues, represented by a substantially vertical movement of the second tactor 110*f''*.

In one or more embodiments, the second tactor 110*f''* can have a plate- or bar-like shape. As such, the second tactor 110F'' can engage a larger portion of the user's skin. Such a configuration can be particularly advantageous on portions of the user's skin that have a relatively low density of mechanoreceptors. For example, skin on the user's palm may have a lower density of mechanoreceptors or nerve endings than the skin on the user's fingertips. Accordingly, in one embodiment, the second tactor 110*f''* can recruit or engage substantially the same or similar number of mechanoreceptors on the user's palm as recruited or engaged by the first tactor 110*f'* on the user's fingertip. Such a balanced engagement can allow the shear display device 100*f* to provide tactile cues to the user's fingertip(s), fingerpads, and palm, which appear with similar or substantially the same intensity to the user.

Hence, the second tactor 110*f''* can be sufficiently larger than the first tactor 110*f'*, to allow the second tactor 110*f''* to contact sufficiently larger portion of the user's palm. For instance, the second tactor 110*f''* can be approximately a 0.75"×1.5" rectangle (i.e., can have an approximate area of 1.125 in$^2$), while the first tactor 110*f'* can have an approximately 0.25" diameter (i.e., can have an approximate area of 0.05 in$^2$). In other examples, the second tactor 110*f''* may have a substantially rectangular shape with sides greater than 1.5" and/or smaller than 0.75". It should be also appreciated that the second tactor 110*f* can have any number of other shapes, which may vary from one embodiment to the next (e.g., square, triangular, trapezoid, irregular, etc.). The greater area of the second tactor 110*f''*, as compared with the area of the first tactor 110*f'*, can allow the second tactor 110*f''* to recruit sufficient number of mechanoreceptors to compensate for lower density of the mechanoreceptors on the portion of the skin in contact with the second tactor 110*f''*.

In additional or alternative embodiments the second tactor 110*f''* can include ridges or texture, which can create sufficient friction between the user's palm and the second tactor 110*f''* while also increasing the experienced sensations. Alternatively, the second tactor 110*f''* can comprise a material that has sufficient coefficient of friction to prevent or reduce slippage between the tactor 110*f''* and the user's palm. For instance, the second tactor 110*f''* can comprise rubber, neoprene, silicone, and the like. In any event, the second tactor 110*f''* can stretch the user's skin, thereby activating mechanoreceptors thereon.

Furthermore, as the user grasps the body 120*f*, portions of the body 120*f* surrounding or adjacent to the second tactor 110*f''* can at least partially restrain the user's skin surrounding the skin that is in contact with the second tactor 110*f''*. In at least one implementation, the portions of the body 120*f* that surround the second tactor 110*f''* can comprise material that exhibits a relatively high coefficient of friction (e.g., roughened surface) or may be tacky, such as to prevent or limit movement of the skin adjacent to the portion of the user's skin that is in contact with the second tactor 110*f''*. In any case, when the user's hand grasps the body 120*f*, the skin in contact with the second tactor 110*f''* can be at least partially isolated in a manner that allow the second tactor 110*f''* to stretch the skin.

Accordingly, in some embodiments, the shear display device 100*f* can produce skin stretch without incorporating a well into the body 120*f* thereof. In other words, the act of grasping the body 120*f* can sufficiently isolate the user's skin to allow the tactor 110*f''* to stretch an isolated portion of the user's skin. Alternatively, however, the body 120*f* can incorporate a well about the tactor 110*f''*, and such well also can isolate the user's skin.

The first and/or second tactors 110*f'*, 110*f''* can be actuated in any number of ways, which can include any one or more of the actuation mechanisms and actuator assemblies described herein. Additionally, for example, the second tactor 110*f''* can be coupled to a motor 160*f*, as illustrated in FIG. 6B. Particularly, in one embodiment, a resilient flexible spine 170*f* can be coupled to a crank 180*f* secured to the shaft of the motor 160*f*. As the shaft of the motor 160*f* rotates the crank 180*f* in a first direction, the crank 180*f* can push the spine 170*f* upward, thereby moving the second tactor 11*f''* upward. Conversely, as the shaft of the motor 160*f* rotates the crank 180*f* in a second, opposite direction, the crank 180*f* can pull the spine 170*f* downward, thereby moving the second tactor 110*f''* downward.

In some embodiments, the body 120*f* can have a channel 190*f*, which can restrain and/or guide the spine 170*f* therein. Furthermore, in at least one embodiment, the body 120*f* can have a curvilinear configuration, which may provide an ergonomic fit with the user's hand. Thus, the channel 190*f* also can have a curvilinear configuration, as the path of the channel 190*f* may generally follow the outside geometry of the body 120*f* In any event, however, the spine 170*f* can have sufficient flexibility to move up and down within the channel 190*f*, thereby moving the second tactor 110*f''* in corresponding directions. It should be appreciated that, in at least one embodiment, the tactor 110*f''* can move in any number of directions and patterns, linear and nonlinear, as described herein in connection with other tactors.

It should be appreciated that the shear display device 100*f* can allow the user to "power grip" the body 120*f*, while the second tactor 110f'' may continue moving and transmitting tactile information to the user (i.e., stretching user's skin). In other words, the user's hand can apply a relatively large amount of compressive force onto the body as well as onto the second tactor 110f'' without impeding or interfering with the operation of the second tactor 110f'' and of the shear display device 100f. Accordingly, the shear display device 100f can continue providing tactile cues to the user when the user applies relatively large force onto the body 120f.

As noted herein, the shear display device 100f can be incorporated into a control system, as described herein in further detail. For example, the shear display device 100f can include a connecting portion 200f, which can couple the shear display device 100f to a controller and/or force feedback device. Accordingly, the user can receive tactile cues from the first and second tactors 110f', 110f'' and also can receive force feedback.

Figure 8:
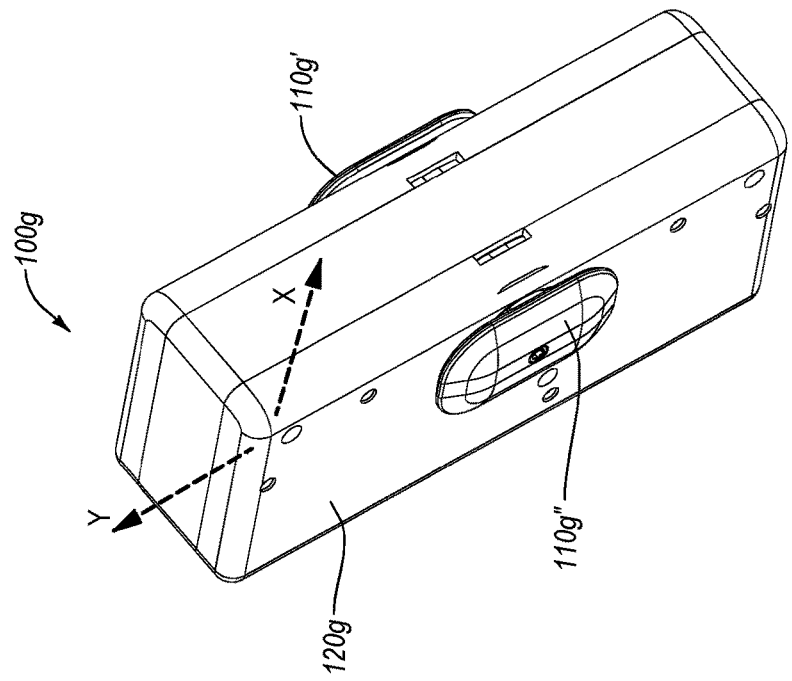
FIG. 8 illustrates a perspective view of a shear display device in accordance with still one other embodiment of the present disclosure.

In additional or alternative embodiments, the shear display device can include multiple large tactors. For example, as noted herein, large tactors can provide enhanced sensation to the user when in contact with the user's skin that has a relatively low density of mechanoreceptors. For example, as illustrated in FIG. 8, a shear display device 100g can incorporate two plate-like tactors 110g', 110g''. Except as otherwise described herein, the shear display device 100f and its components or elements can be similar to or the same as any one of the shear display devices 100a, 100b, 100c, 100d, 100e, 100f (FIGS. 1A-7B) and their respective components and elements.

As noted herein, a body 120g of the shear display device 100g can have any number of suitable configurations. In one example, the body 120g can be substantially rectangular or bar-like. Other embodiments can include a cylindrical, spherical, or any other number of configurations for the body 120g. Additionally, the tactors 110g', 110g'' can be located essentially anywhere on the body 120g, as may be more suitable or desirable for a particular application. In one embodiment, the tactors 110g', 110g'' are located near one edge of the body 120g.

Figure 7B:
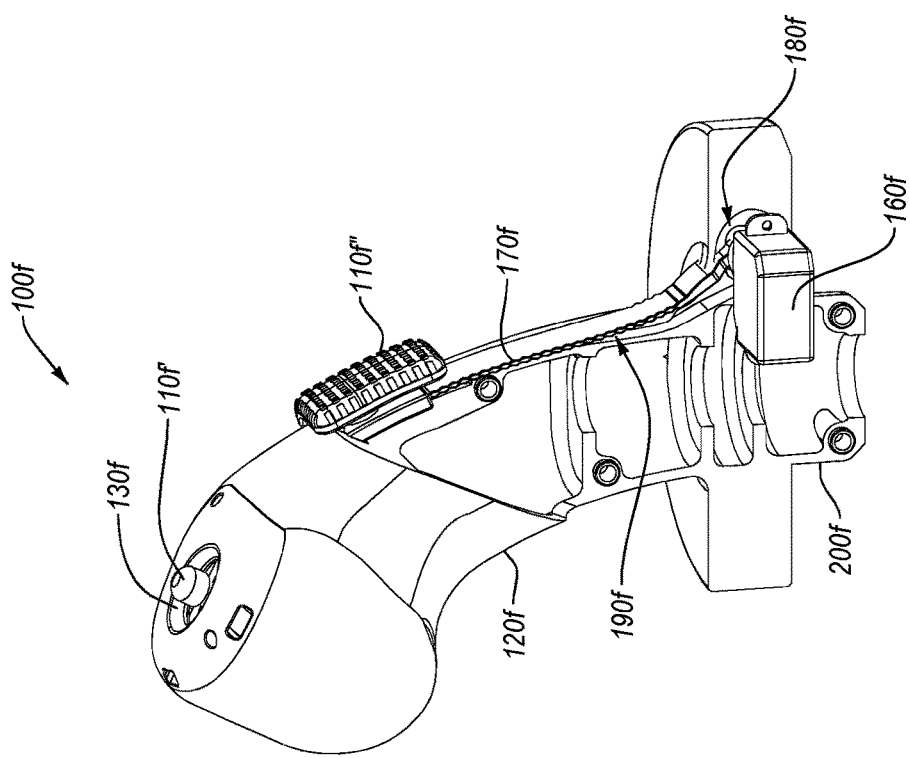
FIG. 7B illustrates a partial cutaway perspective view of the shear display device of FIG. 7A.

The tactors 110g', 110g'' can be similar to or the same as the second tactor 110f' (FIGS. 7A-7B). However, the tactors 110g', 110g'' can exhibit that same or similar movements as any one of the tactors described herein and may be actuated in the same or similar manner as any one of such tactors (i.e., the shear display device 100g can incorporate any one of the actuator assemblies described herein). Accordingly, the tactors 110g', 110g'' can move up and down along one edge of the body 120g (along Y-axis). Furthermore, the tactors 110g', 110g'' can move toward and away from the edge of the body 120g (along X-Axis). Hence, the tactors 110g', 110g'' can exhibit any number of movement path, patterns, and sequences described herein.

Furthermore, the tactors 110g', 110g'' can display the same or similar information as described above in connection with multiple opposing tactors. To mention a few: relative movement of the tactors 110g', 110g'' can display rotational information such as rotary motions and torques; likewise, the tactors 110g', 110g'' can display linear motion and/or force information.

Moreover, as noted above in connection with the shear display device 100f (FIGS. 7A-7B), the shear display device 100g can allow the user to apply sufficiently large grasping force onto the body 120g. At the same time, the tactors 110g', 110g'' can continue moving relative to the body 120g and displaying tactile information to the user. Consequently, such configuration can be employed in applications where the body 120g of the shear display device 100g may be subjected to relatively large grasping forces from the user. For example, the shear display device 100g can be incorporated into controller used in virtual games of tennis, baseball, golf, sword fighting, etc. It should be appreciated, however, that the shear display device 100g can be incorporate into any number of controller or devices, which require or allow the user to apply relatively large grasping force onto the body 120g of the shear display device 100g. In addition, as noted above, the tactors 110g', 110g'' can provide sufficient stimulation of user's mechanoreceptors at locations of low or lower sensitivity (e.g., lower than fingertips). Accordingly, the shear display device 100f can also be used in applications where user's gripping force may not be relatively large and may provide skin stretch cues to portion of the skin with lower sensitivity (e.g., user's palm).

Figure 9:
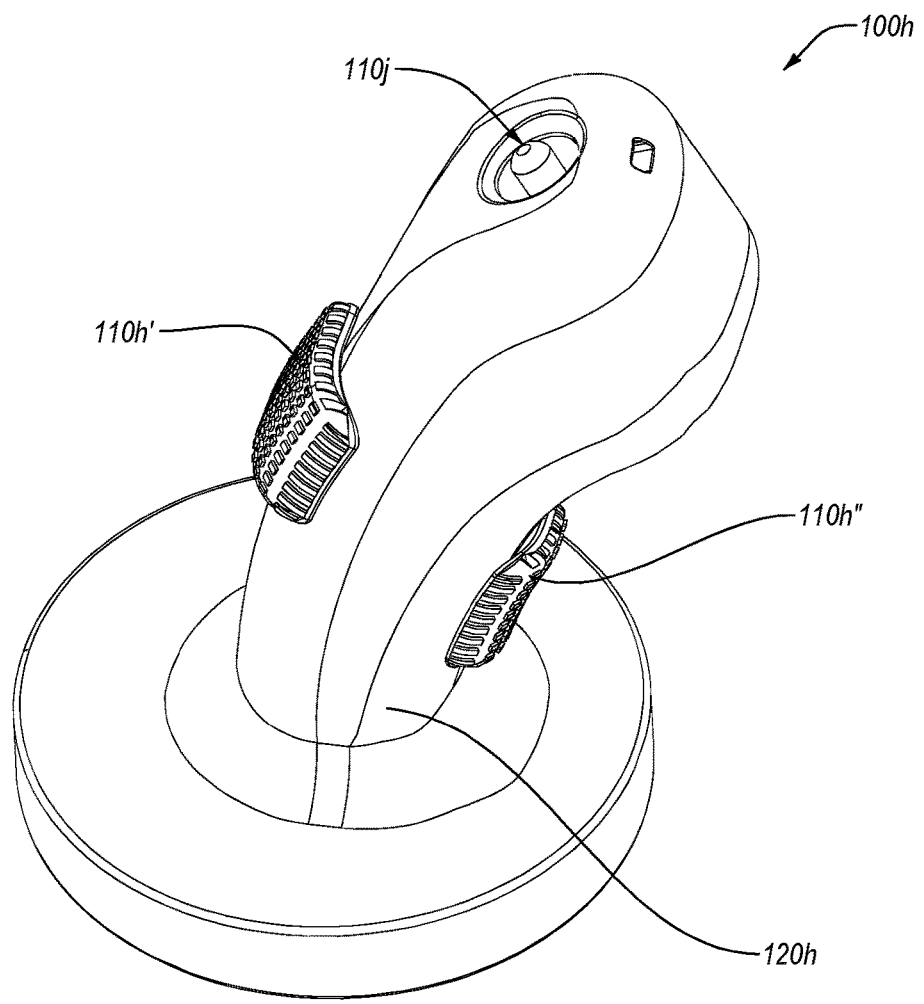
FIG. 9 illustrates a perspective view of a shear display device in accordance with one or more embodiments of the present disclosure.

As previously noted, the body of the shear display device can have any number of configurations. Moreover, a shear display device may incorporate any number of tactors (one, two, three, four, etc.), which may be positioned and/or oriented on the body of the shear display device in any number of suitable configurations. In one example, as illustrated in FIG. 9, a shear display device 100h can have a joystick-like body 120f and may include first, second, and third tactors 110h', 110h'', 110j. Except as otherwise described herein, the shear display device 100h and its components or elements can be similar to or the same as any of the shear display devices 100a, 100b, 100c, 100d, 100e, 100f, 100g (FIGS. 1A-8). For instance, the joystick-like body 120h may be similar to or the same as the joystick-like body 120f (FIGS. 7A-7B).

In one embodiment, the first and second tactors 110h', 110h'' may move upward and downward along a length of the body 120h. Such movement may approximately follow the lengthwise curvature or surface of the body 120h. In additional or alternative embodiments, the first and second tactors 110h', 110h'' may move approximately perpendicular to the length of the body 120h. In still further embodiments, the first and second tactors 110h', 110h'' may move about the body 120h in a manner that the path of the first and second tactors 110h', 110h'' approximately follows the curvature of the perimeter or surface of the body 120f.

It should be appreciated that the third tactor 110j can move in a similar or the same manner and can provide similar or the same tactile cues as the first tactor 110f (FIGS. 7A-7B). Similarly, the first and second tactors 110h', 110h'' can move in a similar or the same manner and can provide similar or the same tactile cues as the first and second tactors 110g', 110g''. Accordingly, the shear display device 100h can incorporate cues provided by the shear display device 100f, 100g (FIGS. 7A-8) in a single device. For example, the shear display device 100h can display torque or rotation experienced by an object by moving the first and second tactors 110h', 110h'' in opposite directions (e.g., along the length of the body 120, about the perimeter of the body 120, etc.). Alternatively, linear movement or force experienced by an object can be displayed by the shear display device 100h as movement of the first and second tactors 110h', 110h'' in the same direction.

The shear display device 100h can be used in any number of applications. For instance, the shear display device 100h may be used as an element or component of a control stick of an airplane (e.g., the body 120h of the shear display device can operate as the control stick). In one embodiment, the first and second tactors 110h', 110h'' may provide instruction to a pilot (e.g., to a student pilot) regarding how to move the control stick and/or navigate the airplane. In one example, to signal to the pilot to pull back on the control stick, the first tactor 110h' can move downward along the body 120h, while the second tactor 110h" moves upward. Conversely, to signal to the pilot to push forward on the control stick, the first tactor 110h' can move upward along the body 120h, while the second tactor 110h" moves downward.

Figures 10A, 10B:
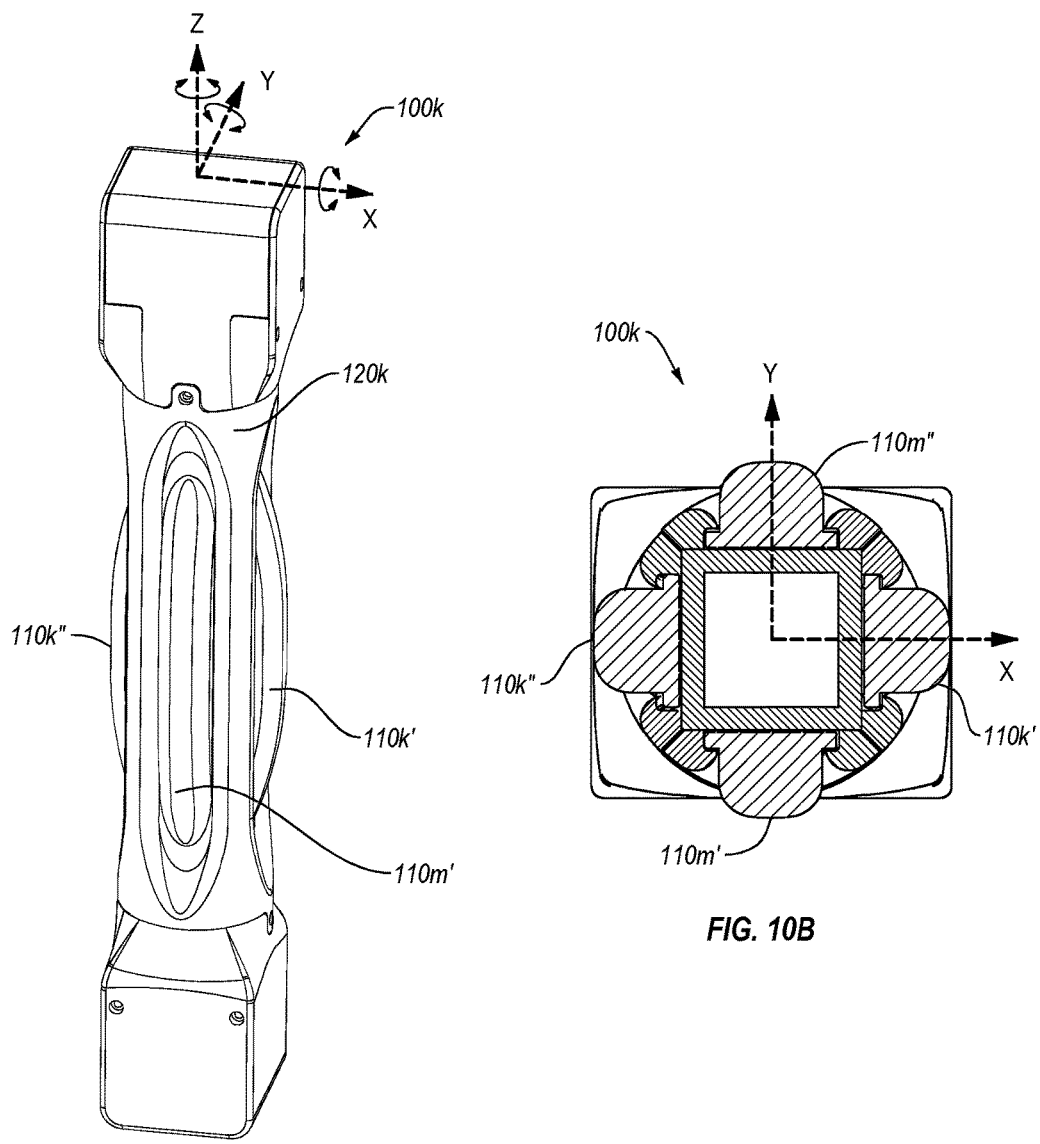
FIG. 10A illustrates a perspective view of a shear display device in accordance with an embodiment of the present disclosure.
FIG. 10B illustrates a top cutaway view of a shear display device in accordance with an embodiment of the present disclosure.

In yet another embodiment, the shear display device can include four tactors. For example, as illustrated in FIGS. 10A-10B, a shear display device 100k can include a partially cylindrical body 120k and four tactors positioned about the body 120k. Except as otherwise described herein, the shear display device 100k and its components or elements can be similar to or the same as any one of the shear display devices 100a, 100b, 100c, 100d, 100e, 100f, 100g, 100h (FIGS. 1A-9). Particularly, the shear display device can include first and second tactors 110k', 110k" located along the X-axis of the shear display device 100k and opposite to one another. In addition, the shear display device can include third and fourth tactors 110m', 110m" positioned along the Y-axis of the shear display device and opposite to each other. Moreover, in some embodiments, the first and second tactors 110k', 110k" may have an approximately orthogonal orientation relative to the third and fourth tactors 110m', 110m".

In an embodiment, the first and second tactors 110k', 110k" can move along the length of the body 120k (i.e., in a direction along or parallel the Z-axis of the shear display device 100k). Likewise, the third and fourth tactors 110m', 110m" can move along the length of the body 120k. In at least one embodiment, such movement of the first, second, third, and fourth tactors 110k', 110k", 110m', 110m" can approximately follow the contour or the surface of the body 120k.

Furthermore, embodiments of the present disclosure can include the first and second tactors 110k', 110k" that may move about the body 120k. For instance, the first and second tactors 110k', 110k" can rotate about the body 120k (e.g., about the Z-axis of the shear display device 100k). Such rotation of the first and second tactors 110k', 110k" can approximately follow the contour or the surface of the body 120k. Moreover, such rotation may be synchronized in a manner that the first and second tactors 110k', 110k" rotate together, as a single unit. Similarly, the third and fourth tactors 110m', 110m" can rotate about the body 120k in the same or similar manner as the first and second tactors 110k', 110k". In addition, the first and second tactors 110k', 110k" and the third and fourth tactors 110m', 110m" can rotate about the body 120k together.

In one embodiment, the body 120k may be sized and configured to allow the user to grasp the body 120k together with the first, second, third, and fourth tactors 110k', 110k", 110m', 110m". In other words, the user can grasp the body 120k in a manner that the user's hand contacts the first, second, third, and/or fourth tactors 110k', 110k", 110m', 110m", which may transmit tactile information to the user. Also, the body 120k may isolate portions of the user's skin that are in contact with the respective first, second, third, and/or fourth tactors 110k', 110k", 110m', 110m", such that the first, second, third, and fourth tactors 110k', 110k", 110m', 110m" may produce skin stretch on the skin portions in contact therewith.

Accordingly, various linear and/or nonlinear movements of the first, second, third, and/or fourth tactors 110k', 110k", 110m', 110m" may provide tactile cues or information to the user. In one example, the first and second tactors 110k', 110k" can move in opposite directions along or parallel to the Z-axis to signal rotation of an object about the Y-axis. Alternatively, such movement can signal to the user to rotate the shear display device 100h (e.g., in order to move an object), as described below in further detail. Linear movements of the first and second tactors 110k', 110k" can represent linear movements and/or forces experienced by an object or cues to move an object, as described herein.

Similar to the first and second tactors 110k', 110k", the third and fourth tactors 110m', 110m" can move in opposite directions along the Z-axis to signal to the user rotation or torque about the X-axis. Likewise, such movement also can signal to the user to rotate the shear display device about the Y-axis. In additional or alternative embodiments, as noted above, the first, second, third, and/or fourth tactors 110k', 110k", 110m', 110m" may rotate about the body 120k (e.g., about the Z-axis). Among other things, such rotation can signal to the user rotation and/or torque about the Z-axis experienced by an object. Also, such rotation may signal to the user to rotate the shear display device 100k about the Z-axis. It should be appreciated that one can create torque sensations about axes that lie between the X- and Y-axes by moving multiple tactors together. For example, referring to FIG. 10B, the first and third tactors 110k', 110m' can be moved upwards, while the second and fourth tactors 110k", 110m" are moved downwards to provide a sensation of torque for the user, which would rotate the top of the body 120k about an axis that is approximately 45 degrees between the X- and Y-axes.

An exemplary application of the shear display device 100k may include controlling an object and receiving cues regarding desired or necessary movements for such object and/or for the shear display device 100k. For example, the shear display device 100k may incorporate or may be integrated with a wireless remote or controller, such a Wii remote. In other words, moving the shear display device 100k may send instructions (e.g., movement instructions) to a controlled object. Accordingly, in one embodiment, the user may receive cues or suggestions about where to move the shear display device 100k (and, thus, the controlled object), as described above.

Additionally or alternatively, the shear display device 100k can provide correctional or training cues regarding an optimal or improved movement in a particular application. For instance, the shear display device 100k can provide correctional or training cues for a tennis swing (e.g., the shear display device 100k can represent or can be incorporated into a handle of a tennis racket and may provide tactile cue regarding where and/or how to move the tennis racket). Similarly, the shear display device 100k can provide any number of corrective or training cues, which may improve user's movements in connection with any number of activities (e.g., golf, baseball, fishing, etc.).

The rotational and translational degrees of freedom communicated by the shear display device 100k could also include assisting in orienting or pointing an object such as a satellite dish or camera. That is, the shear display device 100k can supply the degrees of freedom for pointing the camera with rotations about the X- and Y-axes, it could suggest how to zoom the lens with translational cues along the Z-axis, and could suggest changes in focus with cues to rotate the camera lens, with rotational cues about the Z-axis. Such cues could be especially advantageous for individuals with vision impairments.

Figure 11:
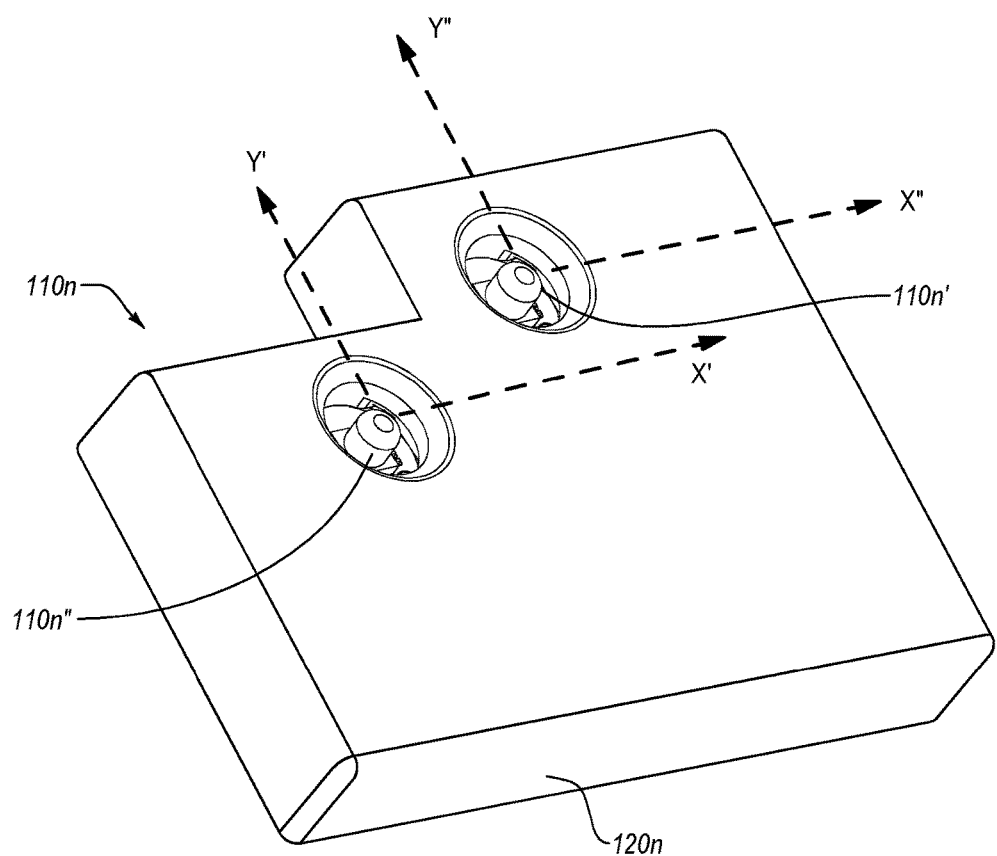
FIG. 11 illustrates a perspective view of a shear display device in accordance with at least one other embodiment of the present disclosure.

As mentioned above, the shear display device can have any number of tactors located on any portion thereof. FIG. 11 illustrates another embodiment of a shear display device, which incorporates multiple tactors on the same side thereof. Particularly, FIG. 11 illustrates a shear display device 100n that incorporates first and second tactors 110n', 110n" on the top of a body 120n. Except as otherwise described herein, the shear display device 100n and its components or elements can be similar to or the same as any one of the shear display devices 100a, 100b, 100c, 100d, 100e, 100f, 100g, 100h, 100k (FIGS. 1A-10) and their respective components and elements.

To display in-plane rotation of the shear display device 100n, the first and second tactors 110n', 110n" can move in opposing directions. More specifically, the first and second tactors 110n', 110n" can move in opposing directions along their respective Y'- and Y"-axes. This movement can generate torque about a center point between the first and second tactors 110n', 110n". Such torque can indicate to the user that the shear display device 100n and/or the controlled object is rotating or that they should rotate their hand about a Z-axis (not shown), which can be perpendicular to the X'-Y' plane.

As noted above, the displacement or movement of the first and second tactors 110n', 110n" also can indicate the location, distance, displacement, or motion of the controlled object. Moreover, moving the first and second tactors 110n', 110n" with opposing motions (e.g. on their respective Y'- and Y"-axes) also can indicate torque being applied to the controlled object or that the user should rotate their hand about that respective axis. Hence, location or movement of the first and second tactors 110n', 110n" can indicate the amount of torque being applied to the controlled object. In contrast to moving of the first and second tactors 110n', 110n" in opposing directions, which can indicate rotation or torque, movement of the first and second tactors 110n', 110n" in the same direction (e.g., along Y'- and Y"-axes, X'- and X"-axes, or any parallel directions), can indicate translational/linear movement of the shear display device 100n and/or of an object, such as the controlled object.

Additionally or alternatively, the first and second tactors 110n', 110n" can move in opposite directions on an axis that lies along the direction between the center point of each of the tactors to display various tactile cues to the user. For example, the first and second tactors 110n', 110n" can move radially away from each other to display zooming out or an increase in distance (virtual or otherwise) between two objects (e.g., between an object and the controlled object; between the user and an object, etc.) or increase in the size of an object. Such movement also can display to the user tensile forces experienced by an object or provide similar force/pressure cues.

Conversely, the first and second tactors 110n', 110n" can move radially toward each other, thereby signaling to the user zooming in or a reduction in distance (virtual or otherwise) between two objects or the decreasing size of an object. Likewise, such movement of the first and second tactors 110n', 110n" can indicate compressive forces experienced by an object or provide similar force/pressure cues. For instance, as a tool passes through a narrowing and is compressed, the first and second tactors 110n', 110n" can move toward each other, thereby indicating compression of the tool.

In one embodiment, the first and second tactors 110n', 110n" are offset from each other in both the x- and y-direction. Such a configuration can provide tactile feedback to the user's index and middle fingertips, which are commonly offset in a similar manner as the first and second tactors 110n', 110n". This offset configuration can be advantageous if the shear display device 100n was a computer mouse or a similar device.

In other embodiments, the first and second tactors 110n', 110n" can be substantially aligned with each other. In other words, the shear display device 100n can have a continuous edge, and the first and second tactors 110n', 110n" can be positioned at approximately the same distance from the edge. In any case, the user can position or orient the shear display device 100n in any manner relative to the user's hand and/or fingertips, such as to accommodate a particular placement of the user's fingertips on the first and second tactors 110n', 110n".

Additional or alternative embodiments include the shear display device 100n that comprises multiple unconnected bodies, each of which can incorporate one of the first and second tactors 110n', 110n". In other words, the shear display device 100n can comprise multiple unconnected shear display devices, which can be place near each other, such that the user can place fingertips on the desired tactors. Such otherwise unconnected shear display devices can function together (e.g., by receiving commands from the same controller) and can produce the same movement of the first and second tactors 110n', 110n" as a single body shear display device 100n.

Furthermore, it should be appreciated that the shear display device 100n can include first and second tactors 110n', 110n" that have any number suitable shapes and sizes, which may vary from one implementation to another. For example, the shear display device 100n can include bar- or plate-like first and second tactors (e.g., similar to the first and second tactors 110g', 110g" (FIG. 8). The plate-like first and second tactors can move in any number of ways described herein and can provide the same or similar information as described herein. Additionally, the plate-like first and second tactors can allow the user to apply a relatively large compressive force to the shear display device 100n, while continuing to display information to the user. Furthermore, as noted above, the plate-like tactors can recruit more mechanoreceptors and, thus, can provide additional sensation in the areas of relatively low density of mechanoreceptors (e.g., palm, wrist, etc.), which can facilitate greater accuracy of the user's perception of the displayed information.

Figure 12:
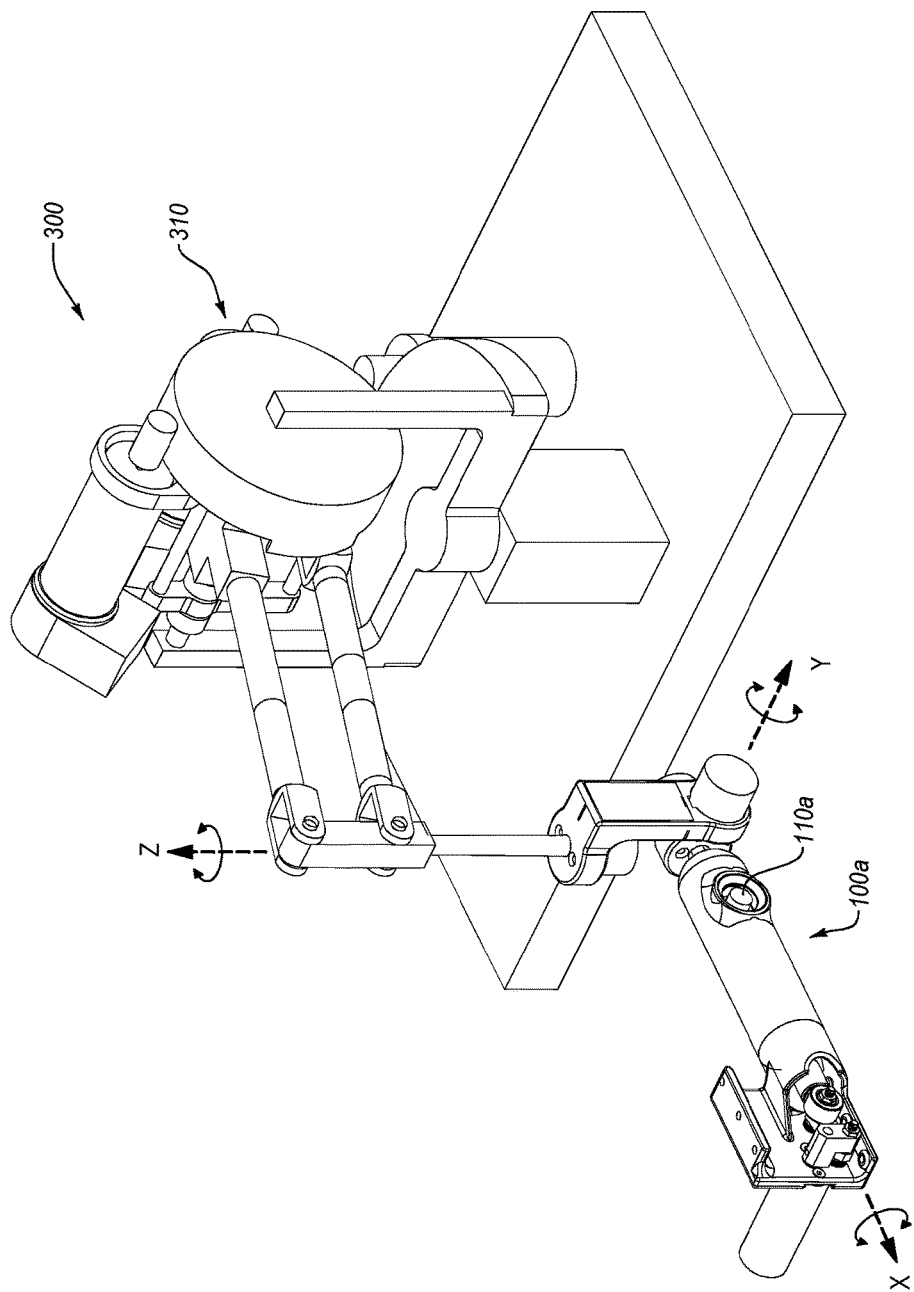
FIG. 12 illustrates a perspective view of a control system that incorporates a shear display device in accordance with one embodiment of the present disclosure.

Hence, movements of the tactor can display one-, two-, three-dimensional, and generally multi-dimensional information about movement of the controlled object. As described herein, the shear display device can be connected to or form a part of a controller, which can control the controlled object. Moreover, the controller also can provide force feedback to the user, as further described herein. For ease of description of the controller, reference is made to a "force feedback device," which can incorporate both the control functionality and can provide force feedback. Furthermore, the force feedback device can provide force feedback on any one or more of three axes in a three-dimensional space as well as torque feedback about any one of the three axes. For example, the feedback can be such as to provide a certain amount of resistance to movement of a shear display device. It should be appreciated, however, that shear display device can be coupled to or integrated with a controller that can provide either of the control functionality or force feedback. FIG. 12 illustrates a control system 300 that includes the shear display device 100a connected to a force feedback device 310. The force feedback device 310 may include a commercially available force feedback device, such as the Phantom Robot Arm.

The force feedback device 310 can provide resistive force in response to the movement of the shear display device 100a. Such resistive force, for example, can signal a resistance (as well as magnitude thereof) encountered by the controlled object (where this object could be a physical object or a simulated/virtual object). For example, when used with a remote scalpel that is cutting through subcutaneous tissue and then encounters bone, the force feedback device 310 may provide greater (or in this example infinite) resistance to further advancement in the direction of the bone. Additionally, the force feedback device 310 can sense movements of the shear display device 100a in one-, two-, three-, and up to six-dimensional space (i.e., linear movements in along any one or more axes in a three-dimensional space plus rotational movements about such axes in the three-dimensional space). In other words, as the user moves the shear display device 100a, the force feedback device 310 can provide instructions to a controller (or to the controlled object), and the instructions can correspond to the user's movements of the shear display device 100a. Thus, the force feedback device 310 can provide information to the user about position and/or movement of the controlled object as well as provide instruction to the controlled object related to the movement thereof (e.g., as sensed by the force feedback device 310 from the movement of the shear display device 100a).

Moreover, in addition to or in lieu of force feedback, the control system 300 also can provide the user with information about the movement of an object, such as the controlled object. More specifically, the control system 300 can display position of the controlled object, forces experienced by of the controlled object, etc., via the shear display device 100a. For example, the force feedback device 310 can detect rotation of the shear display device 100a about the Z-axis.

Similarly, the force feedback device 310 can detect rotation of the shear display device 100a about the X-axis. As noted above, as the force feedback device 310 detects rotation of the shear display device 100a about and/or linear movement of the shear display device 100a in the X-, Y-, and/or Z-axes (or any other axes), the force feedback device 310 can translate such linear movements and/or rotations, and direct the controlled object in a corresponding manner.

Similarly, the tactor 110a and its motion can display a representative force experienced by the controlled object. Hence, in lieu of providing force feedback in response to force experienced by the controlled object (via the force feedback device 310), resistance to linear movement and/or rotation of a multi-tactor shear display device (e.g., shear display device 100k, FIGS. 10A-10B) can be presented as skin shear (i.e., stretching the skin) by the tactor 110a. For instance, as noted above, force may be displayed by displacing the tactor 110a from a center or default position to a second position. Also, the shear display device 100a can display torque by rotating the tactor 110a about its axis and/or moving the tactor 110a along a circular path. In one example, direction and distance of movement (or speed or acceleration) of the tactor 110a from its center position can indicate the forces experienced by the controlled object. In other words, relatively larger movements of the tactor 110a can represent a relatively greater amount of force experienced by the controlled object. Conversely, a relatively smaller movement of the tactor 110a can represent a relatively lower amount of force experienced by the controlled object.

As described herein, a shear display device provides localized sensations, which do not affect or move the user's hand. Hence, providing haptic feedback via skin shear instead of force feedback can reduce the risk associated with unintentional hand movement, which can occur in response to receiving force feedback from the force feedback device 310. For example, in various medical applications, unintentional hand movements during a procedure where a physician controls a medical device with the help of the control system (e.g., during a surgery) can present huge safety concerns and can lead to devastating consequences. Accordingly, the shear display device 100a can reduce potential accidents that may occur during various procedures, which can be especially relevant to high risk procedures.

Additionally, the control system 300 can provide a combined force feedback and shear feedback. For example, the force feedback device 310 can prevent movement of the shear display device 100a in a certain direction (e.g., along X-axis beyond a predetermined point or a limit), and the shear display device 100a can provide shear feedback (e.g., by moving in the tactor 110a in a direction away from the predetermined limit). As such, the control system 300 can reduce the amount of force applied in the force feedback, while the user can experience sufficient tactile feedback to for accurate responses to such feedback. Combined force feedback and skin stretch can enhance user's sensation and can lead to more accurate interpretation of the cues as compared with providing only the force feedback or skin stretch cues.

As noted above, reduction of force feedback can lead to improved accuracy of user's movements during user controlled tasks. For instance, the user can guide the controlled object along a path that is in part dictated by the tactile feedback from the control system 300. Thus, increased accuracy of user's movements can result in increased accuracy of the control object's adherence to the path. In one example, the control system 300 can be used in surgical procedures, where the tactile feedback can represent the controlled object's interaction with the surrounding environment (e.g., resistance or forces experienced by the controlled object). Accordingly, increased accuracy of movement of the controlled device as well as reduced or eliminated unintentional movements (e.g., movements that can result from excessive force feedback) of the shear display device 100a, which can control the controlled object, can lead to safer surgical procedures.

As noted above, the control system 300 can include any of the shear display devices described herein. In one example, the control system 300 may incorporate a multi-tactor shear display device (e.g., the shear display device 100d (FIG. 5)). Hence, in some instances, the user can receive cues from the multi-tactor shear display device (as described herein) and can move the shear display device in a direction and/or to a position indicated by such cues. For example, the user may rotate the shear display device about the Z-axis (e.g., which would result from the shear feedback provided to a user). It should be noted that, in some situations, the shear display device can move only about the Z-axis, while remaining substantially stationary otherwise (e.g., via force feedback that prevents linear movement and rotation about the X- and Y-axes.

As described herein, rotation of the shear display device 100a about the Z-axis can direct the controlled object to perform certain function. For example the controlled object can be directed to rotate. In response to such rotation the controlled object can experience torque applied by its environment. Hence, providing shear feedback can inform the user about the amount of torque experienced by or the orientation or relative movement of the controlled object. Moreover, the information about the torque experienced by the controlled object also can be displayed by a combined skin shear and force feedback.

In some embodiments, the control system 300 can be configured to partially restrict the user's ability to move the shear display device in three- or six-dimensional space. In other words, the force feedback device 310 can apply force to prevent the user's movements of the shear display device in one or more directions and/or prevent rotations about one or more axes. For example, the control system 200*a* may restrict all linear movement of the shear display device and can restrict rotation about X-, Y- or Z-axes. Hence, for instance, the shear display device can be allowed to rotate only about the Z-axis. In other words, the force/torque feedback device 310 can provide resistance to movement of the shear display device in a manner that would effectively constrain the movements of the shear display device to a predetermined plane, surface, or three-dimensional surface or area (e.g., allowing movements only on the surface or on one side of the plane or surface).

Such restrictions also can confine movement of the shear display device to a particular confinement plane or surface. Thus, the user may be able to move the shear display device only in a two-dimensional plane. Similarly, the control system 300 can restrict the user's movements of the shear display device to a surface, which can have a three-dimensional profile.

In other embodiments, the control system 300 can prevent the user from moving the shear display device past a predetermined safety plane or surface in the three-dimensional space. More specifically, the control system 300 can allow the user to move the shear display device to any location on the one side of the safety plane or surface and prohibit movement of the shear display device beyond that side of the safety plane or surface. A surface of an object can be obtained (e.g., using three-dimensional scanning techniques) and can be used as a safety surface for the control system 300. Such safety surface can protect the object from inadvertent contact or impact by the controlled object.

Guiding the motion and orientation of the user while the user holds the shear display device such that the user can only move within a plane or surface can also be very advantageous cognitively and for task performance. This reduces the task space such that a user is no longer required to reason and control for six degrees of freedom of motion, but can simply focus on two degrees of freedom. This also allows the axis of the shear display to always be controlled to be in the most advantageous orientation to present useful feedback to the user.

In one aspect of the control system, the center of the shear display device (i.e., location of the tactor and/or where the user grips the shear display) would be placed at the center of rotation of the force/torque feedback robot's gimbal. By placing the shear display device at the center of the gimbal, if torques are applied to the shear display device to guide its motions, these torques will be less likely to result in potentially large translational forces being generated when the robot arm pushes on the user's hand. Hence this centered configuration has potential safety advantages.

Furthermore, providing torque feedback at the force feedback device 310 can provide a means of controlling the orientation of the shear display device 100*a* such that it always lies in the predetermined or desired orientation. All three axes of rotation can be similarly controlled such that the orientation of the shear display device can be suggested to or controlled for the user. Specifically, rotation of the shear display device can be controlled about any one or more of the X-, Y-, and Z-axes.

Providing rotational guidance for the orientation of the shear display device and, thus, for the user's hand provides a compromise in system complexity and safety. As noted above, in safety critical applications force feedback is often not used due to concerns of feedback instabilities. Hence, torque feedback can provide an effective means to guide the orientation of the shear display device to be placed in a desired or preferred orientation within a three-dimensional space with three translations and three rotations, for conveying task specific information to the shear display device. Unlike force feedback, where transitional motion can result from feedback instabilities, torque feedback has a lower potential to cause safety issues.

Figure 13:
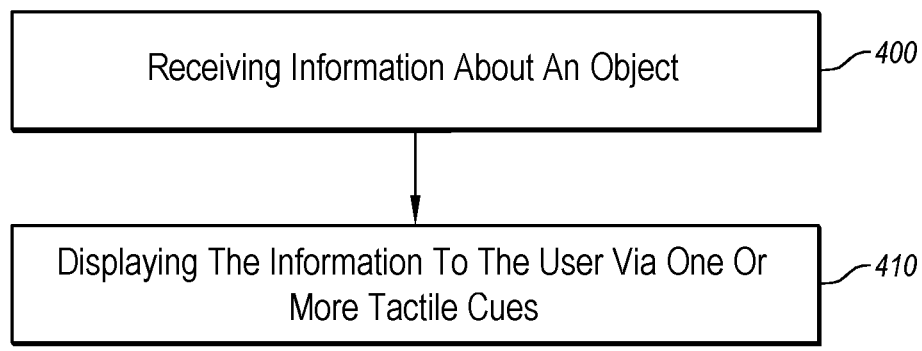
FIG. 13 illustrates a chart of acts of a method of displaying information via tactile cues in accordance with one embodiment of the present disclosure.

Accordingly, FIGS. 1-12 and the corresponding text, provide a number of different components and mechanisms for displaying movement, direction, force, and torque information to a user via tactile cues provided by the shear display device and/or by the control system. In addition to the foregoing, some embodiments of the present disclosure also can be described in terms of flowcharts comprising acts and steps in a method for accomplishing a particular result. For example, FIG. 13 illustrates a flowchart of one exemplary method of providing above-described information with tactile cues using principles of the present disclosure. The acts of FIG. 13 are described herein with reference to the components and diagrams of FIGS. 1 through 12.

For example, as illustrated in FIG. 13, the method can involve an act 400 of receiving information about an object. As mentioned above, such object can be a real (or physical) object or can be a virtual (i.e., computer-generated) object. Furthermore, such an object can be an object being controlled by the user, such as the controlled object, an object used to control one or more other objects (e.g., shear display device in combination with a controller), or any other object being observed by the user.

In addition, the particular information received can vary from one embodiment to another. For instance, such information can include information about the object's movements. Particularly, such information can include information about the object's direction, velocity, and acceleration. Additionally or alternatively, such information can include information about the forces, torques, or pressure experienced by or applied to the object.

The method can further involve an act 410 of displaying the information to the user via one or more tactile cues. More specifically, the above-described information about the object can be displayed to the user via predetermined one or more skin stretch cues, which can be provided by the shear display device (e.g. shear display device 100*a*, 100*b*, 100*c*, 100*d*, 100*e*, 100*f*, 100*g*, 100*h*, 100*k*, 100*n*). In other words, the shear display device can stretch one or more portions of the user's skin to provide tactile sensations that can correspond with the information about the object and can be interpreted by the user as such. For example, the shear display device can move one or more tactors (e.g. tactors 110*a*, 110*b*, 110*c'*, 110*c''*, 110*d'*, 110*d''*, 110*e'*, 110*e''*, 110*f'*, 110*f''*, 110*g'*, 110*g''*, 110*h'*, 110*h''*, etc.) in a first direction and at a first speed in along a linear path to indicate linear in a first direction and at a first speed in along a linear path to indicate linear movement of the object and particular speed thereof. Alternatively or additionally, the shear display device can move one or more tactors in a first direction and at a first speed and/or by a first displacement along a linear path to indicate a force experienced by the object (i.e., magnitude of the force and/or direction thereof).

Additionally or alternatively, the shear display device can move one or more tactors along a curved, circular, or semicircular path to indicate rotation of or a torque experienced by the object. Moreover, as described herein, the shear display device can include multiple tactors (e.g. 110*c'*, 110*c''*, 110*d'*, 110*d''*, 110*e'*, 110*e''*, 110*f'*, 110*f''*, 110*g'*, 110*g''*, 110*h'*, 110*h''*, etc.). Hence, the shear display device can move the tactors in a coordinated manner to display linear movement, force, rotation, torque, and combinations thereof. In one example, opposing tactors can move in opposite directions (e.g., along X- or Y-axis), as described herein, to indicate rotation of and/or torque experienced by the object. For instance, directions of the movement of the tactors and the direction of a perceivable torque created about a center point therebetween can provide information about the object's rotation. Furthermore, speed and/or acceleration as well as displacement of the tactors (i.e., the manner in which the user's skin is stretched) can provide information about the torque experienced by the object.

Likewise, tactors facing in the same or similar direction (e.g., adjacent tactors) also can provide rotational information. As noted above, in one example, one or more of the tactors can rotate about the respective axes thereof or may move in a circular or semicircular paths to display information about the object's rotation and/or torque experienced thereby. Additionally or alternatively, the tactors can move in opposite directions along a linear or substantially linear paths (e.g., along X- or Y-axis), thereby producing a perception of torque about a point therebetween. Accordingly, such movements can provide information about the object's rotational movement and/or torque experienced thereby.

In some embodiments, as described herein, the tactors also can move toward and away from the user's skin. Hence, the tactors can provide three-dimensional information about linear movement or forces experienced by the object. Additionally or alternatively, the tactors can provide information about rotational movement and/or torques experienced by the object about any one or more of the three-dimensional axes (i.e., the shear display device 100a, 100b, 100c, 100d, 100e, 100f, 100g, 100h, etc., can provide four-, five-, and six-dimensional information to the user).

Embodiments of the present disclosure also can include and/or can be implemented in performing medical procedures, such as upper extremity rehabilitation, surgery, catheter insertion, etc. More specifically, in one example, a shear display device (e.g. shear display devices 100a, 100b, 100c, 100d, 100e, 100f, 100g, 100h, etc.) can signal to the user the direction of movement (i.e., where to move) for a desired advancement of the tool or catheter in the body. Also, the shear display device can inform the user about the forces and/or torques experienced by the catheter or other controlled tool or object. Accordingly, the shear display device can improve the safety of medical procedures, such as catheter insertion and guidance.

In some embodiments, the shear display device can display impact between two objects (e.g., between a controlled object and another object) in a different manner than a force applied onto the controlled object. Specifically, upon impact, the shear display device can produce a relatively large initial stretch of the user's skin (i.e., a large displacement of the tactors (e.g. tactors 110c', 110c'', 110d', 110d'', 110e', 110e'', 110f', 110f'', 110g', 110g'', 110h', 110h'', etc.)), which can be proportional to the impact (e.g., to the speed of the controlled object at the time of impact and/or mass thereof), followed by displaying further tactor motion in proportion to the penetration of the virtual object that is contacted. In other words, a larger initial stretch of the user's skin can produce an enhanced or more accurate perception of impact. It should be noted that a single or multiple tactors (as applicable) can move in unison to produce skin stretch of multiple portions of the user's skin.

In some embodiments, the displacement of the tactor and the corresponding amount of skin stretch can be proportional to the force or torque experienced by the object. For instance, a force of 2 N can be displayed by displacing the tactor by 1 mm, while a force of 4 N can be displayed by displacing the tactor by 2 mm. Alternatively, relationships between the force experienced by the object and the displacement of the tactor can be non-linear (e.g., logarithmic, quadratic, etc.). Thus, small amounts of force can be displayed to the user by sufficiently large displacement of the tactor, such that the user can perceive such forces. At the same time, larger forces also can be displayed by proportionately less displacement by the tactor without running out of travel. Hence a non-linear mapping of forces (or other quantities mentioned above) to tactor displacements has the advantage of being responsive for displaying lower force levels where the skin is not substantially stretched, while not prematurely saturating at higher force levels. This extends the range of forces that can be displayed to a user and has the advantage of meeting a user's expectations of increased skin stretch when experiencing increasing forces or large forces. This can better maintain the causality of the user experience than using a high force-to-tactor-displacement gain and experiencing early tactor saturation at high forces.

Figure 14A:
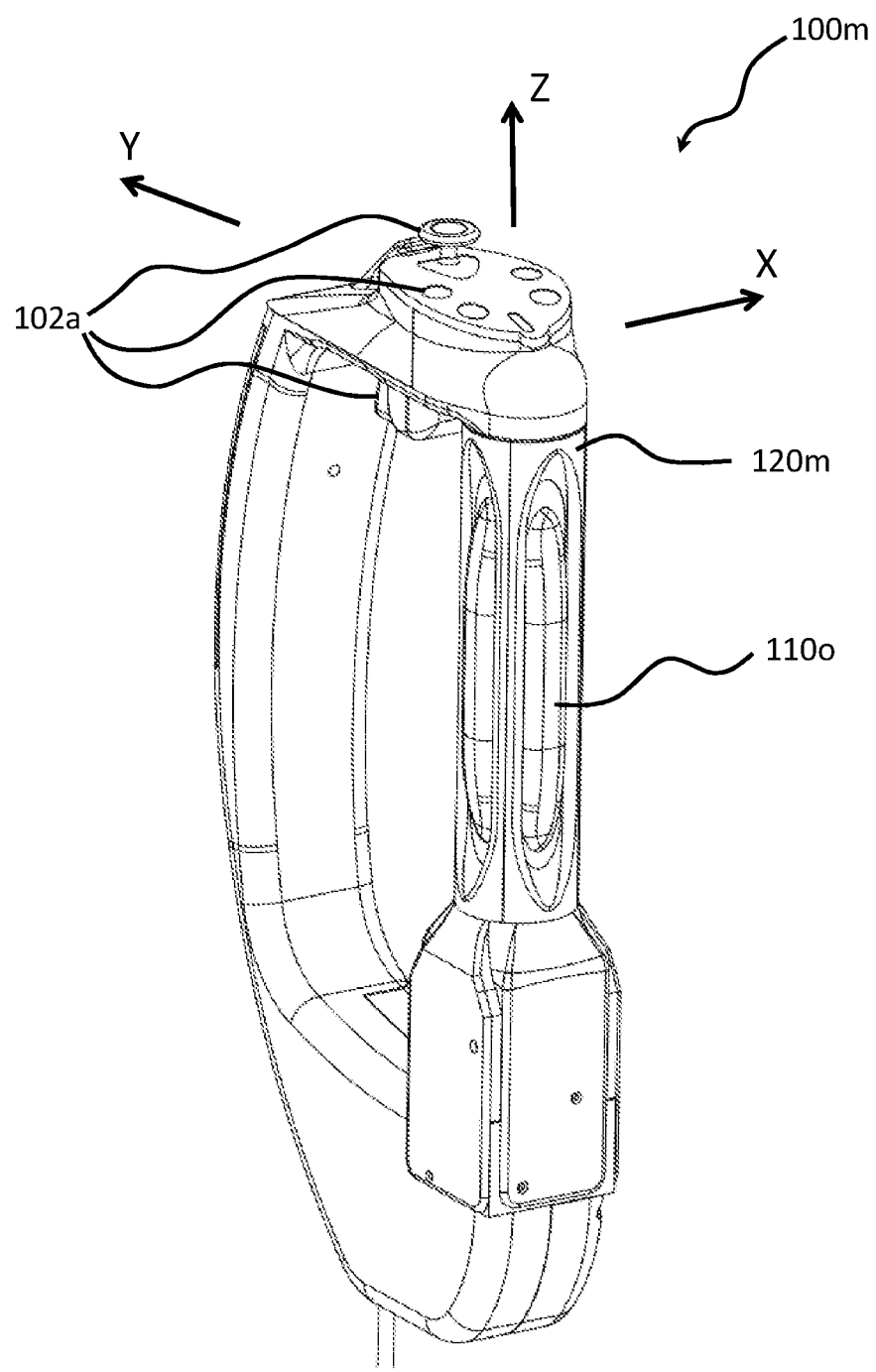
FIG. 14A is a perspective view of a shear display device having four sliding tactors in accordance with at least one embodiment of the present disclosure.

One or more sliding tactors may be used incorporated into grips or handles on various devices to provide tactile feedback without significantly interfering with the usage of the devices. As shown in FIG. 14A, a shear display device 100m may include four tactors 110o, similarly mounted on a body 120m as described in relation to FIGS. 10A and B. Particularly, the shear display device can include tactors 110o located along an X-axis of the shear display device 100m and opposite to one another. The shear display device 100m may include tactors 110o positioned along a Y-axis of the shear display device 100m and opposite to each other. Moreover, in some embodiments, at least one of the tactors 110o may have an approximately orthogonal orientation relative to at least one other tactor 100o. In an embodiment, the tactors 110o can move along the length of the body 120m (i.e., in a direction along or parallel the Z-axis of the shear display device 100m). In at least one embodiment, the movement of at least one of the plurality of tactors 110o may substantially follow a contour or a surface of the body 120m.

The shear display device 100m may include one or more input mechanisms 102a that allow a user to interface with another device, system, or simulated environment while receiving tactile feedback through the shear display device 100m. The input mechanism 102a may include one or more buttons, directional inputs (e.g., a thumb stick, directional pad, scroll wheel, etc.), switches, bumpers, triggers, or combinations thereof. The input mechanism 102a may include digital inputs and/or analog inputs. The buttons, directional inputs, switches, bumpers, and triggers may include various forms of tactile communication. For example, the input mechanism 102a may include a trigger mechanism that includes vibration feedback capabilities. As shown in FIG. 14A, the input mechanism 102a may include a central analog thumb joystick and a plurality of buttons distributed about the central thumb joystick. The buttons may be configured to replicate a button layout of popular entertainment system controllers (e.g., XBOX, PLAYSTATION, WII, etc. controllers). The thumb joystick and plurality of buttons may be operable by a user's thumb while gripping the body 120m with the remainder of the user's hand. In other embodiments, the input mechanism 102a may be located elsewhere on the shear display device 100m without substantially interfering with the communication of tactile information to a user through the tactors 110o.

The tactors 110o may move individually, in groups, or in simultaneous coordination to communicate information to a user. For example, a tactor 110o may move individually to communicate direction information to a user. In another example, a plurality of tactors 110o or groups of tactors 110o may move in simultaneous coordination to simulate a torque applied to a controlled object. Simultaneous coordination of tactors 110o may include moving tactors 110o located on opposing sides of the shear display device 100m in opposite or opposing directions at the same time. The tactile sensation of opposing tactors 110o providing skin shear in opposing directions may create a perception of the shear display device 100m rotating in the user's hand without interfering with the user's ability to operate the one or more input mechanisms 102a. Motion of the all the tactors 110o in the same direction may also be used to create the perception of force in the direction of tactor motion. The calculated motions of tactors 110o that cause torques and forces to be perceived can also be scaled separately and superimposed to represent nearly any force and/or torque combination.

The tactors 110o may be recessed in the body 120m or may have a portion of at least one tactor 110o outside the body 120m. Outside the body 120m should be understood to mean a location that is outside a perimeter around the body 120m that is defined by the outermost points of the body 120m. For example, a tactor 110o may recessed inside the body 120m if two points on an outer surface of the body 120m may be connected by a line without the line intersecting the tactor 110o. In another example, For example, a tactor 110o may recessed inside an elliptical perimeter of the body 120m if three points on an outer surface of the body 120m may be connected by a curve without the curve intersecting the tactor 110o. In at least one embodiment, a shear display device 100m having one or more recessed tactors 110o may allow a higher proportion of the body 120m to be in contact with a user's hand during use of the shear display device 100m when compared to a shear display device 100m having tactors 100m than are not recessed in the body 120m.

Figure 14B:
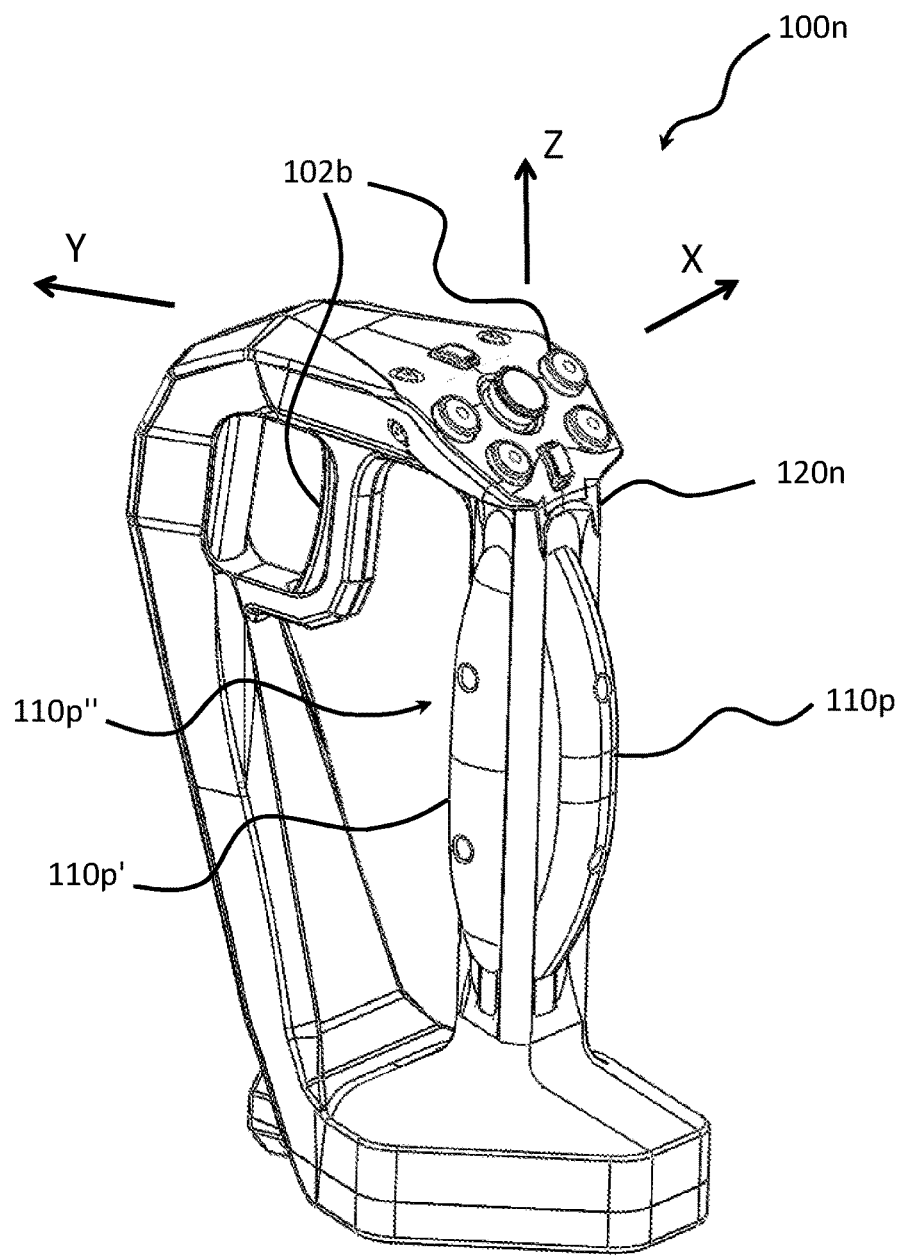
FIG. 14B is a perspective view of a shear display device having three sliding tactors in accordance with at least one embodiment of the present disclosure.

FIG. 14B depicts another embodiment of a shear display device 100n. *The shear display device* 100n may include one or more input mechanisms 102b, similar to those described in relation to FIG. 14A, and a plurality of tactors 110p located on a body 120n. In contrast to the shear display device 100m of FIG. 14A, the shear display device 100n of FIG. 14B may include three tactors 110p. The three tactors 110p may each be configured to move along a length of the elongated body 120n that forms the grip of the shear display device 100n. For example, each tactor 110p may be configured to move in a path that is parallel to the paths of the other two tactors in the body 120n. In another example, each tactor 110p may move in a non-parallel path to the other tactors, but generally along the length of the elongated body 120n. A user may grip the body 120n to hold onto the feedback device and engage each of the tactors 110p. Similar to the four tactor design described in relation to the shear display device 100m of FIG. 14A, the three tactor design of the shear display device 100n may communicate directional information to a user or simulate a torque applied to a controlled object.

The three tactors 110p of the shear display device 100n may move in simultaneous coordination to produce tactile sensations that a user may perceive as torque applied about various axes of the shear display device 100n. While the four tactors 110o of the shear display device 100m of FIG. 14A are distributed at 90-degree angles from one another with two pairs directly oppose one another, the tactors 110p of the shear display device 100n of FIG. 14B may not directly oppose one another. The tactors 110p may at least partly oppose one another. It should be understood that "at least partly oppose" may mean that a component of a vector may oppose a component of another vector. When a user grips the body 120n and tactors 110p of the shear display device 100n, a force applied to each of the tactors 110p may have a component of the force that opposes a component of the force applied to another tactor 110p. For example, the tactors 110p may be located at 120-degree angles from one another about the body 120n. The forces applied by the tactors in reaction to a user gripping the shear display device 100n may be oriented at 120-degree angles from one another. Each of the force vectors lying in a common plane may decompose into at least two components (e.g., X- and Y-direction components) of which at least a pair oppose one another. In some embodiments, therefore, tactors having an angular relation of at least 90-degrees from one another may at least partly oppose one another.

The components of the applied forces may allow the respective tactors to move in coordination and produce a single percept to a user that is a result of the motion of multiple tactors (110k', 110k", 110m', 110m") as discussed in connection with FIG. 10B. For further example, the 120-degree offset tactors 110p depicted in FIG. 14B may all move at the same time to create a perception of torque. A first tactor 110p may move up (relative to the body 120n) and second and third tactors 110p' and 110p" (not shown) may move down. The user may experience the movement of the second and third tactors 110p' and 110p" as a single tactor moving downward in the opposite direction of the movement of the first tactor 110p upward, which results in a single percept of a torque about the X-axis. That is, the resulting perception is that the shear display device 100n simulates a torque whose rotation is defined about the X-axis and that lies between the first tactor 110p and the centroid (as described in relation to FIGS. 10A and 10B) between the second and third tactors 110p' and 110p". Motion of all of the tactors 110p, 110p' and 110p" in the same direction may also be used to create the perception of force in the direction of tactor motion. Force and torque cues, using the motion of the tactors 110p, 110p', and 110p" can also be superimposed and portrayed to a user to represent combined loading cases, as would be understood by one with ordinary skill in the art. That is, if the tactor motions that correspond to multiple applied load cases are calculated separately, the resulting tactor motions can be added together to represent a single percept of the combined load condition to the user. For example, if one were holding a virtual rod horizontally from one end (as one would hold a sword) while pushing it into a virtual wall (normal to the wall), there are two main load components: 1) the moment from gravity being applied to the mass of the rod and 2) the force along the rod from piercing the wall. The gravity load would result in the tactors on opposite sides of the device (e.g., +Y and −Y sides of the device) to move in opposite directions, in proportion to the mass of the rod. The tactor motion that represents the piercing force would be for all of the tactor to move in the −Z-direction. To represent this combined load case, the resulting tactor motions are added together to create a single percept of this combined loading condition.

Figure 14C:
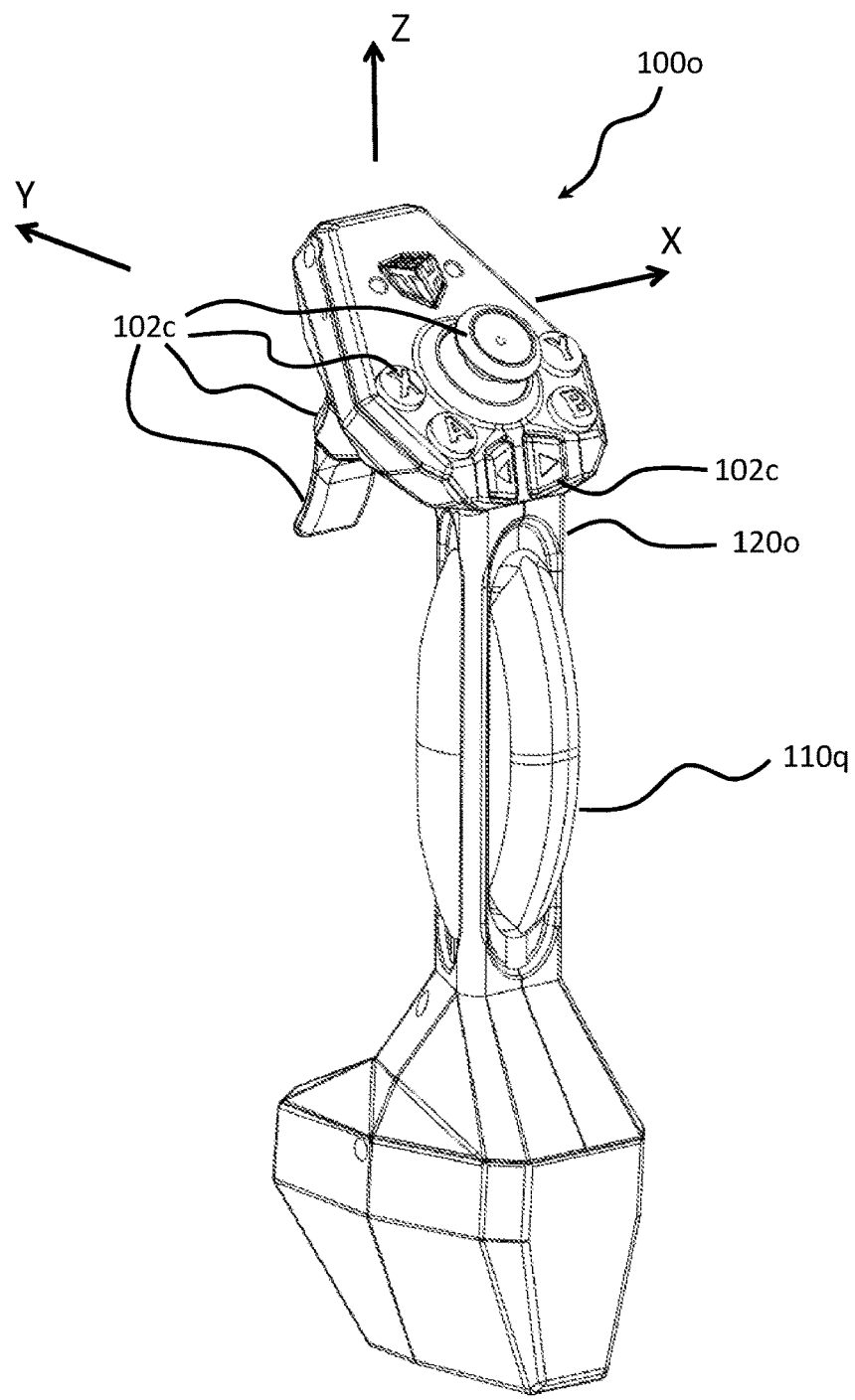
FIG. 14C is a perspective view of a shear display device having three sliding tactors in accordance with at least one other embodiment of the present disclosure.

FIG. 14C depicts another shear display device 100o. The shear display device 100o may be similar to that described in relation to FIG. 14B. The shear display device 100o may include a body 120o that includes three tactors 110q configured to move in parallel paths relative to the body 120o. The tactors 110q may move relative to one another to communicate torque information to a user. At least one of the tactors 110q may move substantially parallel to an axis of the body 120o. For example, the tactor 110q may move in a first path toward the top of the shear display device 100*o* (i.e., toward the input mechanism 102*c* in the depicted embodiment). In another example, the tactor 110*q* may move in a second path orthogonal to the first path (i.e. laterally and toward another tactor 110*q*). The tactors 110*q* may move in paths that are arcuate, convergent, divergent, or some combination thereof and may be properly considered "parallel" according to the present disclosure when the movement of the tactors 110*q* may be perceived by a user as parallel.

Figures 2, 14C:
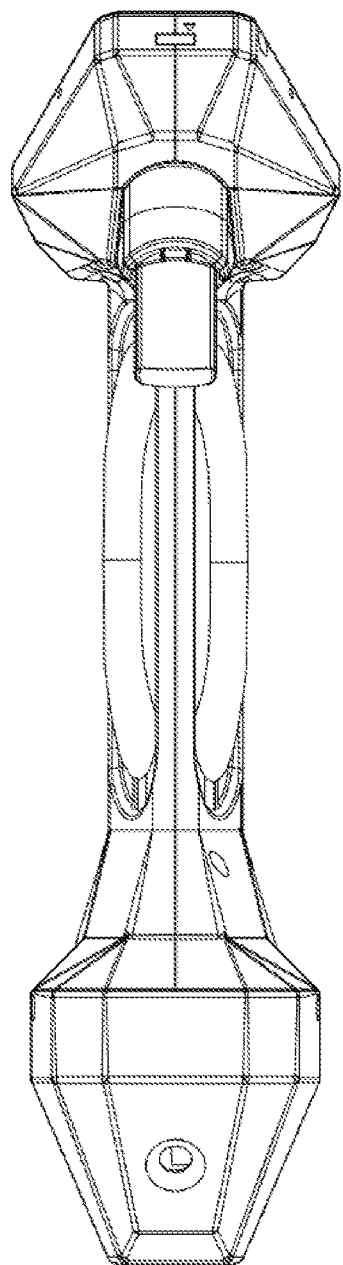
Figures 3, 14C:
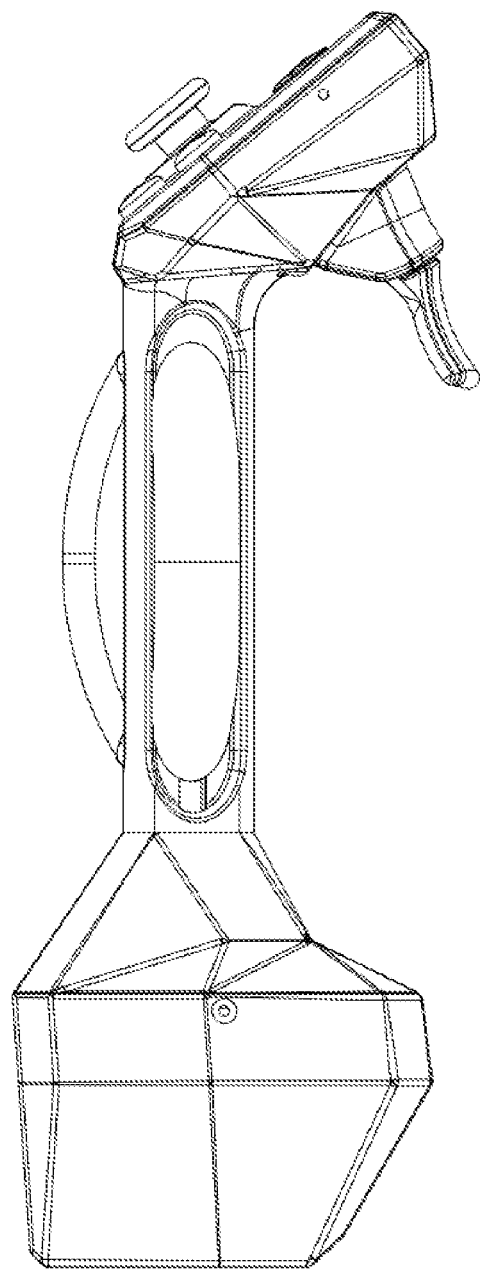
Figures 4, 14C:
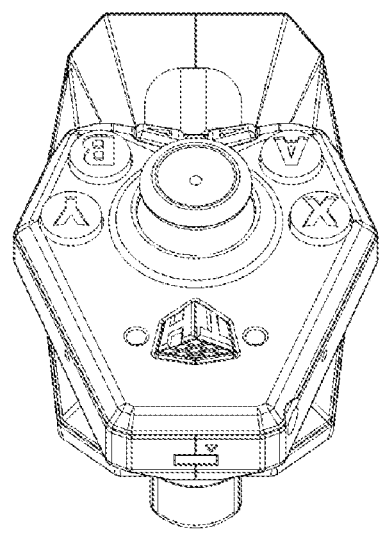
Figures 5, 14C:
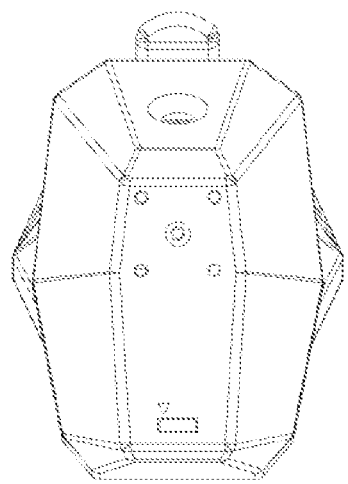
Figures 6, 14C:
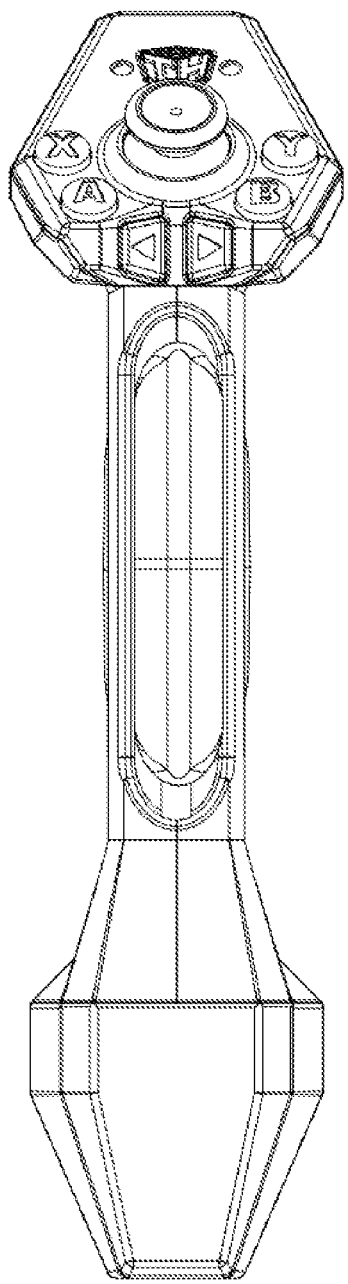
Figures 7, 14C:
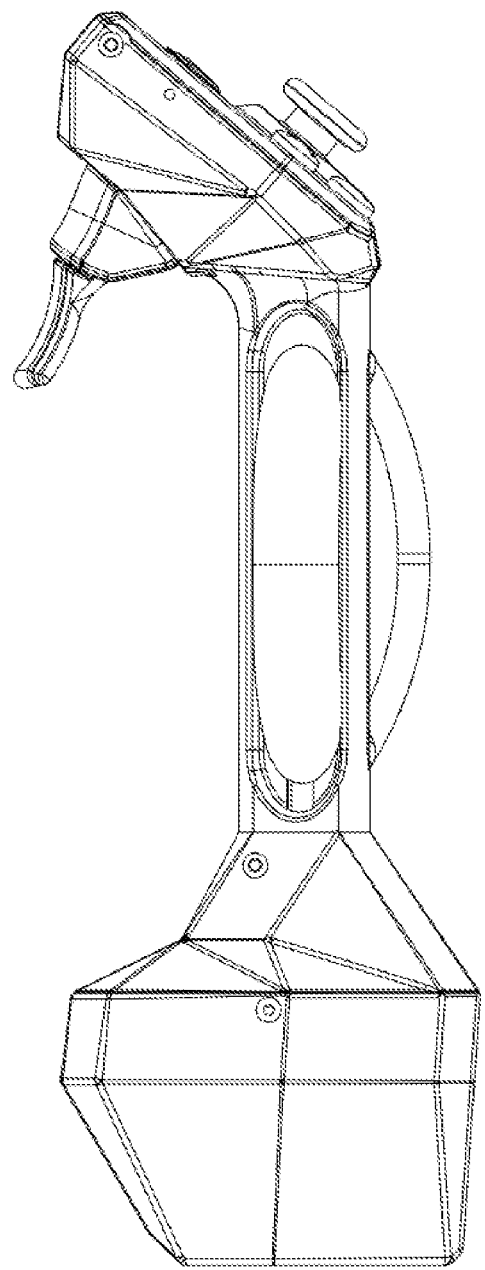

The shear display device 100*o* may be a wireless shear display device that a user may rotate and/or move freely in space. In addition to, the shear display device 100*o* may include physical input mechanisms 102*c* such as the described buttons, bumpers, triggers, directional inputs (e.g., thumb joystick), and other input mechanisms and/or may use one or more accelerometers and/or gyroscopes as input mechanisms 102*c*. The accelerometers and/or gyroscopes may measure and/or detect the movement and/or orientation of the shear display device 100*o* relative to a reference position. A reference position may be substantially aligned with one or more axes of the shear display device 100*o* or may be user-defined. As in FIG. 14B, the shear display device 100*o* in FIG. 14C may simulate the application of torque about an axis to a user by moving tactors 110*q* on opposing sides in opposite directions. Motion of the tactors 110*q* in the same direction may also be used to create the perception of force in the direction of tactor motion. The resulting tactor motions from different load cases (from forces and/or torques) may also be combined to create a single percept of the combined loading condition. FIGS. 14C-2 through 14C-7 illustrate the shear display device of FIG. 14C from a variety of perspectives.

Figure 14D:
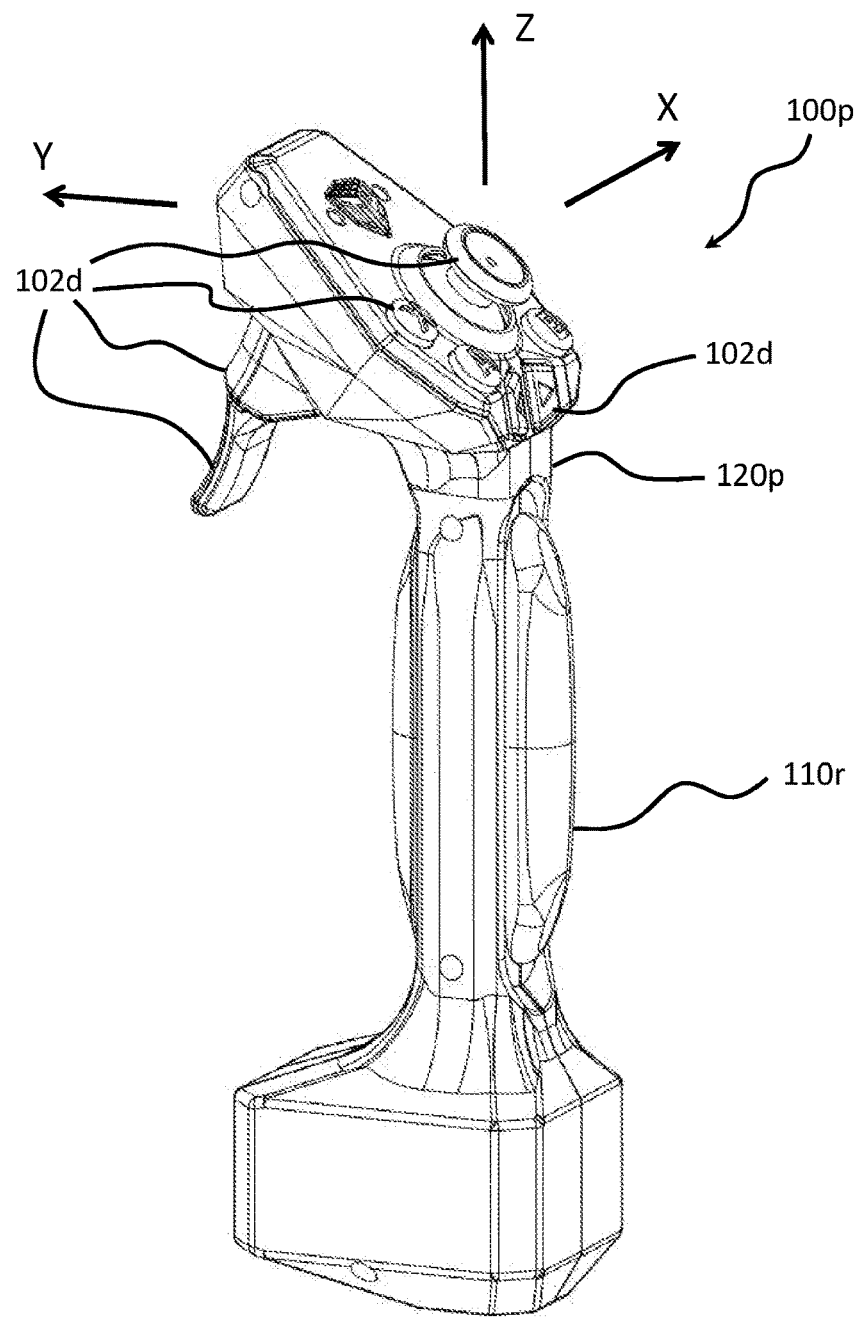
FIG. 14D is a perspective view of a shear display device having two sliding tactors in accordance with at least one other embodiment of the present disclosure.
Figures 2, 14D:
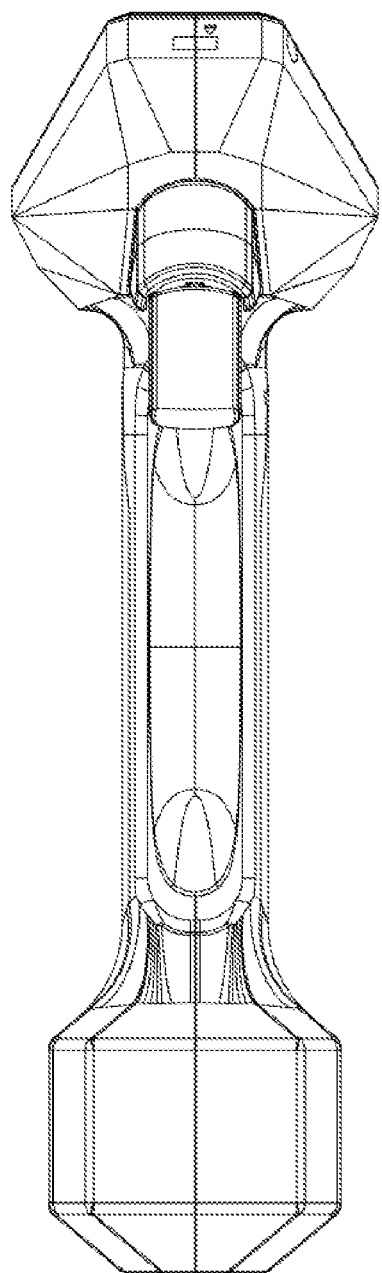
Figures 3, 14D:
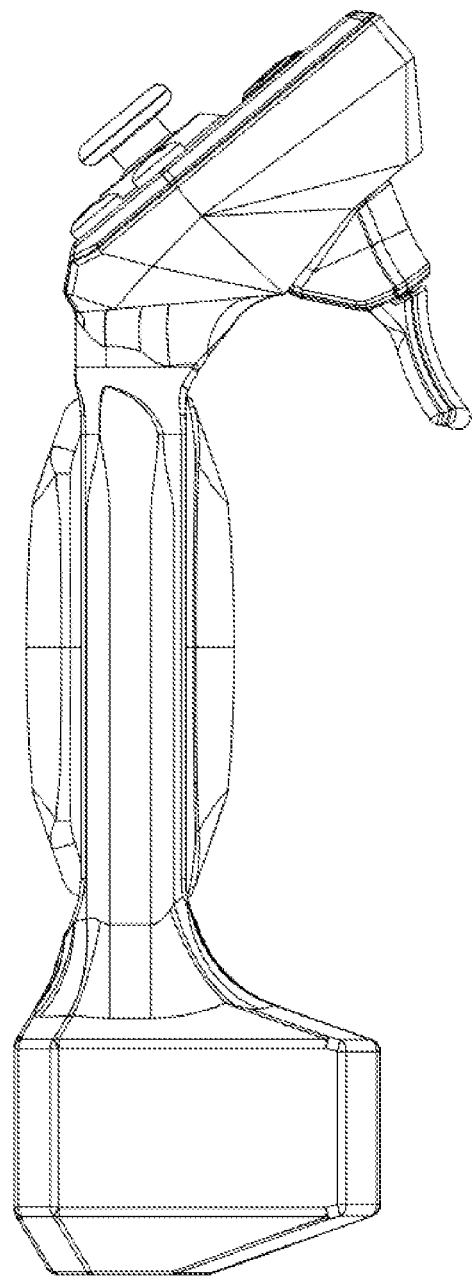
Figures 4, 14D:
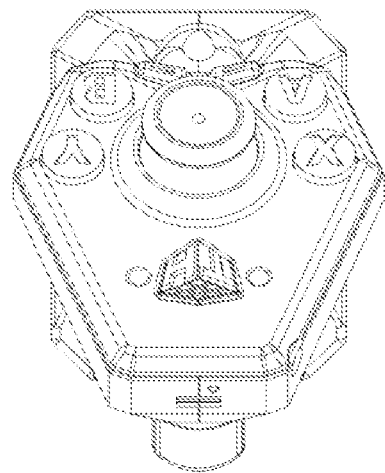
Figures 5, 14D:
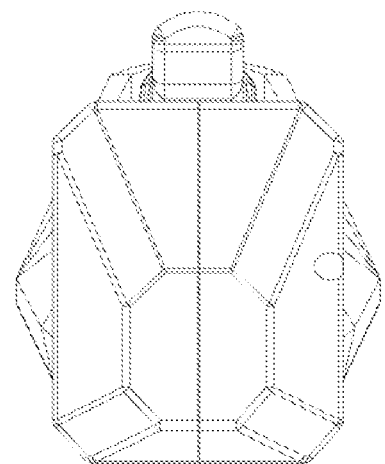
Figures 6, 14D:
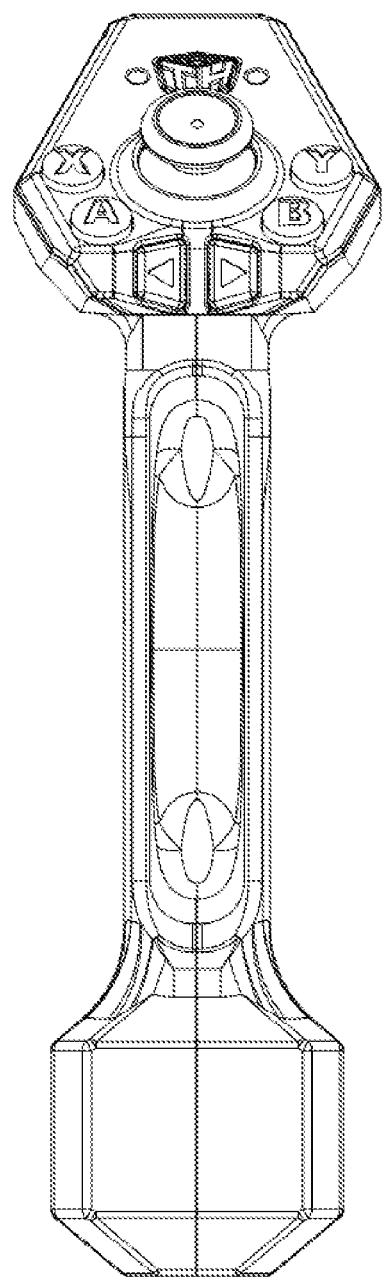
Figures 7, 14D:
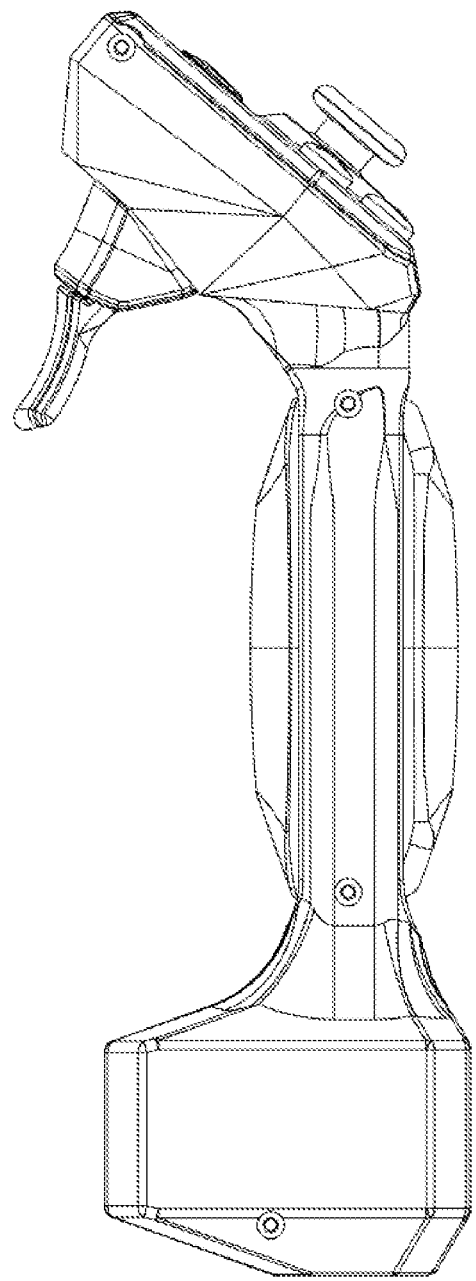

FIG. 14D depicts another shear display device 100*p* in accordance with the present disclosure. The shear display device 100*p* may include two tactors 110*r*. The two tactors 110*r* may move along paths that are parallel to the body 120*p* to induce skin shear at a target area of a user's hand. For example, the tactors may move in directions and/or relative to one another similar to the tactors 110*k* described in relation to FIGS. 10A and B and/or tactors 110*o* in relation to FIG. 14A. The tactors 110*r* may move in an opposite direction to one another to create a perception of a torque applied to the user's hand by the shear display device 100*p*. The shear display device 100*p* may, therefore, simulate the application of torque about an axis to a user. Motion of the tactors 110*o* in the same direction may also be used to create the perception of force in the direction of tactor motion. The use of a plurality of shear display devices 100*p* may simulate the application of torque about additional axes, as described herein. The resulting tactor motions from different load cases may also be combined to create a single percept of the combined loading condition. FIGS. 14D-2 through 14D-7 illustrate the shear display device of FIG. 14D from a variety of perspectives.

Figure 15A:
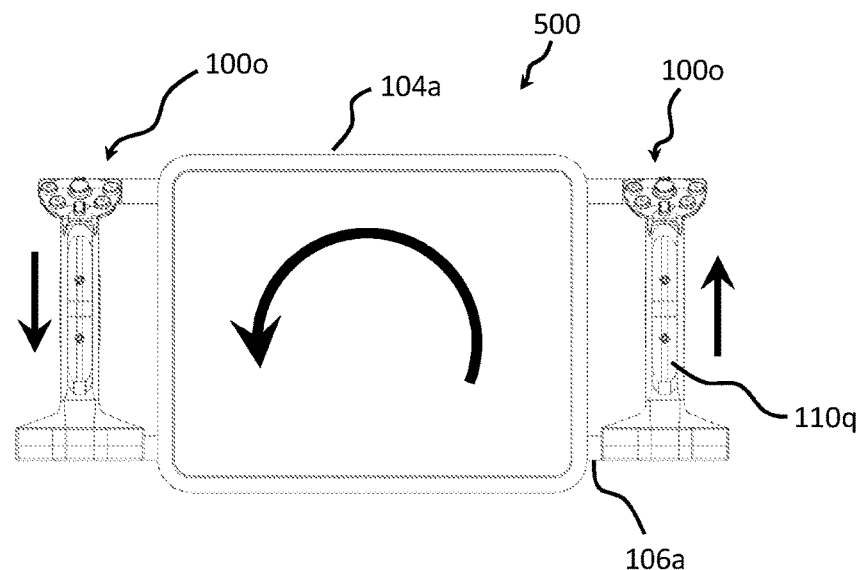
FIG. 15A illustrates a system including a plurality of shear display devices fixed relative to one another in accordance with at least one embodiment of the present disclosure.

A shear display device may also be used in conjunction with other shear display devices to provide a system by which a user may perceive force or torque applied to larger and/or more complex virtual objects than the scale of the shear display device, itself. For example, a plurality of shear display devices may be connected to simulate a side-by-side grip structure, such as a steering yoke; an angled grip structure, such as a shotgun grip and stock; or an in-line grip structure, such as a handle of a sword, baseball bat, or axe. FIG. 15A illustrates an embodiment of a shear display system 500 including a plurality of shear display devices 100*o* associated with frame 106*a*. The frame 106*a* may house a visual display 104*a*. The visual display 104*a* and plurality of shear display devices 100*o* may be fixed relative to one another by the frame 106*a*. In some embodiments, the visual display 104*a* may be a tablet computer, a computer monitor, a smartphone, a television, a video game console, another electronic visual display, or combinations thereof.

Figure 15B:
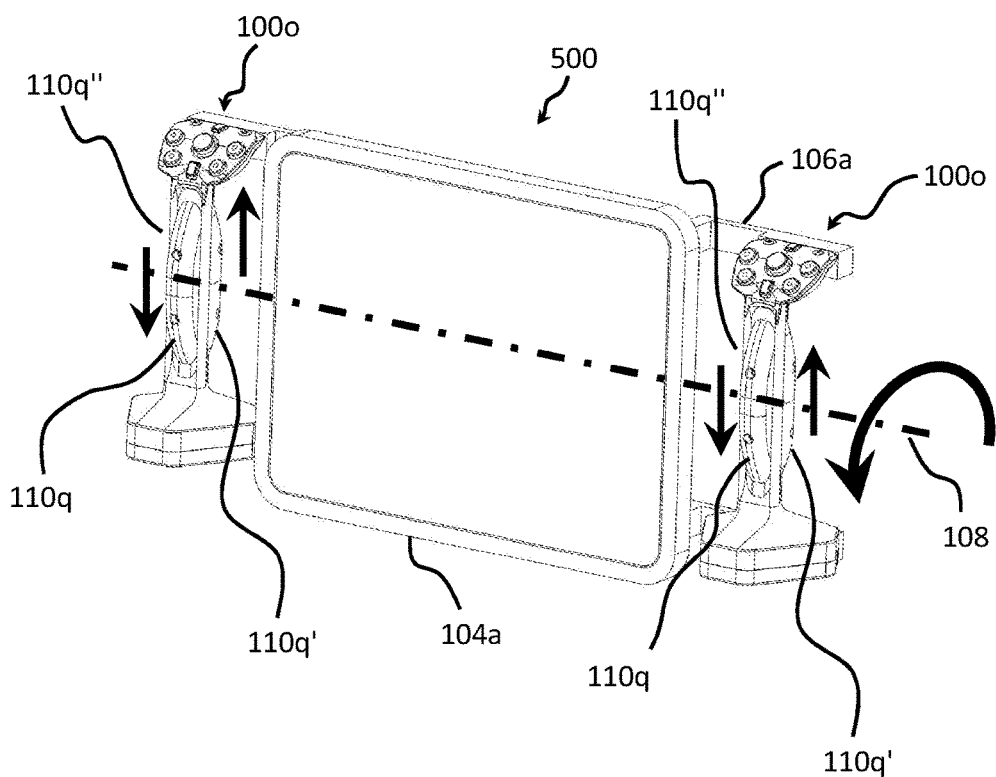
FIG. 15B is a perspective view of the system of FIG. 15A.

The shear display devices 100*o* of the system 500 are depicted having three tactors 110*q* located at 120-degree relationships to one another of the shear display devices 100*o*. However, it should be understood that the shear display devices 100*n* may have more or less than three tactors 110*q* and produce the appropriate torque perception, as described herein. As depicted in FIGS. 15A and 15B the shear display devices 100*o* of the system 500 may include three tactors at 120-degree relationships to one another and simulate torque information as described in relation to FIG. 14B. Although both shear display devices are shown as the same type, different shear display devices may be used. For example, a shear display device 100*p* with two tactors 110*r* may be used with a shear display device 100*m* having four tactors 110*o*. Other combinations are also contemplated.

The shear display devices 100*o* may provide tactile information using perceived centroids between tactors 110*q* as described in relation to FIG. 14B. The shear display devices 100*o* of the system 500 are depicted having three tactors 110*q* located at 120-degree relationships to one another on the shear display devices 100*o*.

The system 500 may simulate a torque vector normal to the frame 106*a* and/or visual display 104*a* by moving a tactor 110*q*' of one of the shear display devices 100*o* up and a tactor 110*q*" (not shown) of the other shear display device 100*o* in an opposite direction. The resulting skin shear on each of the user's hands may produce the perception of a torque applied by the system 500. In FIG. 15B, the system 500 is illustrated in a perspective view to show tactors 110*q*' and 110*q*" that each oppose the tactors 110*q*. The tactors 110*q*' and 110*q*" may move in an opposite direction to the tactors 110*q* to create a perception of a torque applied about a rotation axis 108 parallel to a longitudinal axis of the system 500. The frame 106*a* of the system 500 may align the shear display devices 100*o* with another component of the system 500. The alignment of the rotational axis 108 with another component of the system 500 may create the perception to a user that the applied torque is aligned with a rotational axis 108 of the component. For example, the frame 106*a* may align the shear display devices 100*o* with the visual display 104*a*. As described, the relative movement of the tactors 110*q*' and 110*q*" relative to tactors 110*q* may produce the perception of a rotation axis 108. The alignment of the shear display devices 100*o* with the visual display 104*a* (or other component of the system 500) by the frame 106*a* may allow the perceived rotational axis 108 to extend through the visual display 104*a* (or other component of the system 500).

Figure 16:
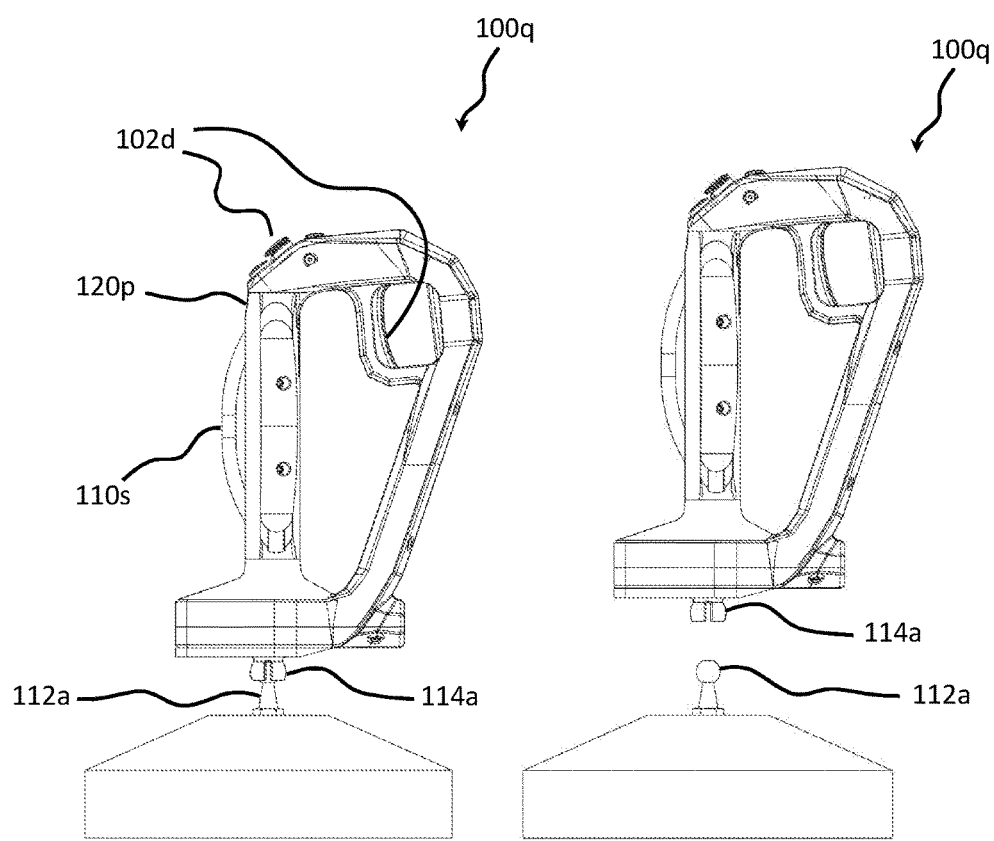
FIG. 16 illustrates a shear display device selectively connectable to a control interface in accordance with at least one embodiment of the present disclosure.

FIG. 16 illustrates an embodiment of a shear display device 100*q* that is selectively connectable to a control interface 112*a*. In such an embodiment, the user may use the one or more input mechanisms 102*d* on the shear display device 100*q* and move the shear display device 100*q* relative to the control interface 112*a* to issue instructions to and/or interact with a controlled object. The tactors 110*s* may communicate tactile information to the user via skin shear without substantially moving the user's hand relative to a body 120*p*. The user may, therefore, move the shear display device 100*q* relative to the control interface 112*a* precisely and accurately irrespective of the tactile information conveyed to the user simultaneously. The shear display device 100*q* may act as a joystick control when connected to a control interface 112*a*. When connected to the control interface 112*a*, the movement of the shear display device 100*q* relative to the control interface 112*a* may be yet another input mechanism 102*d* in addition to the input mechanisms described herein. For example, the shear display device 100*q* may include one or more accelerometers and/or gyroscopes to measure the movement of the shear display device 100*q* relative to a reference position shown in FIG. 16.

In the depicted embodiment, the control interface 112*a* is a ball stud and may interface with a control interface receiver 114*a* on the shear display device 100*q*. In other embodiments, the shear display device 100*q* may include a ball stud to interface with the control interface 112*a* and the control interface 112*a* may include a complimentary receiver. In yet other embodiments, a shear display device 100*q* may connect to a control interface 112*a* through any other appropriate connection mechanism, including but not limited to a threaded, snap fit, interference fit, twist lock (i.e., BNC connection), or other connection to a tiltable interface on the shear display device 100*q* and/or the control interface 112*a*. The control interface 112*a* and/or receiver 114*a* may include one or more mechanisms, such as a potentiometer, that may measure the position of the shear display device 100*q* relative to the control interface 112*a*. The control interface 112*a* may, therefore, operate as an input mechanism 102*d* in addition to or in alternative to input mechanisms described herein.

Figure 17:
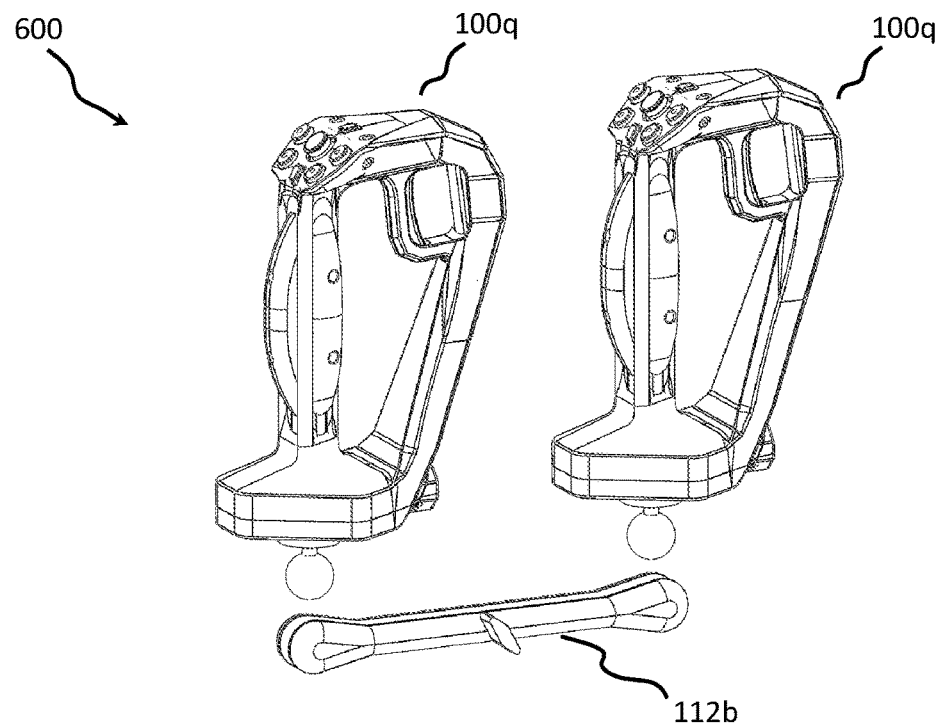
FIG. 17 illustrates a system including a plurality of connected shear display devices having multiple degrees of freedom relative to one another in accordance with at least one embodiment of the present disclosure.
Figure 17:
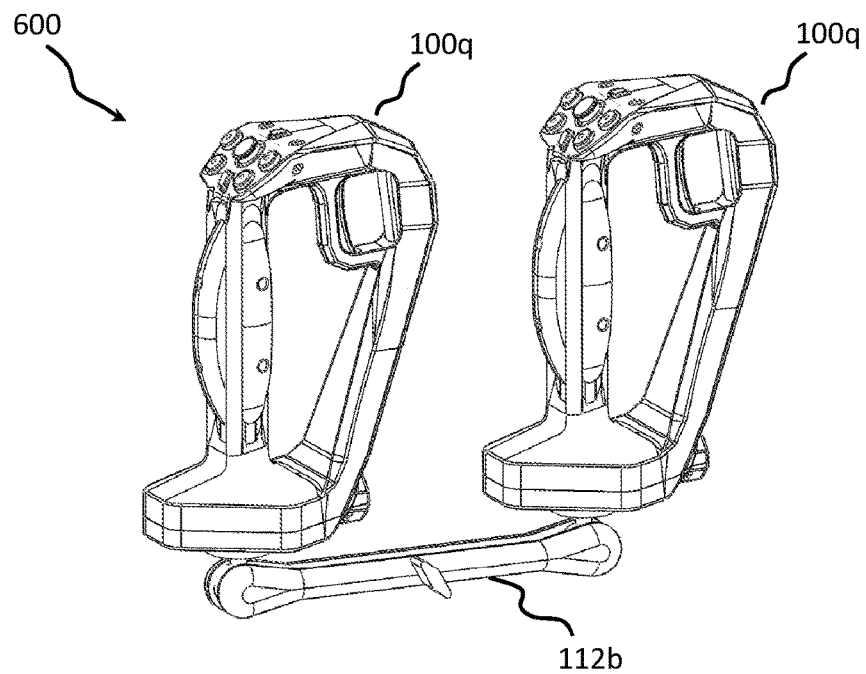

FIG. 17 illustrates another embodiment of a shear display system 600, which may include a plurality of shear display devices 100*q* and at least one control interface 112*b*. In some embodiments, the shear display system 600 may include a plurality of shear display devices 100*q* connected to a single control interface 112*b*. In other embodiments, a plurality of shear display devices 100*q* may be connected to a plurality of control interfaces 112*b*. In the depicted embodiment, the system 600 includes two shear display devices 100*q* configured to connect with a control interface 112*b*. The control interface 112*b* may receive inputs from the position and movement of one or more of the shear display devices 100*q* relative to the control interface 112*b* (e.g., tilting the shear display device 100*q* like a joystick) and/or from the position and movement of the control interface 112*b* itself due to the position and movement of the shear display devices 100*q* relative to one another (e.g., movement of the two shear display devices like a steering yoke).

Similar to FIG. 16, the control interface 112*a* and/or shear display device 100*q* may connect through any other appropriate connection mechanism, including but not limited to a ball stud, threaded, snap fit, interference fit, twist lock (i.e., BNC connection), or other connection to a tiltable interface on the shear display device 100*q* and/or the control interface 112*a*. The movement of one or more of the shear display devices 100*q* relative to the control interface 112*b* may be yet another input mechanism 102*d* in addition to the input mechanisms described herein. For example, at least one of the shear display devices 100*q* may include one or more accelerometers and/or gyroscopes to measure the movement of the shear display devices 100*q* relative to a reference position shown in FIG. 17. The control interface 112*b* may include one or more mechanisms, such as a potentiometer, that may measure the position of one or more the shear display device 100*q* relative to the control interface 112*b*. The control interface 112*b* may, therefore, operate as an input mechanism 102*d* in addition to or in alternative to input mechanisms described herein.

Figure 18:
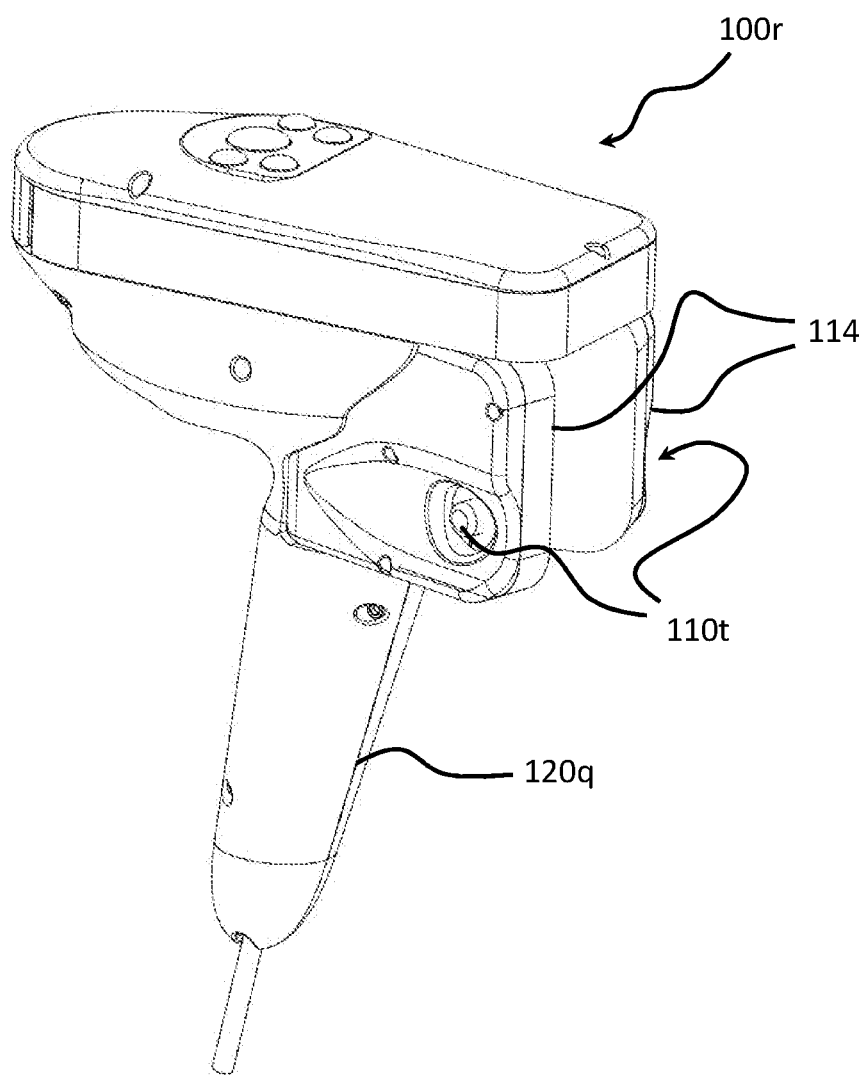
FIG. 18 illustrates a precision grip shear display device with opposing shear feedback in accordance with at least one embodiment of the present disclosure.

FIG. 18 depicts a shear display device 100*r* that may include opposing tactors 110*t* (second tactor 110*t* not shown) located on movable arms 114. The movable arms 114 may have an opposing "gripper" degree of freedom that can be incorporated into a shear display device 100*r* that uses back-to-back shear displays, shown in FIG. 18. The gripper degree of freedom may allow the movable arms 114 (shown open in FIG. 18) to move relative to one another in a direction normal to the surface of the tactors 110*t* to simulate the physical act of gripping an object between the tactors 110*t*. The movable arms 114 may move simultaneously and in equal amounts away from one another to simulate the expansion of a simulated or remote object. The movable arms 114 may move independently of one another to simulate the movement of a simulated or remote object. A user may grip the body 120*q* with a thumb and forefinger on a tactor 110*t* on each of the movable arms 114. The movable arms 114 may move relative to the body 120*q* to simulate lateral movement of the simulated or remote object. For example, the shear display device 100*r* may simulate the use and/or control or a scalpel. The tactors 110*t* may move in opposing directions to communicate torque on the scalpel during a procedure while the movable arms may communicate gross movement of the scalpel in a lateral direction. The tactors 110*t* may move in the same direction to communicate a force on the scalpel. The movable arms 114 may allow the shear displays including tactors 110*t* to move normal to a plane of the user's skin while the tactors 110*t* themselves may move with two degrees of freedom within the plane. The opposing tactors 110*t* shown in FIG. 18 work on the same principle as described in relation to the sliding tactors 110*o-q* of FIGS. 14A-D. For example, the tactors 110*t* can be actuated in the same direction to provide translational force and motion cues in the associated direction. Tactors 110*t* on opposite sides of the controller can be moved in opposite direction to create torque or rotary tactile cues to a user.

Figure 19A:
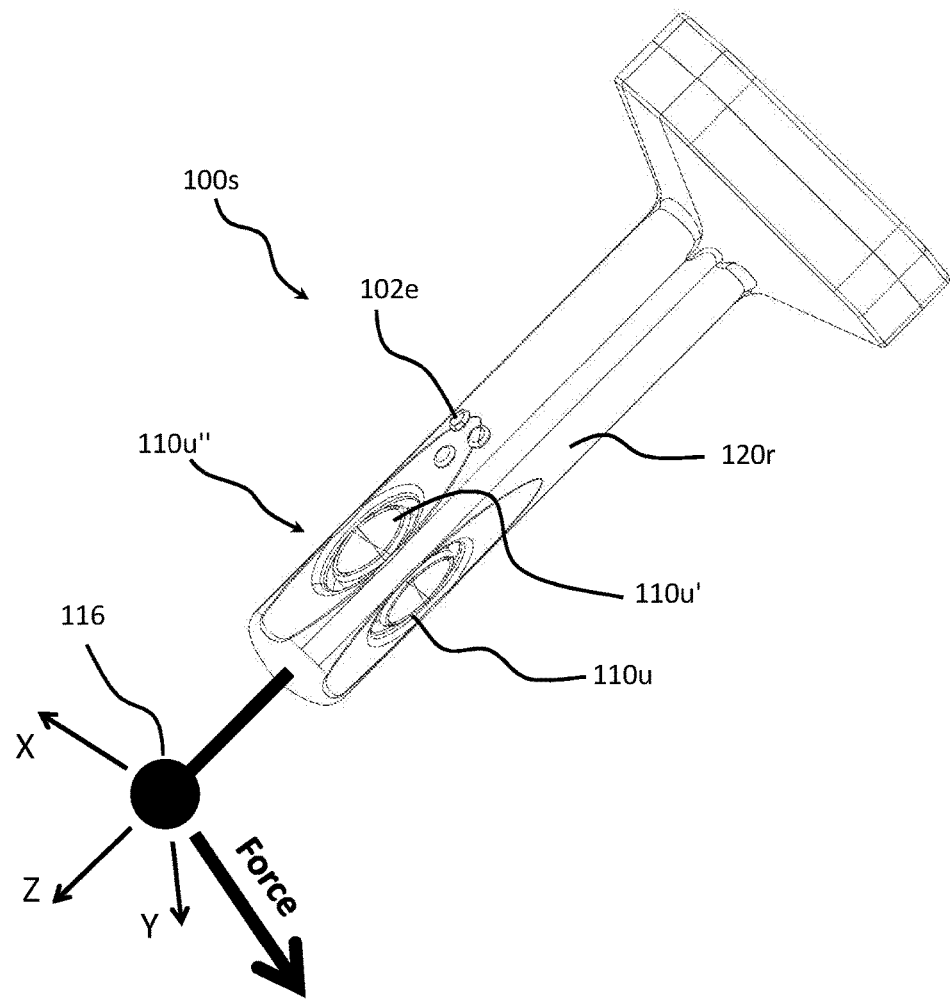
FIG. 19A illustrates a shear display device simulating a virtual interaction point external to the device in accordance with at least one embodiment of the present disclosure.
Figure 19B:
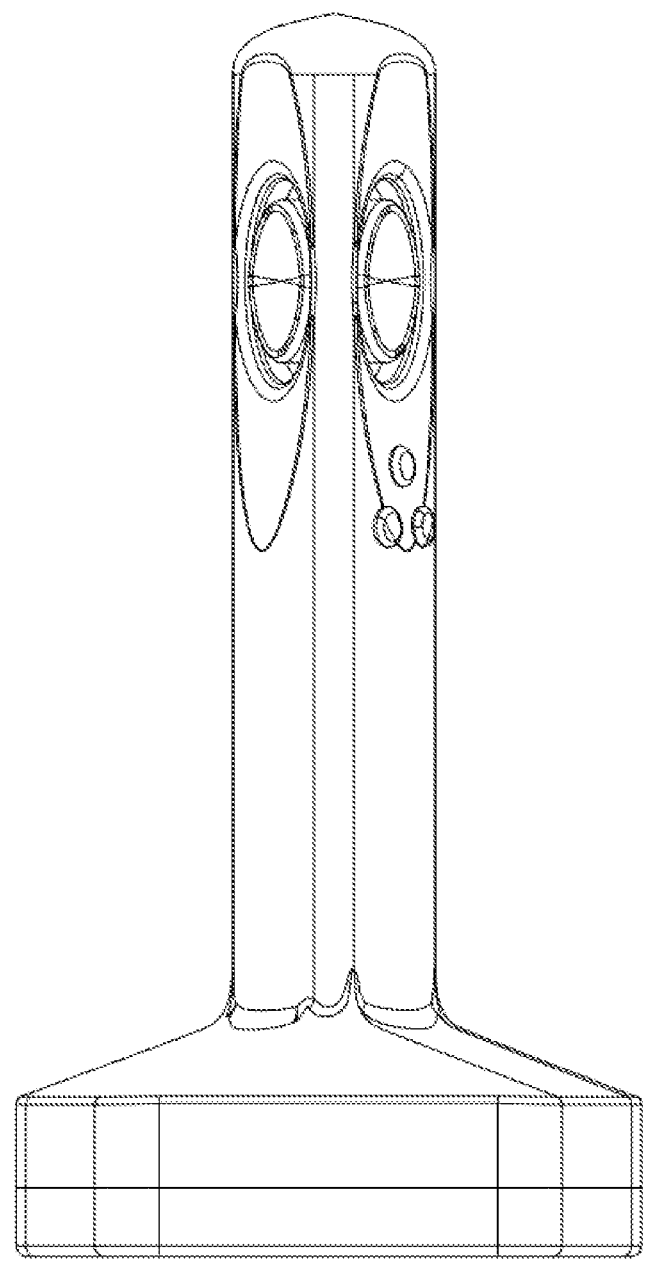
FIG. 19B is a front view of the shear display device of FIG. 19A.
Figure 19C:
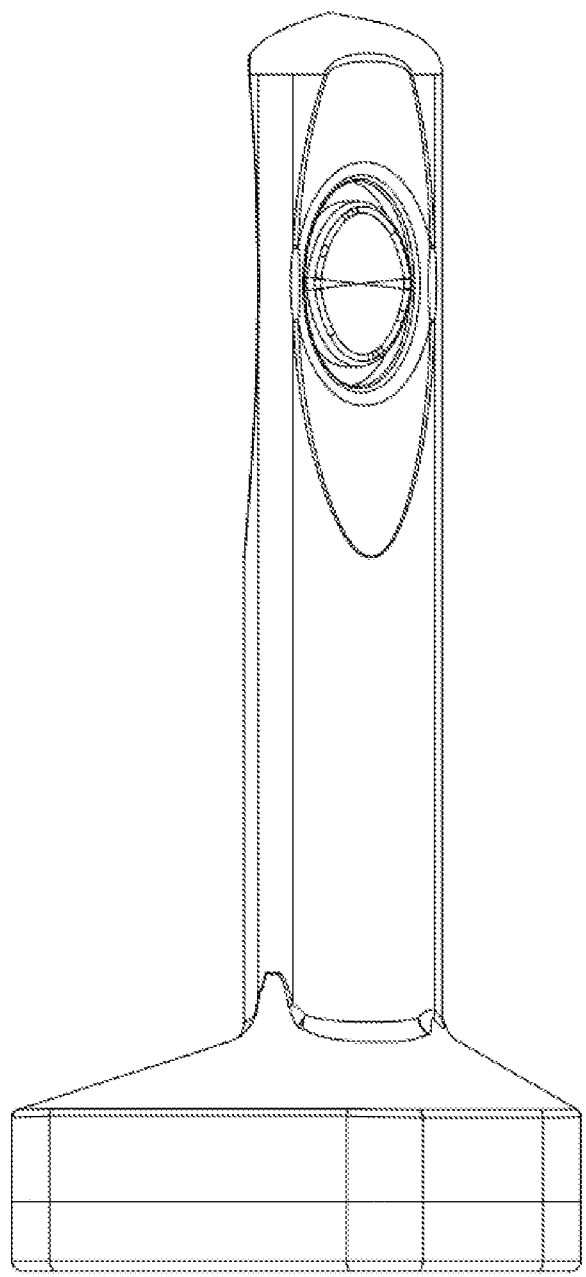
FIG. 19C is a right side view of the shear display device of FIG. 19A.
Figure 19D:
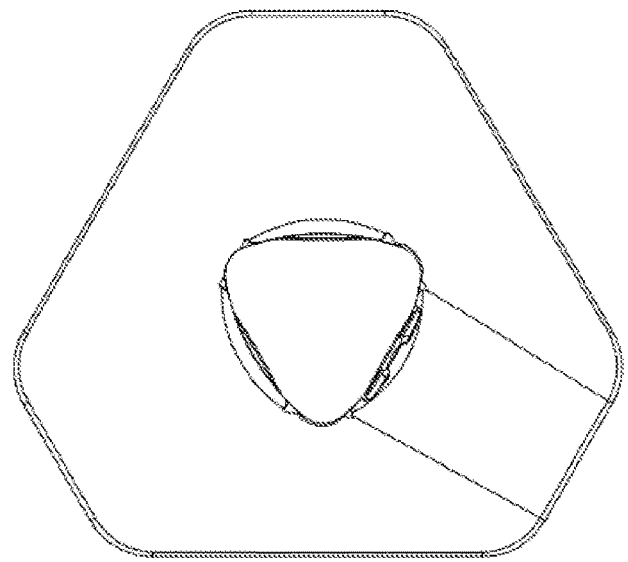
FIG. 19D is a top view of the shear display device of FIG. 19A.
Figure 19E:
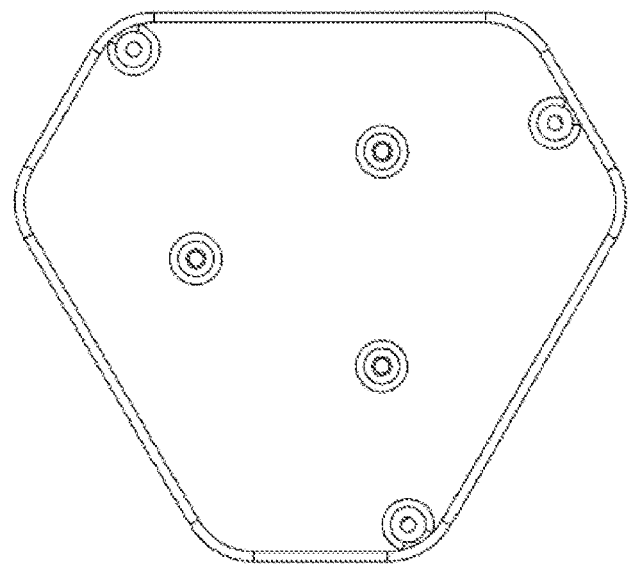
FIG. 19E is a bottom view of the shear display device of FIG. 19A.
Figure 19F:
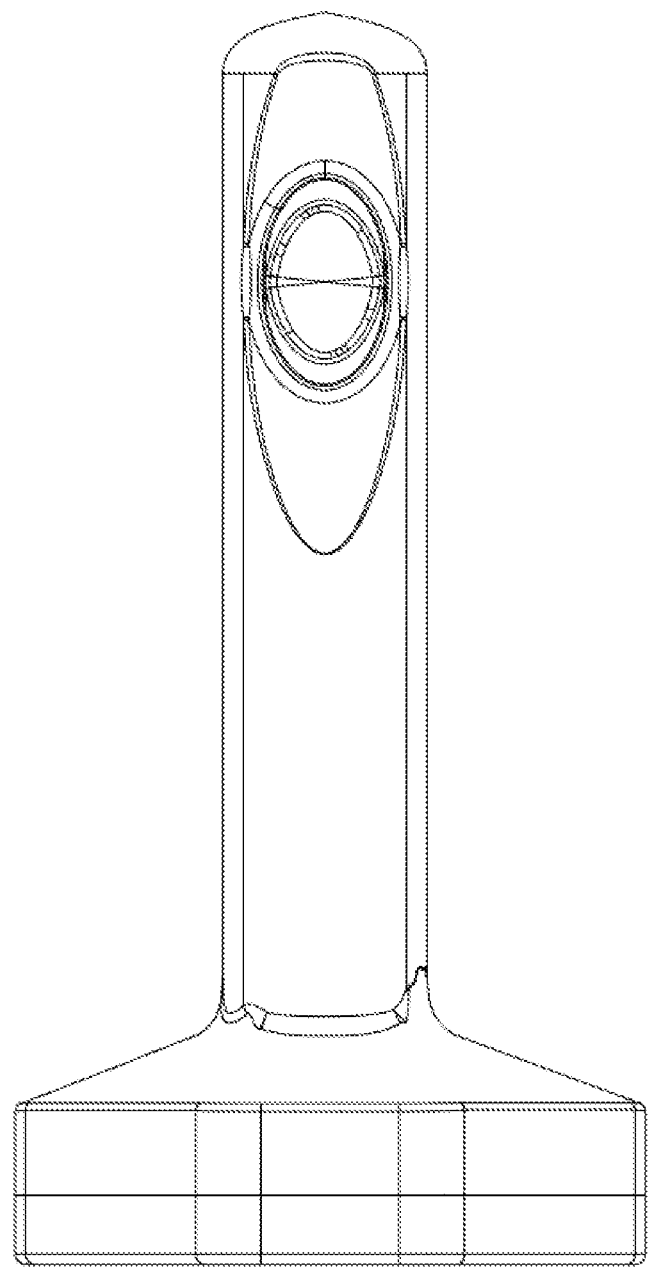
FIG. 19F is a back view of the shear display device of FIG. 19A.
Figure 19G:
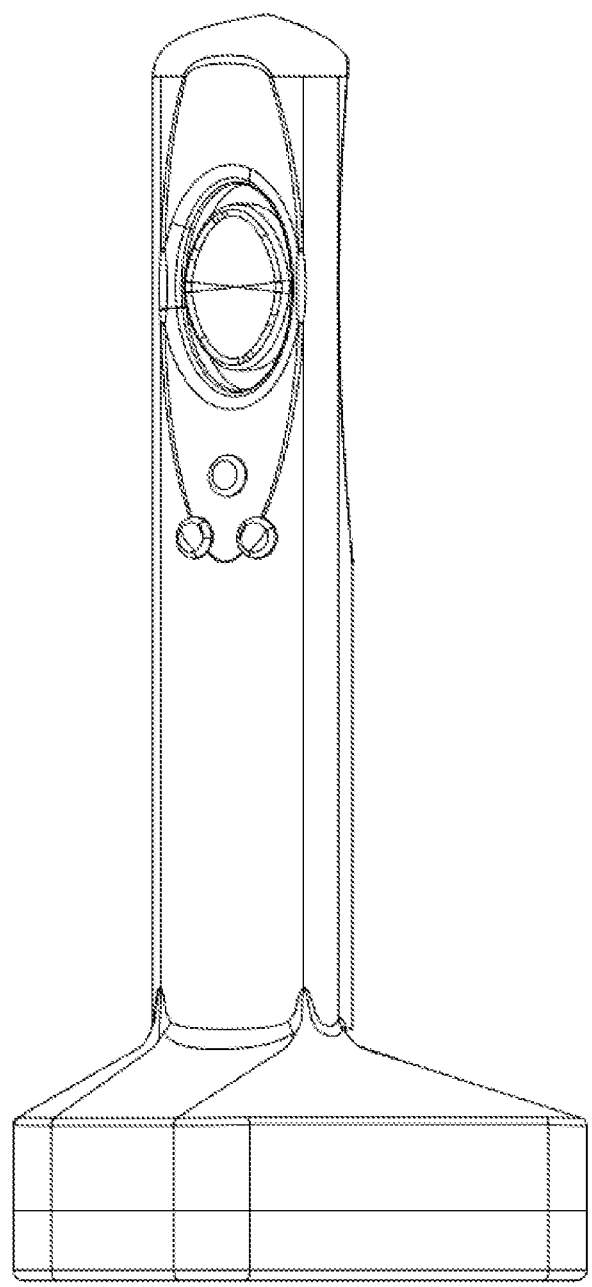
FIG. 19G is a left side view of the shear display device of FIG. 19A.

FIG. 19A depicts a shear display device 100*s* that may be used to simulate interactions with a virtual interaction point 116. The shear display device 100*s* may include one or more tactors 110*u*, 110*d*, and 110*u*" (not shown) located on a body 120*r* that may be held by a user. The one or more tactors 110*u* may convey tactile information to a user while the user holds the body 120*r*. The shear display device 100*s* may simulate a pen, stylus, scalpel, or other elongated tool held in the hand between the forefinger and thumb. The one or more tactors 110*u* may contact one or more fingerpads. The shear display device 100*s* may include one or more tactors 110*u* configured to engage with another part of the user's hand, such as the palm of the hand. The shear display device 100*s* may include one or more input mechanisms 102*e* to facilitate communication with and/or commands to a controlled and/or simulate object. In some embodiments, the shear display device 100*s* may include one or more input mechanisms 102*e* located on the body 120*r* of the shear display device 100*s*. In other embodiments, the shear display device 100*s* may include one or more input mechanisms 102*e* incorporated into the tactors 110*u*. For example, at least one of the tactors 110*u* may be configured to move within a two-dimensional plane substantially co-planar with a surface of the body 120*e* and the tactor 110*u* may be depressed by a user normal to the two-dimensional plane to effect communication with a controlled and/or simulated object (e.g., pressing on the tactor may depress a switch).

The shear display device 100*s* may use the one or more tactors 110*u* to simulate interactions with a virtual interaction point remote and/or external to the body 120*r* of the shear display device 100s. For example, movement of one or more tactors 110u may simulate torque on the shear display device 100s based on a virtual interaction point 116. A plurality of tactors 110u located on the body 120r may move simultaneously, for example in opposing directions, to simulate torque on the body 120r. Forces through this same virtual interaction point 116 along the length of the device 100s (along the Z-axis) may also be portrayed by moving all of the tactors 110u in the same direction, as discussed in relation to FIG. 10B. A special case may include a virtual interaction point 116 in line with the elongated body 120r of the shear display device 100s used to replicate a pen, stylus, scalpel, or other elongated tool. By placing the virtual interaction point 116 external to and in line with the body 120r, it is possible for the two degrees of freedom of virtual torque to be interpreted as the lateral forces experienced at the remote virtual interaction point 116. The torque experienced through the body 120r would be the natural way one would experience the lateral force interactions with the environment at this remote point. For example, a user may use a stick to push laterally on a surface, resulting in lateral forces on the stick perceived by the forces on the user's hand by the stick. A longer stick may result in a rotational moment that is perceived by the user as significantly larger than the lateral reaction force. In the limit, a user may only perceive the torque resultant from the interaction, allowing sufficient simulation of the interaction through only the torque simulation of the plurality of tactors 110u. Hence 3-dimensional force feedback can be emulated by portraying the force along the Z-axis by moving the tactors 110u all in the same direction, and lateral forces (in the X-Y plane) can emulated by portraying torques about the X and Y axes, by moving the corresponding tactors 110u in opposite directions, as discussed in connection with FIGS. 10B and 14B. Also, as discussed in connection with FIG. 14B, the tactor motions that result from multiple load cases can also be combined to create a single percept of the combined load cases. FIGS. 19B through 19G illustrate the shear display device of FIG. 19A from a variety of perspectives.

Figure 20:
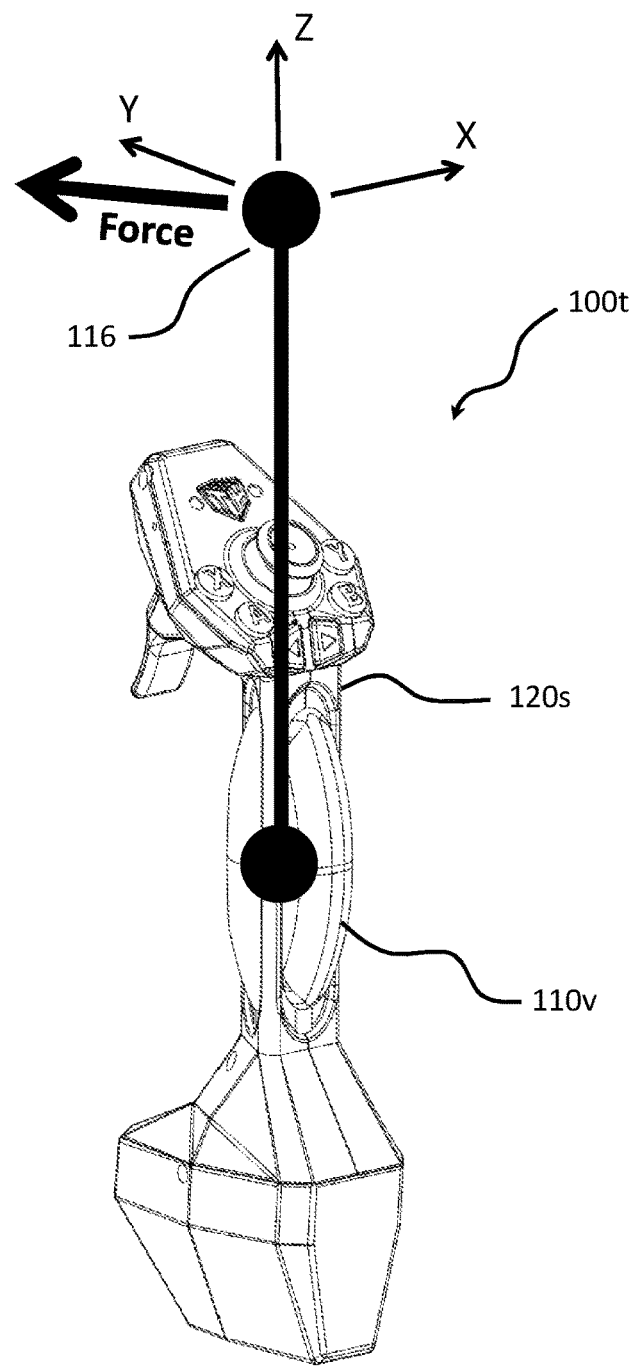
FIG. 20 illustrates a shear display device having three sliding tactors and configured to simulate a virtual interaction point external to the device in accordance with at least one embodiment of the present disclosure.

FIG. 20 depicts another embodiment of a shear display device 100t that may be used with a virtual interaction point external to a body. The shear display device 100t may be similar in configuration to the shear display device 100o of FIG. 14C. In contrast to the shear display device 100s of FIG. 19A, the shear display device 100t shown in FIG. 20 is preferably not held between a user's forefinger and thumb similar to a pen, stylus, or scalpel, but rather held by wrapping a user's palm and fingers around a body 120s of the shear display device 100t. The virtual interaction point 116 may be external to and in line with the body 120s such that the movement of a plurality of tactors 110v may simulate a reaction force and/or torque with the virtual interaction point 116. The tactors 110v may include a plurality of tactors 110v in the body 120s of the shear display device 100t.

At least two of the plurality of tactors 110v may at least partly oppose one another. For example, the tactors 110v may be located at 120-degree angles from one another about the body 120s. The forces applied by the tactors in reaction to a user gripping the shear display device 100t may be oriented at 120-degree angles from one another. Each of the force vectors lying in a common plane may decompose into at least two components (e.g., X- and Y-direction components) of which at least a pair oppose one another. In some embodiments, therefore, tactors having an angular relation of at least 90-degrees from one another may at least partly oppose one another. In other embodiments, tactors having an angular relation of less than 270 degrees from one another may at least partly oppose one another. In another example, three tactors arranged at 120-degree angles from one another about a common axis may all partly oppose one another (i.e., each tactor partly opposes the other two tactors). As discussed in connection with FIG. 19A, it is also possible to emulate or portray 3-dimentional force feedback with the use of a virtual interaction point 116. That is, following the same logic as expressed for above in relation to FIG. 19A, 3-dimensional force feedback can be emulated by portraying the force along the Z-axis by moving the tactors 110v all in the same direction, and lateral forces (in the X-Y plane) can emulated by portraying torques about the X and Y axes, by moving the corresponding tactors 110v in opposite directions, as discussed in connection with FIGS. 10B and 14B. Also, as discussed in connection with FIG. 14B, the tactor motions that result from multiple load cases can also be combined to create a single percept of the combined load cases.

Figure 21A:
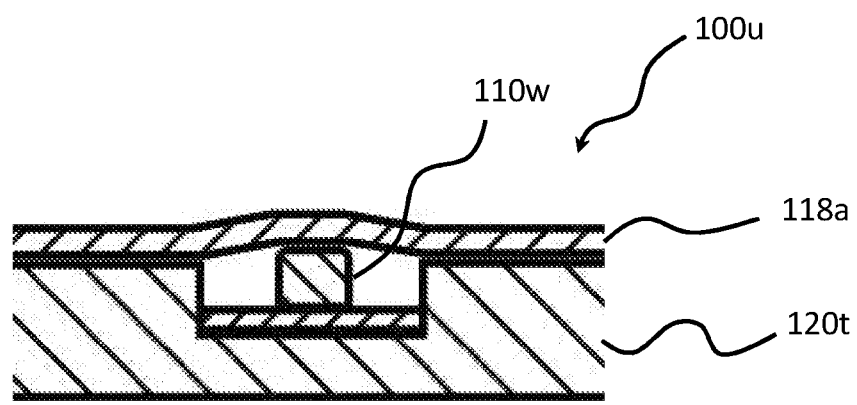
FIG. 21A illustrates a tactor having a covering including a flexible material in accordance with at least one embodiment of the present disclosure.
Figure 21B:
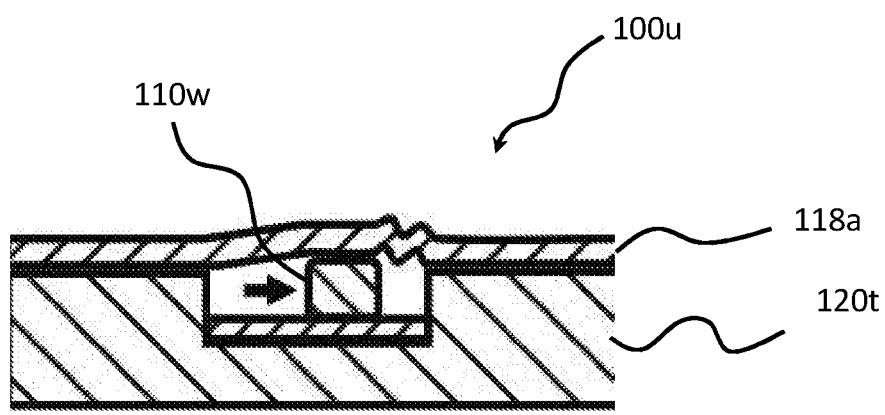
FIG. 21B illustrates the tactor of FIG. 21A moving or deforming the covering including a flexible material in accordance with at least one embodiment of the present disclosure.
Figure 21C:
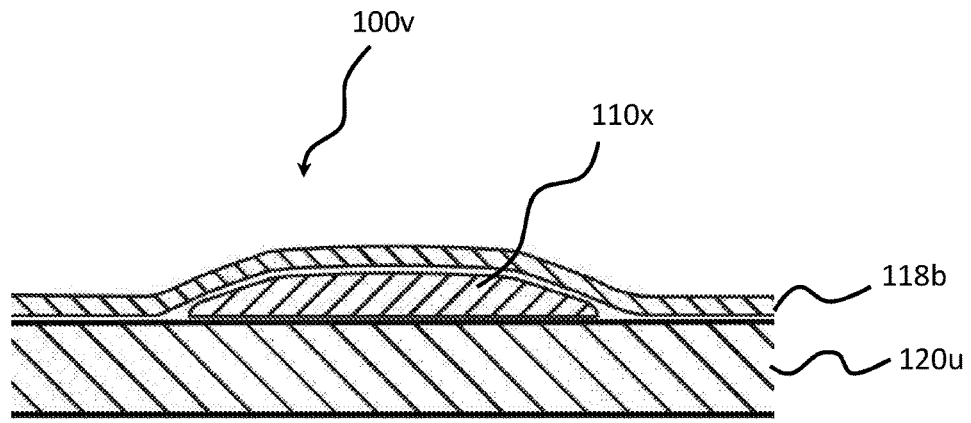
FIG. 21C illustrates a sliding tactor having a curved tactor and a covering including a flexible material in accordance with at least one embodiment of the present disclosure.
Figure 21D:
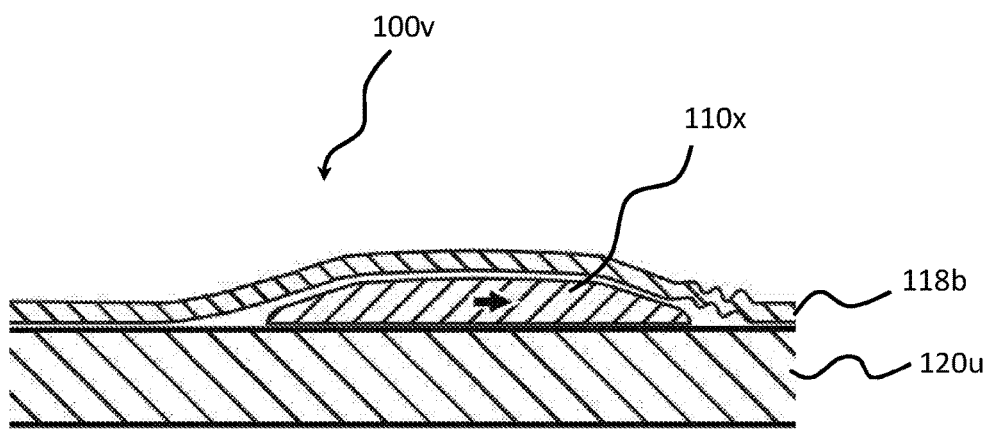
FIG. 21D illustrates the tactor of FIG. 21C deforming the covering including a flexible material in accordance with at least one embodiment of the present disclosure.

FIGS. 21A, 21B, 21C, and 21D are cross-sectional side views of a schematic representation of tactors 110w, 110x in shear display devices 100u, 100v having a flexible materials 118a, 118b covering the tactors 110w, 110x. FIG. 21A illustrates the tactor 110w in a "home" position while FIG. 21B illustrates the interaction between the flexible material 118a and the tactor 110w away from the "home" position for a device 100u where the outboard surface of the tactor 110w is approximately flush with the outer surface of the device's body 120t. FIG. 21C illustrates the tactor 110x in a "home" position while FIG. 21D illustrates the interaction between the flexible material 118b and the tactor 110x away from the "home" position for a device 100v where the tactor 110x protrudes from the outer surface of the device's body 120u.

When implementing haptic feedback into a device, the tactor 110w, 110x may be covered by a sheet of flexible material 118a, 118b (e.g., a rubber membrane) with the appropriate friction properties or connection between the flexible material 118a, 118b and tactor 110w, 110x so as to transmit friction from the motion of the tactor 110w, 110x to the skin of the user's hand through the flexible material 118a, 118b. Covering the moving tactor 110w, 110x with such a flexible material 118a, 118b may reduce the sense that there are multiple discrete tactors and make the friction forces applied to the user's hand appear more continuous, contributing to the creation of a single percept. A covering of flexible material 118a, 118b may decrease the chance that that a portion of the user's skin could become caught or pinched between the moving tactors and the body 120t, 120u of the shear display device 100u, 100v. A covering of flexible material 118a, 118b may act as a protective cover to prevent particulates or moisture from getting into the body 120t, 120u of the shear display device 100u, 120v.

Figure 22:
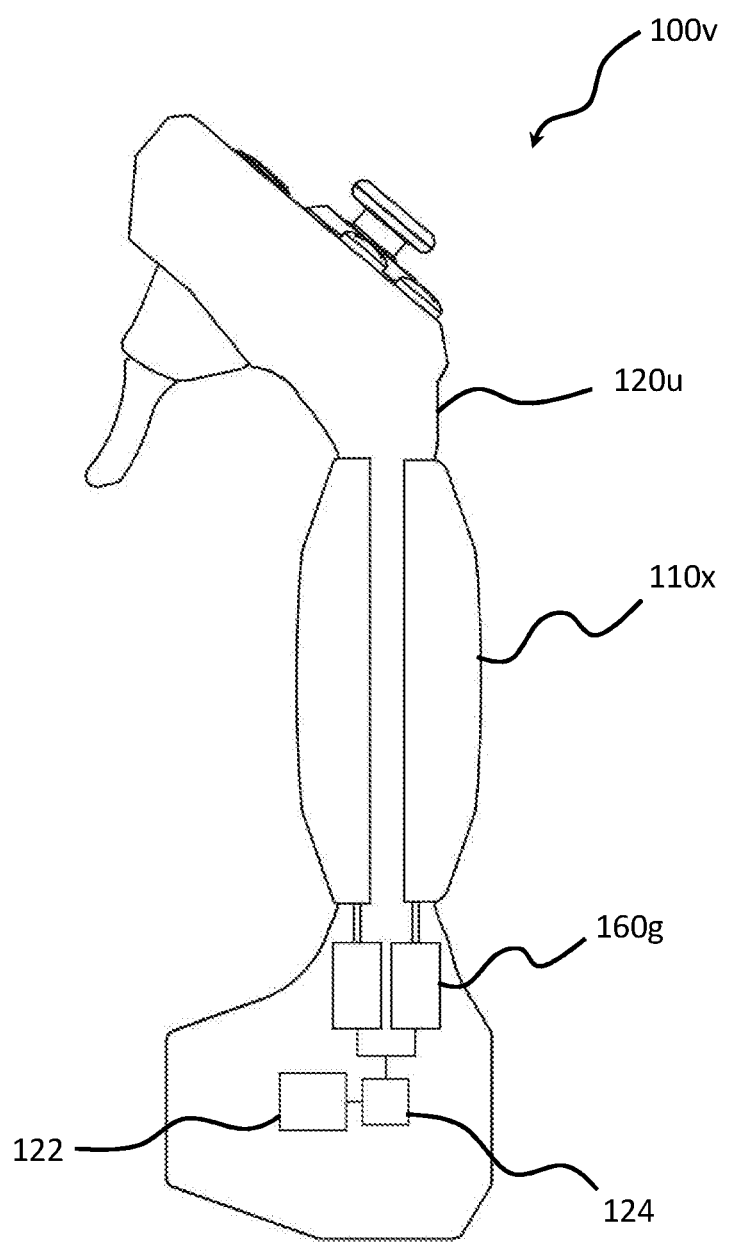
FIG. 22 schematically illustrates a cross-sectional view of a shear display device having a micro-processor and memory configured to perform at least one method in accordance with the present disclosure.

FIG. 22 schematically depicts a cross-section of a shear display device 100v that may include a microprocessor 122 and memory 124 in communication with one or more motors 160g or other actuators (e.g., geared motor, motor and linkage, motor and cam, motor and leadscrew, etc.) to move one or more tactors 110x relative to a body 120u. The memory 124 may include a memory module. When the shear display device 100v is used to interact with a virtual and/or remote controlled object or device, the memory 124 may contain and/or receive movement and/or force information. The memory 124 may communicate with the microprocessor 122 to allow the microprocessor access to the information. The microprocessor 122 may actuate one or more motors 160g or other actuators connected to one or more tactors 110x to simulate interactions with virtual and/or remote objects. For example, the shear display device 100v may be used to communicate with a virtual arm in a simulated environment. The virtual arm may replicate the shear display device 100v or may have different dimensions. If the virtual arm shares dimensions with the shear display device 100v, the microprocessor 122 may use movement and/or force information from the simulation in memory 124 to actuate one or more motors 160g to simulate the shear display device interacting with objects in the simulated environment. If the virtual arm does not share one or more dimensions with the shear display device 100v, the microprocessor 122 may use movement and/or force information from the simulation in memory 124 to calculate interactions between the simulated environment and a virtual interaction point (such as virtual interaction point 116 described in relation to FIGS. 19 and 20). The microprocessor 122 may then actuate one or more motors 160g to simulate interaction of the simulated environment and the virtual interaction point.

The described shear display device 100v may not require the software or computer system controlling the remote and/or virtual object or device to provide to the shear display device 100v force or torque information or information regarding displacement, position, and/or movement of tactors 110x. The described shear display device 100v may calculate an appropriate displacement, position, and/or movement of tactors 110x provided information regarding the position, movement, force, torque, or combinations thereof of the virtual and/or remote controlled object or device and the simulated environment.

Further, the methods may be practiced by a computer system including one or more processors and computer readable media such as computer memory. In particular, the computer memory may store computer executable instructions that when executed by one or more processors cause various functions to be performed, such as the acts recited in the embodiments, and may include pre-recorded tactor motions that represent haptic effects such as the kick-back impulse of a virtual gun shot or impact of a virtual sword.

Embodiments of the present disclosure may comprise or utilize a special purpose or general-purpose computer including computer hardware. Embodiments within the scope of the present disclosure also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

Figure 23C:
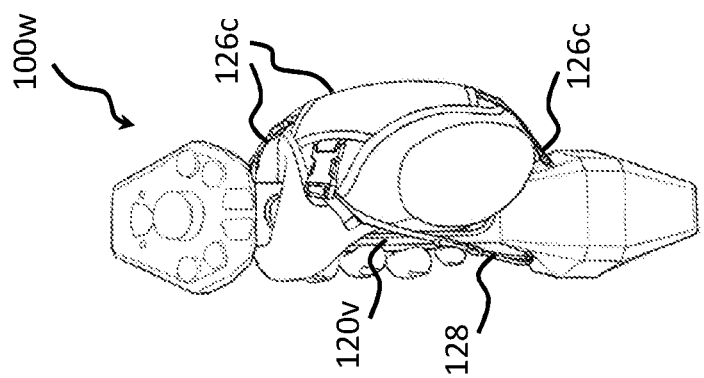
FIG. 23C depicts another embodiment of a shear display device having a restraining device including a thumb strap attached to the body and configured to hold a user's hand proximate the shear display device.
Figure 23B:
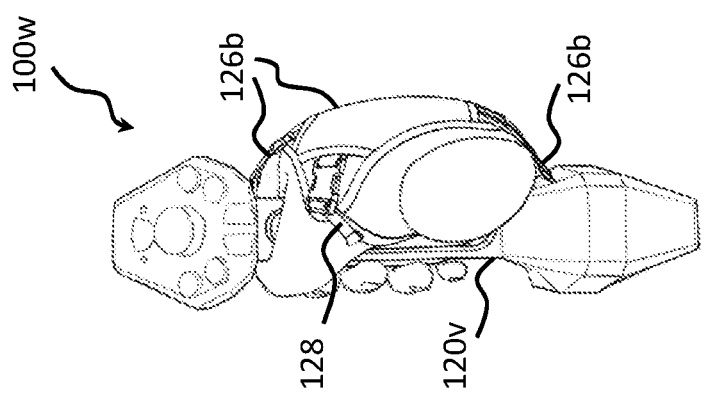
FIG. 23B depicts an embodiment of a shear display device having a restraining device including a thumb strap attached to the body and configured to hold a user's hand proximate the shear display device.
Figure 23A:
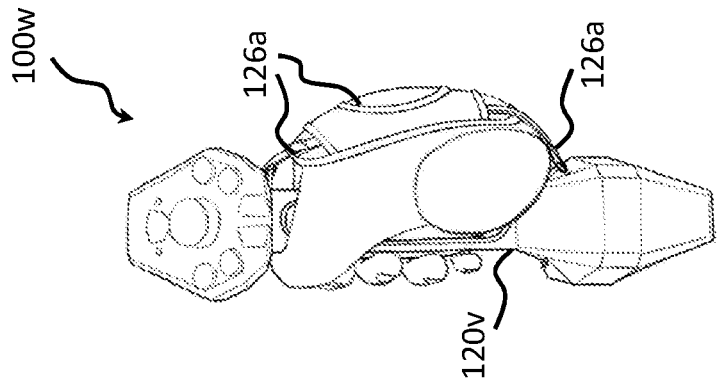
FIG. 23A depicts an embodiment of a shear display device having a restraining device attached to the body and configured to hold a user's hand proximate the shear display device.

FIGS. 23A through 23C depict various embodiments of a shear display device having a restraining device attached to the body and configured to hold a user's hand proximate the shear display device. FIG. 23A shows a shear display device 100w with a strap 126a connecting to a first end and a second end of a body 120v. The strap 126a may include one or more adjustments to accommodate hands of various sizes. The strap 126a may limit the movement of a user's hand relative to the body 120v. The strap 126a may limit the movement of a user's hand longitudinally, rotationally, laterally, or combinations thereof. For example, FIG. 23B depicts an embodiment of a shear display device 100w having a strap 126b with a thumb band 128 extending around a side of a user's hand. The thumb band 128 may further limit the rotational and longitudinal movement of a user's hand when compared to the strap 126a of FIG. 23A. In another example, FIG. 23C depicts an embodiment of a shear display device 100w having a strap 126c with a thumb band 128 extending around a side of a user's hand and connecting at the second end of the body 120v and laterally opposing the connection point of the strap 126c at the second end of the body 120v. The strap 126c and thumb band 128 depicted in FIG. 23C may further limit the rotational movement of a user's hand when compared to the strap 126b described in relation to FIG. 23B.

The addition of a strap 126a-c and grasp sensing to a shear display device 100w may provide a hybrid product solution between a virtual glove (e.g., CYBERGLOVE) and a motion controller (e.g., a NINTENDO WII-MOTE). A strap 126a-c allows the user of the shear display device 100w to open their hand without dropping the shear display device 100w and also helps to prevent accidentally throwing the shear display device 100w as the user moves their hands (as commonly occurred when the NINTENDO WII-MOTE was first introduced). Grasp sensing that tracks the user's finger locations relative to the device handle (e.g., using optical or capacitive sensing) can be used to tune or adjust the control of haptic feedback on the device or as an input for virtual or teleoperated interaction (e.g., to control the positions of fingers of a virtual hand or teleoperated robot hand).

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Any element and/or embodiment described in relation to any Figure may be combined with any other element and/or embodiment described herein. Equivalent constructions, including functional "means-plus-function"

clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

We claim:

1. A shear display device for displaying tactile information and cues to a user, the device comprising:
   a body;
   at least one tactor received by the body; and
   at least one actuator capable of moving the at least one tactor in a non-linear relationship with respect to information about movement of or forces experienced by an object, the at least one tactor configured to transmit the movement of the at least one tactor to skin of the user.

2. The device of claim 1, further comprising at least one sensor, the at least one sensor configured to determine at least one of a presence, a location, or an applied pressure of the hand and fingers of the user.

3. The device of claim 2, wherein the at least one sensor is configured to adjust control of the at least one actuator according to at least one of the presence, the location, or the applied pressure of the hand and fingers of the user.

4. The device of claim 1, further comprising a second tactor and a second actuator.

5. The device of claim 1, wherein the non-linear relationship comprises relating tactor motion to information about movement of or forces experienced by an object in a quadratic relationship.

6. The device of claim 1, wherein the non-linear relationship extends the range of object movement or forces that are portrayable within a given tactor motion range.

7. A method for displaying force and movement information related to one or more objects, the method comprising:
   providing a body, the body including:
      a first tactor;
      a second tactor;
      at least one actuator capable of moving the first tactor and the second tactor;
   moving the first tactor and the second tactor in response to information about movement of or forces experienced by an object, the first tactor and the second tactor configured to transmit the movement of the first tactor and the second tactor to skin of a user; and
   providing at least one sensor disposed within the body, the at least one sensor configured to determine at least one of the presence, the location, or the applied pressure of the hand and fingers of the user.

8. The method of claim 7, wherein the at least one sensor configured to adjust control of the tactor according to at least one of the presence, the location, or the applied pressure of the hand and fingers of the user.

9. The method of claim 7, further comprising:
   moving the first tactor in a non-linear relationship with respect to information about movement of or forces experienced by an object, the first tactor transmitting the movement of the first tactor to skin of the user.

10. The device of claim 7, wherein the non-linear relationship comprises relating tactor motion to information about movement of or forces experienced by an object in a quadratic relationship.

11. The device of claim 7, wherein the non-linear relationship extends the range of object movement or forces that are portrayable within a given tactor motion range.

12. A method for displaying force and movement information related to one or more objects, the method comprising:
   providing a body, the body including:
      at least one tactor;
      at least one actuator capable of moving the at least one tactor;
   moving the at least one tactor in a non-linear relationship with respect to information about movement of or forces experienced by an object, the at least one tactor configured to transmit the movement of the at least one tactor to skin of a user.

13. The method of claim 12, wherein the non-linear relationship comprises relating tactor motion to information about movement of or forces experienced by an object in a quadratic relationship.

14. The method of claim 12, wherein the non-linear relationship extends the range of object movement or forces that are portrayable within a given tactor motion range.

* * * * *